US011538011B2

(12) United States Patent
Saitoh et al.

(10) Patent No.: US 11,538,011 B2
(45) Date of Patent: Dec. 27, 2022

(54) SALES-DATA PROCESSING DEVICE AND SALES-DATA PROCESSING METHOD

(71) Applicant: Teraoka Seiko Co., Ltd., Tokyo (JP)

(72) Inventors: Fumikatu Saitoh, Tokyo (JP); Takayuki Sanguu, Tokyo (JP); Nobuyoshi Shinozaki, Tokyo (JP)

(73) Assignee: Teraoka Seiko Co., LTD, Tokyo (JP)

( * ) Notice: Subject to any disclaimer, the term of this patent is extended or adjusted under 35 U.S.C. 154(b) by 0 days.

(21) Appl. No.: 16/986,915

(22) Filed: Aug. 6, 2020

(65) Prior Publication Data

US 2020/0380489 A1 Dec. 3, 2020

Related U.S. Application Data

(63) Continuation of application No. PCT/JP2019/004488, filed on Feb. 7, 2019.

(30) Foreign Application Priority Data

Feb. 7, 2018 (JP) .............................. JP2018-020535
Mar. 26, 2018 (JP) .............................. JP2018-058837

(51) Int. Cl.
*G06K 15/00* (2006.01)
*G06Q 20/20* (2012.01)
(Continued)

(52) U.S. Cl.
CPC ......... *G06Q 20/202* (2013.01); *G06F 3/0416* (2013.01); *G06Q 20/203* (2013.01);
(Continued)

(58) Field of Classification Search
CPC ...... G06Q 20/18; G06Q 20/20; G06Q 20/202; G06Q 20/204; G06Q 20/405
(Continued)

(56) References Cited

U.S. PATENT DOCUMENTS 7,367,498 B2 * 5/2008 Kodaka .................. G06Q 20/20
235/383
8,239,268 B2 * 8/2012 Iizaka .................... G07G 3/006
705/16

(Continued)

FOREIGN PATENT DOCUMENTS

JP   2014-86032 A    5/2014
JP   2017-102856 A   6/2017

(Continued)

OTHER PUBLICATIONS

International Search Report issued in corresponding International Application No. PCT/JP2019/004488 dated Apr. 23, 2019, with translation (3 pages).

(Continued)

*Primary Examiner* — Daniel St. Cyr
(74) *Attorney, Agent, or Firm* — Osha Bergman Watanabe & Burton LLP

(57) ABSTRACT

A sales-data processing device includes: a registering circuit that registers a product and generates registration data; a settlement processing circuit that executes settlement processing using the registration data; a sending circuit that sends the registration data to another sales-data processing device for execution of the settlement processing by the other sales-data processing device using the registration data; and a prohibiting circuit. Once the sales-data processing device has determined that the sending circuit will send the registration data, the prohibiting circuit prohibits the (Continued)

Perspective view as seen from customer side settlement processing circuit from executing the settlement processing before the sending circuit sends the registration data.

4 Claims, 32 Drawing Sheets

(51) Int. Cl.
*G06F 3/041* (2006.01)
*G06Q 20/40* (2012.01)
*G07G 1/12* (2006.01)
*G06F 3/0484* (2022.01)
*G06F 3/04886* (2022.01)

(52) U.S. Cl.
CPC ............. *G06Q 20/405* (2013.01); *G07G 1/12* (2013.01); *G06F 3/0484* (2013.01); *G06F 3/04886* (2013.01)

(58) Field of Classification Search
USPC ................................ 235/380, 383, 385, 379
See application file for complete search history.

(56) References Cited

U.S. PATENT DOCUMENTS

| 8,768,775 | B1* | 7/2014 | Roper | G06Q 20/20 |
| | | | | 705/16 |
| 8,944,325 | B2* | 2/2015 | Naito | H04N 1/203 |
| | | | | 235/383 |
| 9,022,281 | B2* | 5/2015 | Hasegawa | G07G 1/0063 |
| | | | | 235/375 |
| 9,033,229 | B2* | 5/2015 | Matsuhisa | G06K 7/10821 |
| | | | | 235/383 |

FOREIGN PATENT DOCUMENTS

| JP | 2017-138807 A | 8/2017 |
| JP | 2017-211698 A | 11/2017 |

OTHER PUBLICATIONS

Written Opinion of the International Searching Authority issued in corresponding International Application No. PCT/JP2019/004488 dated Apr. 23, 2019 (3 pages).

* cited by examiner

Perspective view as seen from customer side

Perspective view as seen from employee side

FIG. 3A
FIG. 3B
Perspective view as seen from customer side
Perspective view as seen from employee side
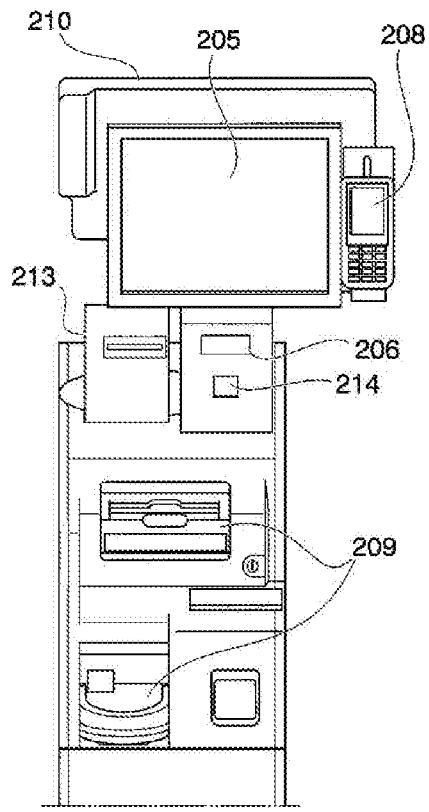
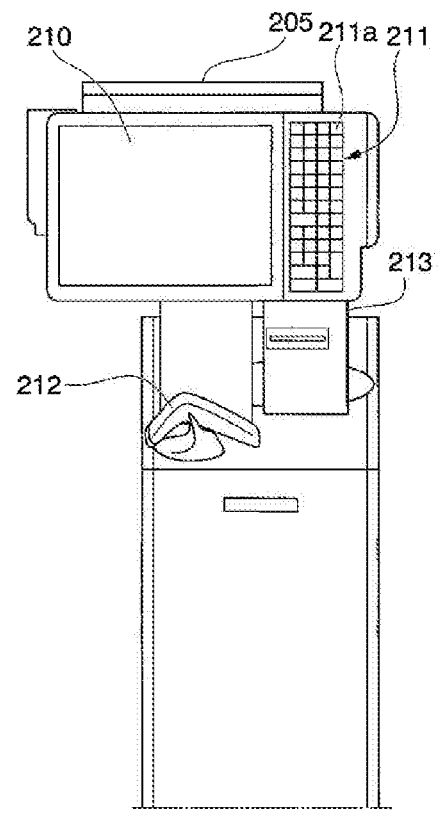

FIG. 5A
FIG. 5B
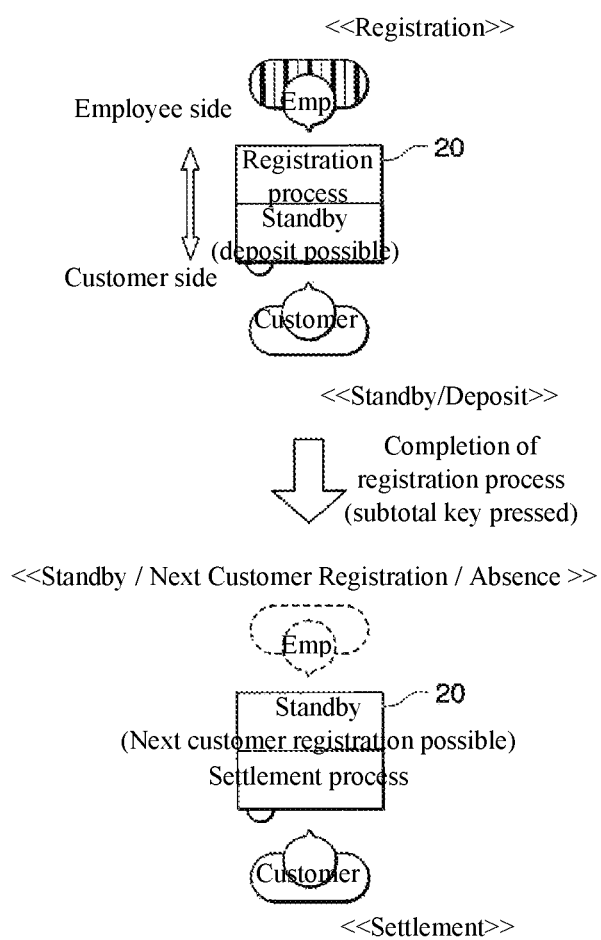
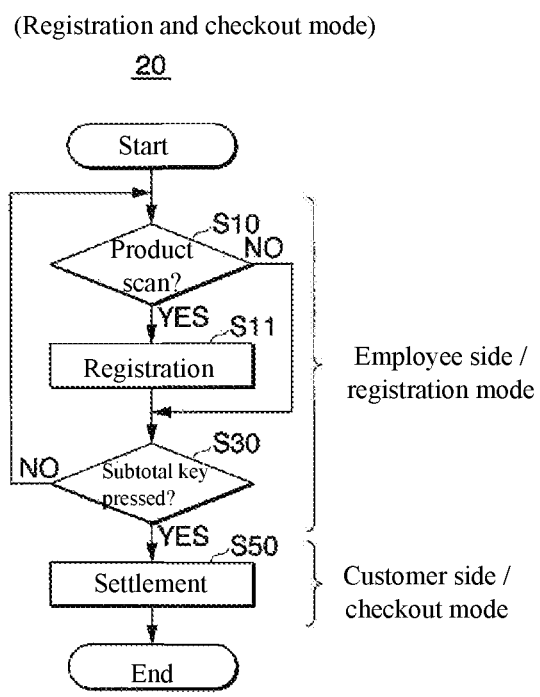

FIG. 6A
FIG. 6B
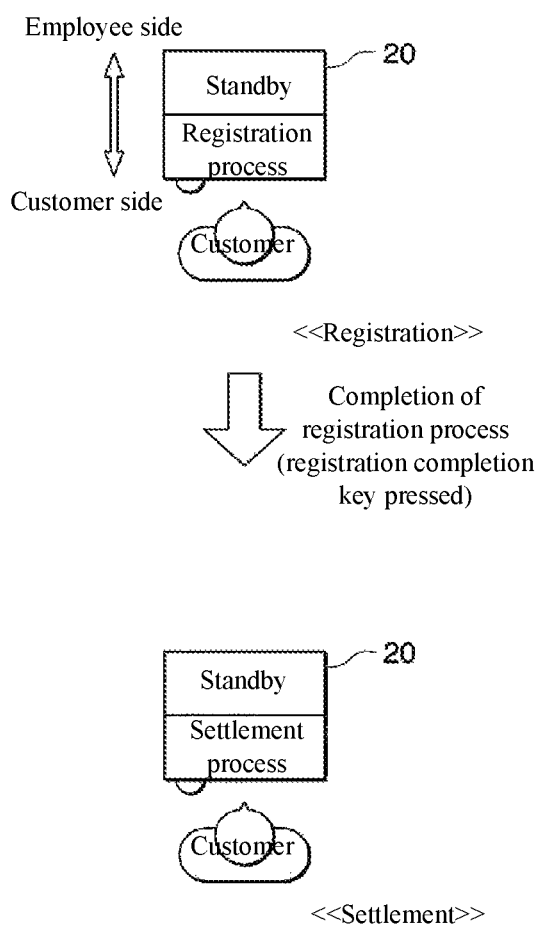
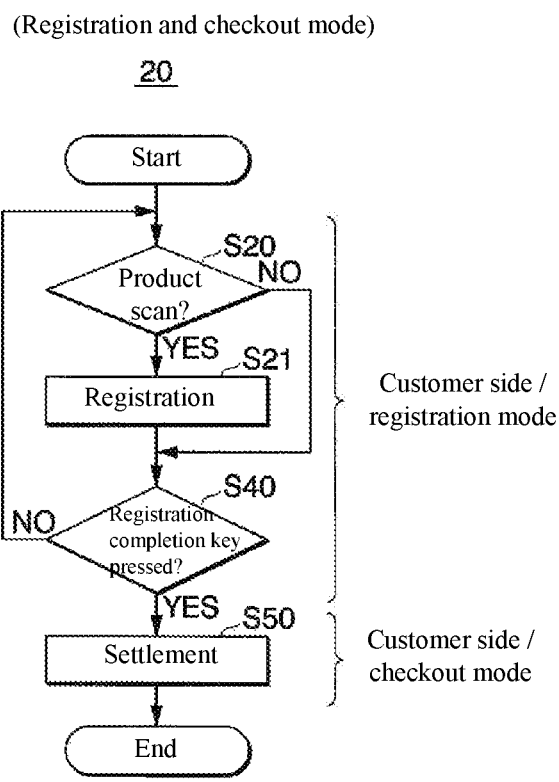

FIG. 15A

```
Registration  Normal mode                    ⇌ Online        HR01
screen
                                           1    [0]

Nori bento                      Total   3      ¥803
   Tax-inclusive sale
            ¥420                                    0

1  Canned beer          ¥215 Tax incl.   [Cucumber][Carrot][Long onion]   Fruit
 1  Asparagus            ¥168 Tax incl.                                    Meat
 1  Nori bento           ¥420 Tax incl.   [Tomato][Asparagus][Napa cabbage] Seafood
                                                                           Alcoholic
                                                                             drinks
                                          [Sweet potato][Bok choy][Eggplant] Vegetables
                                                                              BT15
  △ △  ⊖              Left Right
 Registration  20-2 Cash   20-3 Cash    Subtotal  20-2 Cash  20-3 Cash Checkout
              Register    Register                Register   Register  Ticket
              (Normal)    (Full self)             (Normal)   (Full self)
    GA02         GA03       BT10         BT12      BT13
```

FIG. 15B

```
                                                            SG01
  Can                                              215 yen
  As       Please select a payment method          168 yen No                                    Electronic
            Cash       Credit            money
                                                   20 yen
       For cash, money may be inserted before selection Total
                          3              803
              👛          items             yen ↓ Money may be inserted    Deposited    0 yen

[English][简体中文][한국어]

OMOD( )
         ⏲
```

SALES-DATA PROCESSING DEVICE AND SALES-DATA PROCESSING METHOD

CROSS-REFERENCE TO RELATED APPLICATION

The present application is a continuation application of International Application No. PCT/JP2019/004488 filed on Feb. 7, 2019, and claims priority to Japanese Patent Application No. 2018-020535 filed on Feb. 7, 2018, and Japanese Patent Application No. 2018-058837 filed on Mar. 26, 2018, both of which are incorporated by reference in entirely.

BACKGROUND

Technical Field

The present invention relates to a sales-data processing device, a computer-readable recording medium, and a sales-data processing method.

Description of the Related Art

A registration device (sales processing device) that can send registration information to a settlement device that is another device is proposed (for example, see patent literature 1).
Patent literature 1: JP 2017-102856 A
However, there is a fear of erroneously executing processing unsuited to a situation.

SUMMARY

In view of the above situation, one or more embodiments of the present invention provide an improvement to existing technology in a field of sales data processing by preventing execution of processing unsuited to a situation.

A sales-data processing device according to one or more embodiments of the present invention is provided with a registration means (registration circuit) of executing registration processing of registering a product, a settlement processing means (settlement processing circuit) of executing settlement processing using registration data generated by the registration means, a sending means (sending circuit) of executing sending processing of sending the registration data so that settlement processing can be performed on another sales-data processing device (that is, sending the registration data so that the settlement processing can be executed on another sales-data processing device), and a prohibition means (prohibiting circuit) of prohibiting execution of the settlement processing, wherein the prohibition means prohibits execution of the settlement processing before execution of the sending processing when the sending processing is to be executed.

According to one or more embodiments, processing unsuited to a situation being erroneously executed can be suitably prevented. Specifically, in a situation wherein the sending processing is to be executed, settlement processing is not performed in this sales-data processing device. As such, settlement processing unsuited to this situation is prohibited. Therefore, settlement processing unsuited to a situation wherein the sending processing is to be executed is not erroneously executed. This improves functionality of the sales-data processing device.

A sales-data processing device according to one or more embodiments of the present invention is provided with a registration means of executing registration processing of registering a product, a settlement processing means of executing settlement processing using registration data generated by the registration means, a sending means of executing sending processing of sending the registration data so that settlement processing can be performed on another sales-data processing device, and a prohibition means of prohibiting execution of the sending processing, wherein the prohibition means prohibits execution of the sending processing before execution of the settlement processing when the settlement processing is to be executed.

According to one or more embodiments, processing unsuited to a situation being erroneously executed can be suitably prevented. Specifically, in a situation wherein the settlement processing is to be executed, no registration data is sent to another sales-data processing device. As such, sending processing unsuited to this situation is prohibited. Therefore, sending processing unsuited to a situation wherein the settlement processing is to be executed is not erroneously executed. This improves functionality of the sales-data processing device.

A sales-data processing device according to one or more embodiments of the present invention is provided with a registration means of executing registration processing of registering a product, a settlement processing means of executing settlement processing using registration data generated by the registration means, a sending means of executing sending processing of sending the registration data so that settlement processing can be performed on another sales-data processing device, a first determination means of determining whether the settlement processing is to be executed before execution of the settlement processing, a second determination means of determining whether the sending processing is to be executed before execution of the sending processing, and a prohibition means of prohibiting execution of any one processing among the settlement processing and the sending processing, wherein the prohibition means prohibits execution of the sending processing before execution of the settlement processing when the first determination means determines that the settlement processing is to be executed before execution of the settlement processing and prohibits execution of the settlement processing before execution of the sending processing when the second determination means determines that the sending processing is to be executed before execution of the sending processing.

According to one or more embodiments, processing unsuited to a situation being erroneously executed can be suitably prevented. For example, in a situation wherein the sending processing is to be executed, settlement processing is not performed in this sales-data processing device. As such, settlement processing unsuited to this situation is prohibited. Therefore, settlement processing unsuited to a situation wherein the sending processing is to be executed is not erroneously executed. Moreover, for example, in a situation wherein the settlement processing is to be executed, no registration data is sent to another sales-data processing device. As such, sending processing unsuited to this situation is prohibited. Therefore, sending processing unsuited to a situation wherein the settlement processing is to be executed is not erroneously executed. This improves functionality of the sales-data processing device.

A sales-data processing device according to one or more embodiments of the present invention is the sales-data processing device wherein the first determination means determines whether the settlement processing is to be executed based on a presence or absence of a deposit into a change machine or a presence or absence of a selection of a transaction type to be applied in the settlement processing.

According to one or more embodiments, a situation to execute the settlement processing in can be suitably determined. This also improves functionality of the sales-data processing device.

A computer-readable recording medium according to one or more embodiments of the present invention stores instructions that cause a computer to function as a sales-data processing device, wherein the computer is made to function as a registration means of executing registration processing of registering a product, a settlement processing means of executing settlement processing using registration data generated by the registration means, a sending means of executing sending processing of sending the registration data so that settlement processing can be performed on another sales-data processing device, and a prohibition means of prohibiting execution of any one processing among the settlement processing and the sending processing; and the prohibition means prohibits execution of the sending processing before execution of the settlement processing when the settlement processing is to be executed and prohibits execution of the settlement processing before execution of the sending processing when the sending processing is to be executed.

According to one or more embodiments, processing unsuited to a situation being erroneously executed can be suitably prevented. This improves functionality of the sales-data processing device.

A computer-readable recording medium according to one or more embodiments of the present invention stores instructions that cause a computer to function as a sales-data processing device, wherein the computer is made to function as a registration means of executing registration processing of registering a product, a settlement processing means of executing settlement processing using registration data generated by the registration means, a sending means of executing sending processing of sending the registration data so that settlement processing can be performed on another sales-data processing device, and a prohibition means of prohibiting execution of the settlement processing; and the prohibition means prohibits execution of the settlement processing before execution of the sending processing when the sending processing is to be executed.

According to one or more embodiments, processing unsuited to a situation being erroneously executed can be suitably prevented. This improves functionality of the sales-data processing device.

A computer-readable recording medium according to one or more embodiments of the present invention stores instructions that cause a computer to function as a sales-data processing device, wherein the computer is made to function as a registration means of executing registration processing of registering a product, a settlement processing means of executing settlement processing using registration data generated by the registration means, a sending means of executing sending processing of sending the registration data so that settlement processing can be performed on another sales-data processing device, and a prohibition means of prohibiting execution of the sending processing; and the prohibition means prohibits execution of the sending processing before execution of the settlement processing when the settlement processing is to be executed.

According to one or more embodiments, processing unsuited to a situation being erroneously executed can be suitably prevented. This improves functionality of the sales-data processing device.

A sales-data processing method according to one or more embodiments of the present invention is a sales-data processing method in a sales-data processing device, provided with a registration step of registering a product, a settlement processing step of performing settlement processing using registration data generated by the registration step, a sending step of sending the registration data so that settlement processing can be performed on another sales-data processing device, and a prohibition step of prohibiting execution of any one among the settlement processing step and the sending step, wherein the prohibition step prohibits execution of the settlement processing step before execution of the sending step when the sending step is to be executed and prohibits execution of the sending step before execution of the settlement processing step when the settlement processing step is to be executed.

According to one or more embodiments, processing unsuited to a situation being erroneously executed can be suitably prevented. This improves functionality of the sales-data processing device.

A sales-data processing method according to one or more embodiments of the present invention is a sales-data processing method in a sales-data processing device, provided with a registration step of registering a product, a settlement processing step of performing settlement processing using registration data generated by the registration step, a sending step of sending the registration data so that settlement processing can be performed on another sales-data processing device, and a prohibition step of prohibiting execution of the settlement processing step, wherein the prohibition step prohibits execution of the settlement processing step before execution of the sending step when the sending step is to be executed.

According to one or more embodiments, processing unsuited to a situation being erroneously executed can be suitably prevented. This improves functionality of the sales-data processing device.

A sales-data processing method according to one or more embodiments of the present invention is a sales-data processing method in a sales-data processing device, provided with a registration step of registering a product, a settlement processing step of performing settlement processing using registration data generated by the registration step, a sending step of sending the registration data so that settlement processing can be performed on another sales-data processing device, and a prohibition step of prohibiting execution of the sending step, wherein the prohibition step prohibits execution of the sending step before execution of the settlement processing step when the settlement processing step is to be executed.

According to one or more embodiments, processing unsuited to a situation being erroneously executed can be suitably prevented. This improves functionality of the sales-data processing device.

As described above, one or more embodiments of the present invention can prevent execution of processing unsuited to a situation, and thereby provide an improvement to existing technology in a field of sales data processing.

BRIEF DESCRIPTION OF DRAWINGS

FIGS. 3A-3B each show a diagram illustrating an appearance example of the POS terminal according to one or more embodiments.

FIGS. 5A-5B each show a diagram illustrating an overview of an operation mode of the POS terminal according to one or more embodiments.

FIGS. 6A-6B each show a diagram illustrating an overview of an operation mode of the POS terminal according to one or more embodiments.

FIGS. 15A-15B each show a display example in the POS terminal according to one or more embodiments.

DETAILED DESCRIPTION

Figure 1:
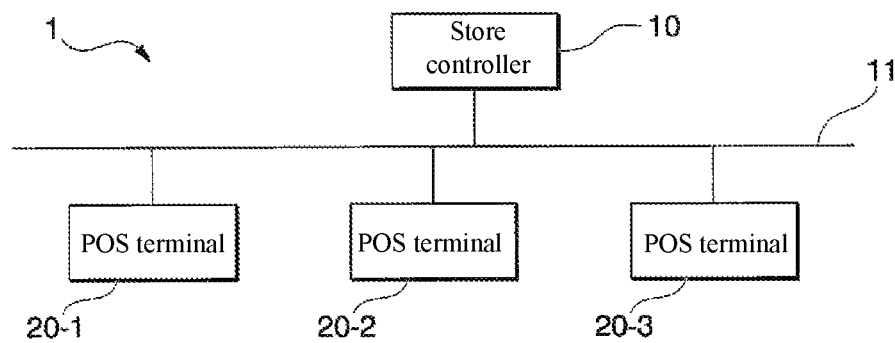
FIG. 1 shows a network configuration diagram of a POS system according to one or more embodiments.

FIG. 1 is a network configuration diagram of a POS (point of sales) system of one or more embodiments of the present invention. The POS system 1 illustrated in FIG. 1 is provided with three terminals—a POS terminal 20-1, a POS terminal 20-2, and a POS terminal 20-3—and a store controller (store computer, management device) 10, and each is connected via a LAN 11 to enable communication. Hereafter, the POS terminals 20-1, 20-2, and 20-3 are referred to generally as a POS terminal 20 when no particular distinction is made therebetween. Note that the POS system 1 may be further provided with a monitoring terminal (not illustrated) that displays a status of the POS terminal 20 (such as an operation mode or a processing status) and controls the POS terminal 20.

The POS system 1 can be adopted in various stores (such as convenience stores and supermarkets).

Figure 2A:
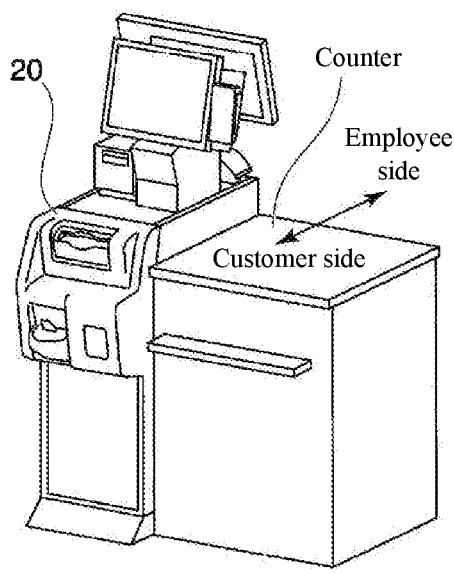
FIGS. 2A-2B each show a diagram illustrating an installation example of a POS terminal according to one or more embodiments.
Figure 2B:
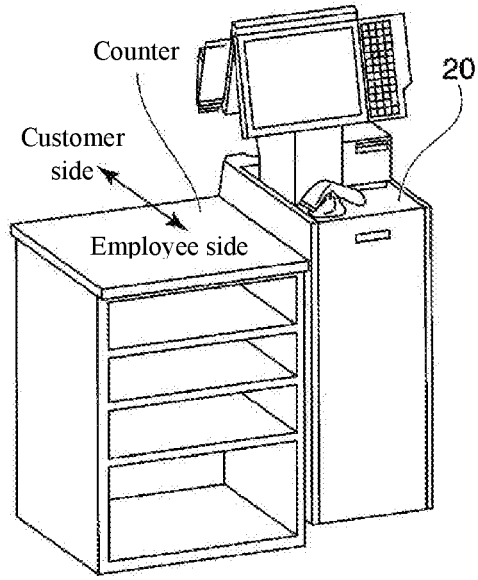

FIGS. 2A-2B are diagrams each illustrating an installation example of the POS terminal 20. FIG. 2A is a perspective view of the POS terminal 20 and the like as seen from a customer side. FIG. 2B is a perspective view of the POS terminal 20 and the like as seen from an employee side. As illustrated in FIG. 2A, a counter is placed to the right of the POS terminal 20 as seen from the customer side.

Figure 4:
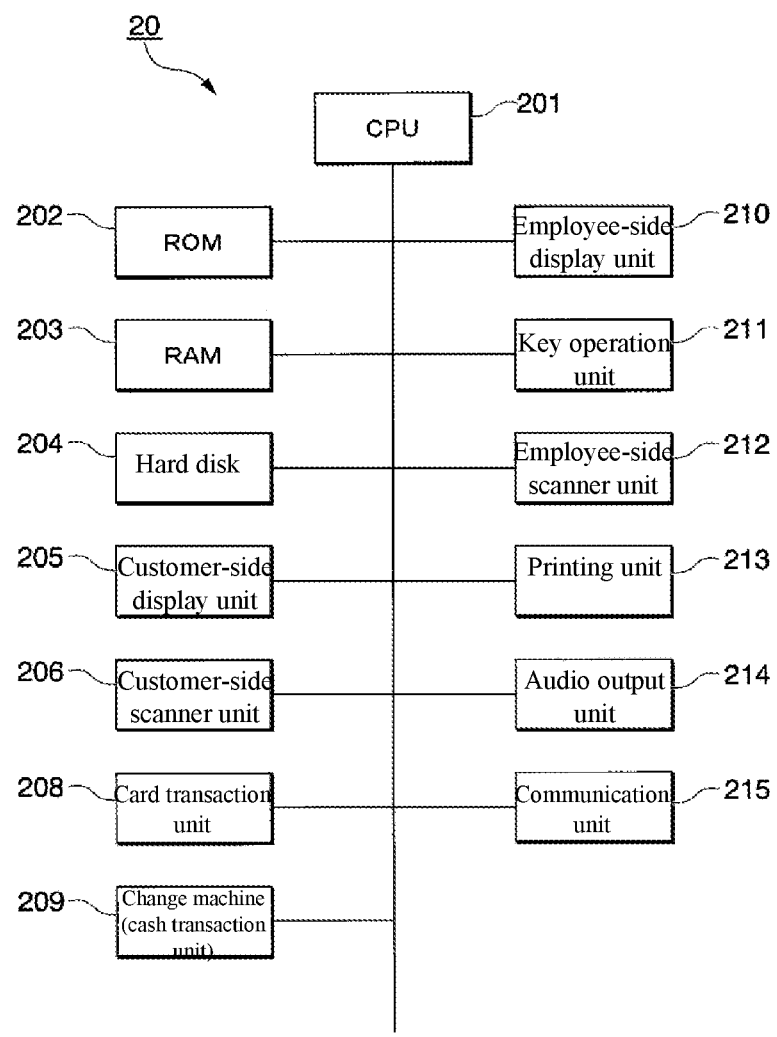
FIG. 4 shows a diagram illustrating a configuration example of the POS terminal according to one or more embodiments.

FIGS. 3A-3B are diagrams each illustrating an appearance example of the POS terminal 20. FIG. 3A is a perspective view of the POS terminal 20 as seen from the customer side. FIG. 3B is a perspective view of the POS terminal 20 as seen from the employee side. FIG. 4 is diagram illustrating a configuration example of the POS terminal 20. In FIGS. 3A-3B and FIG. 4, identical parts are labeled with identical reference signs.

The configuration example of the POS terminal 20 illustrated in FIG. 4 is described below while referencing FIGS. 3A-3B. The POS terminal 20 is provided with a central processing unit (CPU) 201, a ROM 202, a RAM 203, a hard disk 204, a customer-side display unit 205, a customer-side scanner unit 206, a card transaction unit 208, a change machine 209, an employee-side display unit 210, a key operation unit 211, an employee-side scanner unit 212, a printing unit 213, an audio output unit 214, and a communication unit 215. These can communicate with each other via a bus.

The CPU 201 is a central processing unit and comprises circuitry that controls operations and various "means" of the POS terminal 20, e.g., by reading and executing instructions stored in the ROM 202. The ROM 202 is a read-only memory and stores various information used by the CPU 201 such as a program.

The RAM 203 is a read—write memory and stores various information. For example, the RAM 203 stores information acquired externally (for example, basic product information acquired from the store controller 10) and information generated in processing (for example, registration information (registration data) generated in registration processing of registering a product and settlement information generated in settlement processing of performing settlement (a transaction) for a purchased product.

The hard disk 204 stores various information. The hard disk 204 may store, for example, the instructions executed by the CPU 201 in place of the ROM 202. It may also store information acquired externally and information generated in processing in place of the RAM 203.

The customer-side display unit 205 is a touch display for a customer. It displays various information to the customer and receives various inputs from the customer.

The customer-side scanner unit 206 is a scanner unit for the customer and optically reads, for example, a barcode on a product (such as a product code). The customer-side scanner unit 206 may also optically read a code (such as a barcode or a two-dimensional code) printed on a checkout ticket (registered trademark).

Note that the customer-side scanner unit 206 is used when the customer registers a product, but the customer may register a product by another method. For example, when a preset key corresponding to a product (button for ordering a product) is displayed on the customer-side display unit 205, the customer may register the product by operating (pressing) this preset key.

The card transaction unit 208 is a transaction mechanism which uses various cards (credit cards, prepaid cards such as traffic system cards, and the like). The card transaction unit 208 of one or more embodiments is provided with a card recognition unit (reading unit), a display unit, and an operation unit, but it is sufficient for the card transaction unit 208 to be provided with at least a card recognition unit. Note that the card recognition unit may recognize various cards not directly used in a transaction (settlement) (for example, membership cards and point cards).

The change machine 209 (cash transaction unit) is a transaction mechanism which uses cash. The change machine 209 (cash transaction unit) is provided with a bill and coin insertion port and a bill and coin discharge port, calculates an amount inserted into the insertion port and a change amount that is a difference between the inserted amount and a purchase amount, and discharges change from the discharge port. Note that the change machine 209 faces the customer side and is operated by the customer. Note that when bills and coins are inserted into the insertion port, a sensor detects the inserted bills and coins (detects insertion, detects a number of bills and coins by denomination, or the like).

The employee-side display unit 210 is a touch display for an employee that displays various information to the employee and accepts various inputs from the employee.

The key operation unit 211 is configured from various keys (buttons) and accepts various inputs from the employee.

The employee-side scanner unit 212 is a scanner unit for an employee that optically reads, for example, a barcode on a product (such as a product code) and an employee code on a name tag of the employee.

Note that the employee-side scanner unit 212 is used when the employee registers a product, but the employee may register a product by another method. For example, when a key corresponding to a product (for example, a key corresponding to a sports newspaper) is disposed in the key operation unit 211, the employee may register this product by operating (pressing) this key, Furthermore, when a preset key corresponding to a product is displayed on the employee-side display unit 210, the employee may register this product by operating this preset key.

The printing unit 213 prints and issues various media (such as receipts and checkout tickets). An orientation (direction of a media issuing port) of the printing unit 213 rotatably changes from the employee side to the customer side and from the customer side to the employee side. The orientation of the printing unit 213 may be changed manually or may be changed automatically (mechanically controlled or the like) according to, for example, the operation mode (details described below) transitioning (switching). Note that an accuracy of the orientation of the printing unit 213 may be detected by a sensor or the like.

The audio output unit 214 outputs audio. For example, the audio output unit 214 outputs voice guidance.

The communication unit 215 sends and receives information between itself and another terminal (another POS terminal 20, the store controller 10).

(Summaries of Each Operation Mode)

Next, the operation mode of the POS terminal 20 is described. The POS terminal 20 has a plurality of operation modes. Specifically, the POS terminal 20 has at least three types of operation modes (normal mode, full-self mode, and semi-self mode).

Note that the above operation modes are operation modes during normal business operations (operation modes related to the registration processing and the settlement processing) and do not include a totaling mode of totaling, querying, and the like of sales, amount on hand, and the like; a maintenance mode for an employee, a maintenance worker, or the like to perform setting work and maintenance work; a training mode for training a new hire; or the like.

Furthermore, in the description below, as an approach that is different from the above classification of operation modes (normal mode, full-self mode, semi-self mode), a mode wherein the POS terminal 20 executes the registration processing may be referred to as a registration mode, and a mode wherein the POS terminal executes the settlement processing may be referred to as an accounting mode.

FIGS. 5A-5B and FIGS. 6A-6B are diagrams illustrating summaries of the operation modes of the POS terminal 20. FIGS. 5A-5B are diagrams each illustrating a summary of the normal mode. FIG. 5A is a schematic diagram representing a flow of processes (registration processing, settlement processing) and operations of persons (employee, customer) in the normal mode. FIG. 5B is a flowchart illustrating a basic flow of operations of the POS terminal 20 in the normal mode. FIGS. 6A-6B are diagrams each illustrating a summary of the full-self mode. FIG. 6A is a schematic diagram representing a flow of processes (registration processing, settlement processing) and operations of persons (employee, customer) in the full-self mode. FIG. 6B is a flowchart illustrating a basic flow of operations of the POS terminal 20 in the full-self mode.

(Normal Mode)

As illustrated in FIG. 5A, the normal mode is an operation mode for executing the registration processing on the employee side and for executing the settlement processing on the customer side. That is, as illustrated in FIG. 5B, in the POS terminal 20 in the normal mode, the employee side enters the registration mode and the customer side enters the checkout mode. That is, viewed overall, from the registration processing to the settlement processing, the POS terminal 20 in the normal mode operates in a registration and checkout mode (registration mode and checkout mode).

When the POS terminal 20 is in the normal mode, an employee registers a customer's purchased product on the employee side (employee-side scanner unit 212, employee-side display unit 210, key operation unit 211). That is, the POS terminal 20 in the normal mode executes the registration processing of the purchased product (the upper portion of FIG. 5A) by an employee operation (scanning with the employee-side scanner unit 212, touching the employee-side display unit 210, operation of the key operation unit 211).

When the registration processing by the employee is completed, the customer confirms a total amount of the purchased product on the employee-side display unit 210, inserts money (cash) into the change machine 209 or operates the card transaction unit 208, and performs settlement processing (the lower portion of FIG. 5A). That is, the POS terminal 20 in the normal mode executes the settlement processing (the lower portion of FIG. 5A) by a customer operation or the like (inserting cash into the change machine 209, operating the card transaction unit 208).

That is, as illustrated in FIG. 5B, the POS terminal 20 in the normal mode determines whether there is a product scan or the like on the employee side (step S10). When there is a product scan or the like (step S10: YES), the POS terminal 20 in the normal mode registers the product that is scanned or the like (step S11). When there is no product scan or the like (step S10: NO) or when the product is registered (step S11), the POS terminal 20 in the normal mode determines whether a subtotal key (for example, a subtotal key displayed on the employee-side display unit 210 or a subtotal key disposed in the key operation unit 211) is pressed (step S30). When no subtotal key is pressed (step S30: NO), processing returns to step S10. When a subtotal key is pressed (step S30: YES), the POS terminal 20 in the normal mode executes settlement processing on the customer side by, for example, the change machine 209 (step S50) and completes processing. Note that the subtotal key of step S30 is an operation key for completing the registration processing and may be referred to as a Subtotal button, a registration completion key, a Complete Registration button, a checkout key, a Checkout button, and the like.

Note that the customer may wait until the registration processing by the employee is completed (until the total amount is confirmed) or may insert cash into the change machine 209 before the registration processing is completed. That is, the POS terminal 20 in the normal mode can accept a deposit during the registration processing (the upper portion of FIG. 5A).

Moreover, the customer may select a payment method (also referred to as a payment type, a transaction method, and a transaction type) before the registration processing is completed. That is, the POS terminal 20 in the normal mode can accept a payment-method selection during the registration processing (details described below).

Moreover, the employee may wait until settlement processing by the customer is completed (until the customer takes the change and the receipt) or may register a purchased product of the next customer. That is, the POS terminal 20 in the normal mode can register the purchased product of the next customer during the settlement processing (the lower portion of FIG. 5A). Moreover, the employee may be absent during settlement processing by the customer (the lower portion of FIG. 5A). That is, attending to this customer may be ended during settlement processing by this customer.

Moreover, when there is change, in order to prevent the change being forgotten, the POS terminal 20 in the normal mode may control payment of change coins and bills by the change machine 209 and, upon recognizing removal of the change coins and bills by the customer by a sensor or the like, control receipt issuing by the printing unit 213. This is also the case in the other operation modes.

Moreover, in addition to processing, such as that described above, of executing the registration processing on the employee side and executing the settlement processing on the customer side of the same terminal using the registration information generated in this registration processing (see FIGS. 5A-5B), the POS terminal 20 in the normal mode can also execute processing of executing the registration processing on the employee side and sending the registration information generated in this registration processing to another terminal (another terminal that can execute the settlement processing; for example, another POS terminal 20) (directly sending the registration information to the other terminal via the LAN 11 or sending the registration information to the other terminal via the store controller 10 or the monitoring terminal (not illustrated); likewise hereinbelow) or processing of turning, for example, the registration information generated in this registration processing into a code (such as a barcode or a two-dimensional code), printing this onto a medium, and issuing this as a checkout ticket. That is, in addition to a function of registering a product in the present terminal and performing settlement processing in the present terminal, the POS terminal 20 in the normal mode also has a function of registering a product in the present terminal and causing settlement processing to be performed at another terminal.

The function described above which registers a product in the present terminal and causes settlement processing to be performed in another terminal is the original function of the semi-self mode. The semi-self mode is classified into a dedicated registration mode and a dedicated checkout mode. A POS terminal 20 in the semi-self mode (dedicated registration mode) has a function which registers a product in the present terminal and causes settlement processing to be performed in another terminal. Specifically, the POS terminal 20 in the semi-self mode (dedicated registration mode) executes the registration processing on the employee side and sends the registration information generated in this registration processing to another terminal (or turns, for example, the registration information generated in this registration processing into a code, prints this onto a medium, and issues this as a checkout ticket). A POS terminal 20 in the semi-self mode (dedicated checkout mode) has a function which performs settlement processing for a product registered in another terminal. Specifically, the POS terminal 20 in the semi-self mode (dedicated checkout mode) receives registration information sent from a POS terminal 20 in the semi-self mode (dedicated registration mode) or a POS terminal 20 in the normal mode (or reads a checkout ticket issued by the POS terminal 20 in the semi-self mode (dedicated registration mode) or the POS terminal 20 in the normal mode) and executes the settlement processing.

Note that like the POS terminal 20 in the semi-self mode (dedicated registration mode), the POS terminal 20 in the normal mode has a function which registers a product in the present terminal and causes settlement processing to be performed in another terminal, but a POS terminal 20 in the full-self mode (as well as the POS terminal 20 in the normal mode) may have a function which, like the POS terminal 20 in the semi-self mode (dedicated checkout mode), performs settlement processing for a product registered in another terminal. That is, the POS terminal 20 in the full-self mode and the POS terminal 20 in the normal mode may receive registration information from another terminal (such as the POS terminal 20 in the semi-self mode (dedicated registration mode) or the POS terminal 20 in the normal mode) (or read the checkout ticket) and execute the settlement processing.

(Full-Self Mode)

As illustrated in FIG. 6A, the full-self mode is an operation mode for executing the registration processing on the customer side and for executing the settlement processing on the customer side. That is, as illustrated in FIG. 6B, in the POS terminal 20 in the full-self mode, the customer side enters the registration mode as well as the checkout mode. That is, viewed overall, from the registration processing to the settlement processing, the POS terminal 20 in the full-self mode operates in the registration and checkout mode (registration mode and checkout mode).

When the POS terminal 20 is in the full-self mode, the customer registers their own purchased product on the customer side (customer-side scanner unit 206, customer-side display unit 205). That is, the POS terminal 20 in the full-self mode executes the registration processing of the purchased product (the upper portion of FIG. 6A) by a customer operation (scanning with the customer-side scanner unit 206, touching the customer-side display unit 205).

When the registration processing is completed, the customer confirms the total amount of the purchased product on the customer-side display unit 205, inserts cash into the change machine 209 or operates the card transaction unit 208, and performs settlement processing (the lower portion of FIG. 6A). That is, the POS terminal 20 in the full-self mode executes the settlement processing (the lower portion of FIG. 6A) by a customer operation or the like (inserting cash into the change machine 209, operating the card transaction unit 208).

That is, as illustrated in FIG. 6B, the POS terminal 20 in the full-self mode determines whether there is a product scan or the like on the customer side (step S20). When there is a product scan or the like (step S20: YES), the POS terminal 20 in the full-self mode registers the product that is scanned or the like (step S21). When there is no product scan or the like (step S20: NO) or when the product is registered (step S21), the POS terminal 20 in the full-self mode determines whether a registration completion key (for example a registration completion key displayed on the customer-side display unit 205) is pressed (step S40). When no registration completion key is pressed (step S40: NO), processing returns to step S20. When a registration completion key is pressed (step S40: YES), the POS terminal 20 in the full-self mode executes settlement processing on the customer side by, for example, the change machine 209 (step S50) and completes processing. Note that the registration completion key of step S40 is an operation key for completing the registration processing and may be referred to as the Complete Registration button, the subtotal key, the Subtotal button, the checkout key, the Checkout button, and the like.

Note that the POS terminal 20 in the full-self mode executes the registration processing and the settlement processing on the customer side as above, but this does not mean the employee side cannot do anything. That is, even while operating in the full-self mode, the POS terminal 20 can, for example, scan an employee code with the employee-side scanner unit 212, display various information, and register a product. Note that a state (operation mode) wherein the registration processing is being executed on both the employee side and the customer side may be referred to as a double scan mode.

(Notification of Operation Mode)

Each POS terminal 20 may notify its current operation mode. For example, each POS terminal 20 may display its current operation mode on the employee-side display unit 210. Specifically, each POS terminal 20 may display a screen having an operation-mode display field for this terminal on the employee-side display unit 210 and display the current operation mode of this terminal in the operation-mode display field on this screen. Furthermore, each POS terminal 20 may display a screen disposed with images (for example, button-like images) corresponding to each operation mode on the employee-side display unit 210 and display the image corresponding to the current operation mode of this terminal on this screen in a display aspect that differs from the images not corresponding to the current operation mode (for example, a display aspect that stands out more than the display aspect of the other images). For example, the normal-mode image and the full-self-mode image may be continually displayed, the normal-mode image being displayed in a display aspect that stands out more than the full-self-mode image when the current operation mode of this terminal is the normal mode and the full-self-mode image being displayed in a display aspect that stands out more than the normal-mode image when the current operation mode of this terminal is the full-self mode. Note that each POS terminal 20 may similarly display its current operation mode on the customer-side display unit 205 as well.

Furthermore, each POS terminal 20 may notify the current operation mode of another terminal instead of or in addition to its own current operation mode. For example, the POS terminals 20 may notify the current operation mode of another terminal by mutually recognizing the current operation mode of the other terminal. One example of a method for the POS terminals 20 to mutually recognize the current operation mode of the other terminal is a method wherein each POS terminal 20 notifies the other terminal of a post-transition operation mode (the latest operation mode) after transitioning operation modes (directly notifies the other terminal via the LAN 11 or notifies the other terminal via the store controller 10 or the monitoring terminal (not illustrated)). Furthermore, each POS terminal 20 may notify a current processing status of another terminal similarly to the current operation mode of another terminal.

Furthermore, each POS terminal 20 may notify information according to its current operation mode or the like (operation mode, processing status, or the like). For example, when its current operation mode is the full-self mode, each POS terminal 20 may display a predetermined message (for example, see FIG. 7A) on the customer-side display unit 205 during, for example, standby. Furthermore, each POS terminal 20 may notify information according to the current operation mode or the like of another terminal instead of or in addition to the information according to its own current operation mode.

(Transitioning (Switching) Operation Modes)

Next, transitioning (switching) operation modes in the POS terminal 20 is described. The POS terminal 20 transitions operation modes according to an explicit mode transition operation (mode switching operation) by an employee. Specifically, the POS terminal 20 transitions operation modes according to an operation of a Switch Modes button 211a (see FIG. 3B) disposed in the uppermost row and rightmost edge of the key operation unit 211.

Note that the Switch Modes button 211a is disposed in a corner portion of the key operation unit 211. Thus, operation mistakes when transitioning modes can be reduced, and operation modes can be transitioned easily. That is, when the Switch Modes button 211a is present in a corner portion of the key operation unit 211, compared to when, for example, the Switch Modes button 211a is present near a center of the key operation unit 211, there are, for example, fewer other buttons adjacent to the Switch Modes button 211a that is the operation target. Thus, operation mistakes such as rushing and operating another button are less likely to occur, and a position of the Switch Modes button 211a that is the operation target can be instantly identified. This enables the mode transition operation to be performed without stress.

Furthermore, the Switch Modes button 211a is disposed in a corner portion of an upper-right edge (the uppermost row and rightmost edge) of the key operation unit 211. Thus, an employee can perform the mode transition operation not only when on the employee side but also when on the customer side. That is, an employee on the customer side cannot visually recognize each button of the key operation unit 211 without moving to the employee side but, for the Switch Modes button 211a present on the upper-right edge of the key operation unit 211, can easily recognize the Switch Modes button 211a that is the operation target merely by extending a hand from the customer side and feeling for the button (by touch of the hand). This enables the employee on the customer side to perform a mode switching operation without moving to the employee side.

Note that in one or more embodiments, the Switch Modes button 211a is disposed in the corner portion of the upper-right edge of the key operation unit 211, but the Switch Modes button 211a may be disposed in a position other than the corner portion of the upper-right edge of the key operation unit 211 as long as it is a position that can be recognized by merely feeling for it with one's hand (position that can be recognized with comparative ease). Furthermore, the Switch Modes button 211a may be formed to be distinguishable from other buttons even from the customer side instead of or in addition to disposing the Switch Modes button 211a in a position that can be recognized by merely feeling for it with one's hand (for example, the corner portion of the upper-right edge). For example, a size of the Switch Modes button 211a may be made to differ from a size of the other buttons to an extent of being distinguishable by merely feeling for it with one's hand. Furthermore, a shape of the Switch Modes button 211a may be made to differ from a shape of the other buttons to an extent of being distinguishable by merely feeling for it with one's hand. Furthermore, a height of the Switch Modes button 211a may be made to differ from a height of the other buttons to an extent of being distinguishable by merely feeling for it with one's hand (for example, the Switch Modes button 211a may be made to protrude more than the other buttons). Furthermore, a feel of an entirety or a portion of a surface (face touched by the hand) of the Switch Modes button 211a may be made to differ from a feel of the other buttons to an extent of being distinguishable by merely feeling for it with one's hand (for example, only the surface of the Switch Modes button 211a may be given a rough or bumpy feel, or only the surface of the Switch Modes button 211a may be provided with a projection or depression).

Note that in one or more embodiments, the Switch Modes button 211a is disposed in the key operation unit 211 in consideration of various advantages such as those above, but a Switch Modes button (not illustrated) may be disposed on a screen displayed on the employee-side display unit 210 instead of or in addition to disposing the Switch Modes Button 211a in the key operation unit 211.

Furthermore, the POS terminal 20 transitions operation modes according to another operation other than an explicit mode switching operation by an employee (for example, reading an employee code). Furthermore, the POS terminal 20 may transition operation modes based on a predetermined condition not dependent an employee operation or the like (such as a condition relating to time, such as an elapsed time or a predetermined time (schedule), or a condition relating to sending and receiving information such as commands with another terminal (POS terminal 20, monitoring terminal) or the like). Note that, as described above, when it transitions operation modes, the POS terminal 20 may notify another terminal of its post-transition operation mode.

In the description below, the POS terminal 20-1 and the POS terminal 20-2 are in the normal mode. Furthermore, the POS terminal 20-3 is in the full-self mode.

(Display Examples of POS Terminal 20)

Figure 7A:
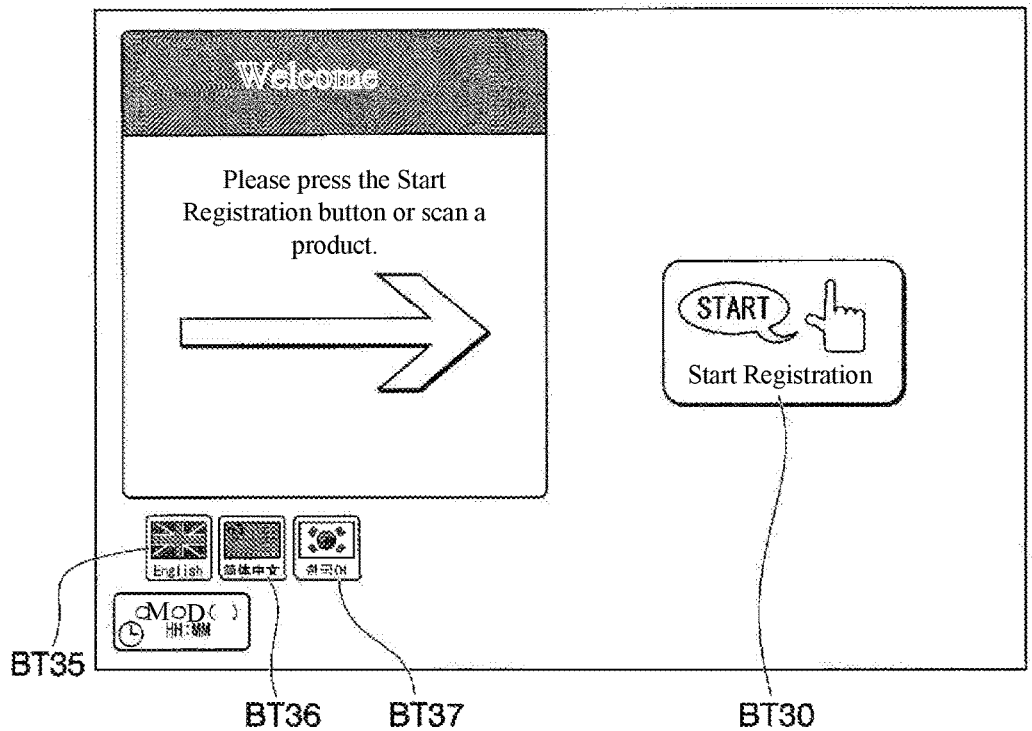
FIGS. 7A-7B each show a display example in the POS terminal according to one or more embodiments.

FIG. 7A to FIG. 24B are display examples in the POS terminal 20. FIG. 7A is a display example in the customer-side display unit 205 of the POS terminal 20-3 in the full-self mode. Specifically, FIG. 7A illustrates a display content of a registration start screen before starting the registration processing.

In FIG. 7A, the Start Registration button BT30 on the right in the screen is a button for instructing starting product registration. The customer operates the Start Registration button BT30 when starting product registration. Buttons BT35 to BT37 in the lower left in the screen are buttons for switching a display language to English, Chinese, and Korean, respectively.

Figure 7B:
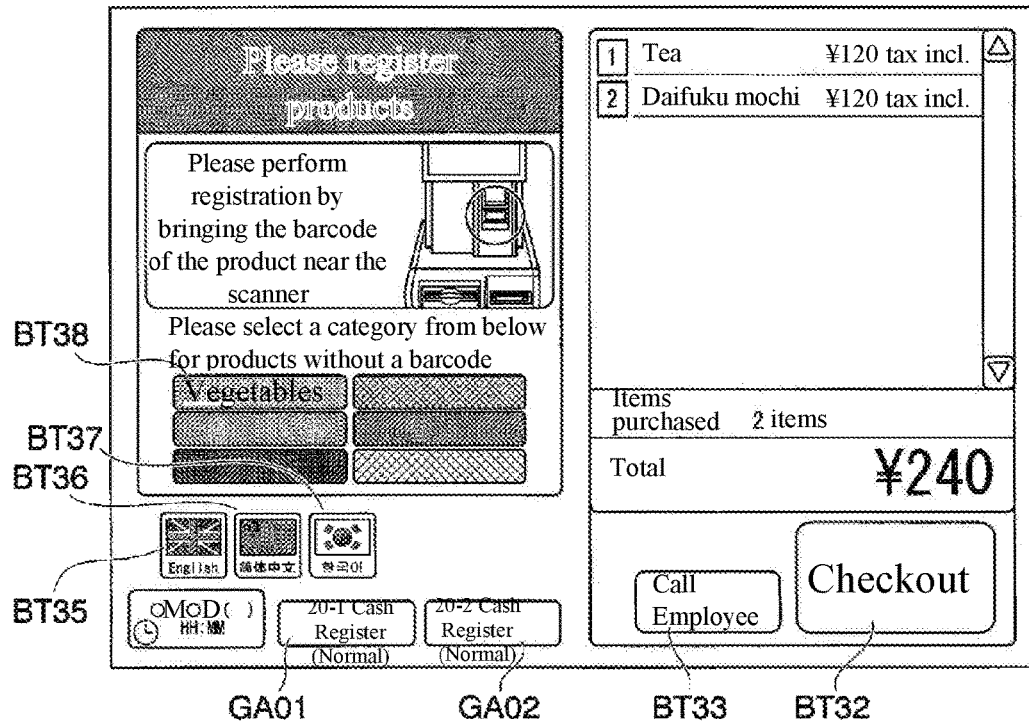

FIG. 7B is a display example in the customer-side display unit 205 of the POS terminal 20-3 in the full-self mode. Specifically, FIG. 7B illustrates a display content of a registration screen in a state wherein a second product (daifuku mochi) is registered. Note that when the Start Registration start button BT30 is operated in the registration start screen illustrated in FIG. 7A, the POS terminal 20-3 displays the registration screen in a state wherein not a single product is registered yet (registration screen in an initial state). However, for convenience in description, FIG. 7B illustrates the registration screen after products (tea, daifuku mochi) are already registered.

In FIG. 7B, the image GA01 in the lower left in the screen indicates a state of another terminal (POS terminal 20-1) (specifically, that it is in the normal mode). The image GA02 in the lower left in the screen indicates a state of another terminal (POS terminal 20-2) (specifically, that it is in the normal mode). The Checkout button BT32 in the lower right in the screen is a button for instructing ending product registration. The customer operates the Checkout button BT32 after product registration is completed. The Call Employee button BT33 is a button for calling the employee. The customer operates the Call Employee call button BT33 when calling the employee (for example, when support from the employee is necessary).

Note that as above, the buttons BT35 to BT37 are buttons for switching the display language to English, Chinese, and Korean, respectively. Moreover, the "Vegetable" button BT38 is a button for displaying preset keys for vegetables (see FIGS. 9A-9B).

Figure 8A:
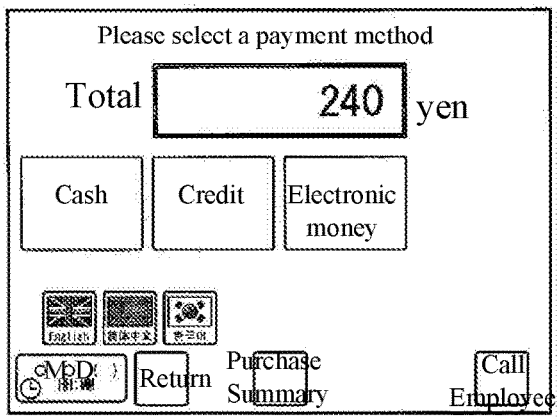
FIGS. 8A-8F each show a display example in the POS terminal according to one or more embodiments.

FIG. 8A is a display example in the customer-side display unit 205 of the POS terminal 20-3 in the full-self mode. Specifically, FIG. 8A illustrates a display content of a settlement screen that is displayed when starting the settlement processing (payment-method selection screen). For example, the POS terminal 20-3 displays a payment-method selection screen such as that illustrated in FIG. 8A when the Checkout button BT32 is operated in the registration screen (see FIG. 7B).

Figure 8D:
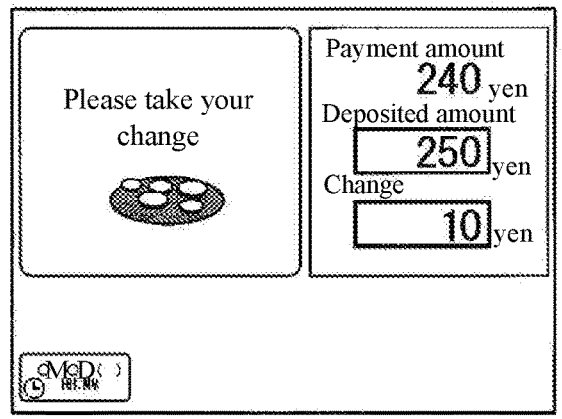
Figure 8B:
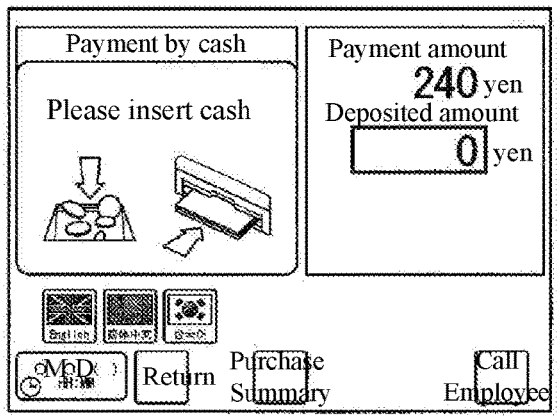

FIG. 8B is a display example in the customer-side display unit 205 of the POS terminal 20-3 in the full-self mode.

Specifically, FIG. 8B illustrates a display content of a settlement screen that is displayed when starting cash payment (deposit screen). For example, the POS terminal 20-3 displays a deposit screen such as that illustrated in FIG. 8B when a button whereby cash is selected is operated (pressed) in the payment-method selection screen (see FIG. 8A).

Figure 8E:
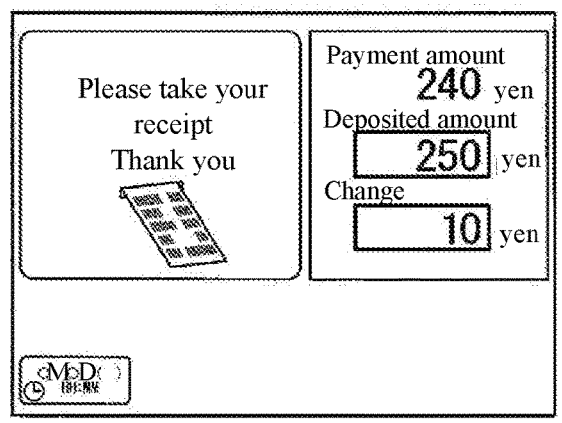
Figure 8C:
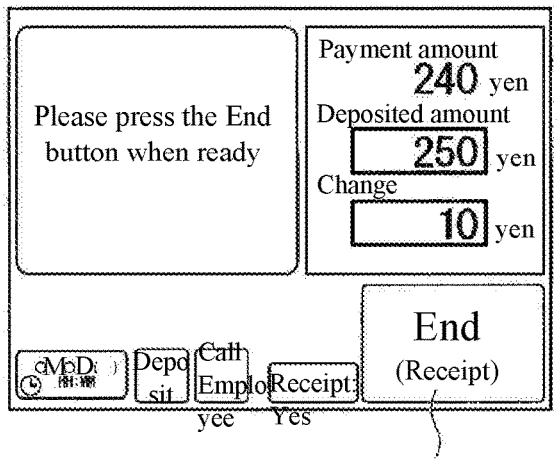

FIG. 8C is a display example in the customer-side display unit 205 of the POS terminal 20-3 in the full-self mode. Specifically, FIG. 8C illustrates a display content of a settlement screen that is displayed when determining a deposited amount (deposit screen). For example, the POS terminal 20-3 displays a deposit screen such as that illustrated in FIG. 8C when cash (deposited money) that is no less than a payment amount (purchase amount) is inserted.

FIG. 8D is a display example in the customer-side display unit 205 of the POS terminal 20-3 in the full-self mode. Specifically, FIG. 8D illustrates a display content of a settlement screen that is displayed when discharging change (change screen). For example, the POS terminal 20-3 displays a change screen such as that illustrated in FIG. 8D when the End (Receipt) button BT40 is operated in the deposit screen (FIG. 8C).

Figure 8F:
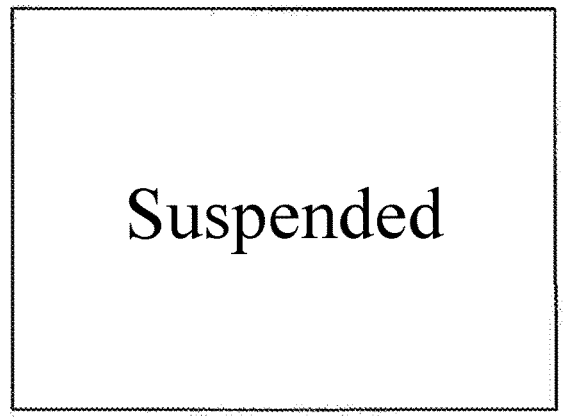

FIG. 8E is a display example in the customer-side display unit 205 of the POS terminal 20-3 in the full-self mode. Specifically, FIG. 8E illustrates a display content of a settlement screen that is displayed when the change is taken (receipt screen). For example, the POS terminal 20-3 displays a receipt screen such as that illustrated in FIG. 8E when the change is taken from an extraction port of the change machine 209. Note that the POS terminal 20 may dispose a sensor such as a photosensor near the extraction port and determine that the change is taken when this sensor recognizes an object (assumed to be the hand of the customer). FIG. 8F is a suspension screen that is displayed when a suspension mode (suspended state) is entered into.

Note that the POS terminal 20-3 displays the registration start screen (FIG. 7A) after displaying the receipt screen (FIG. 8E). For example, the POS terminal 20-3 displays the registration start screen after the receipt is taken from the issuing port of the printing unit 213. Note that the POS terminal 20 may be provided with a sensor that can recognize that the receipt is taken from the issuing port. Moreover, when no change is generated, a transition may be made from the deposit screen (FIG. 8C) to the receipt screen (FIG. 8E) without displaying the change screen (FIG. 8D).

Figure 9A:
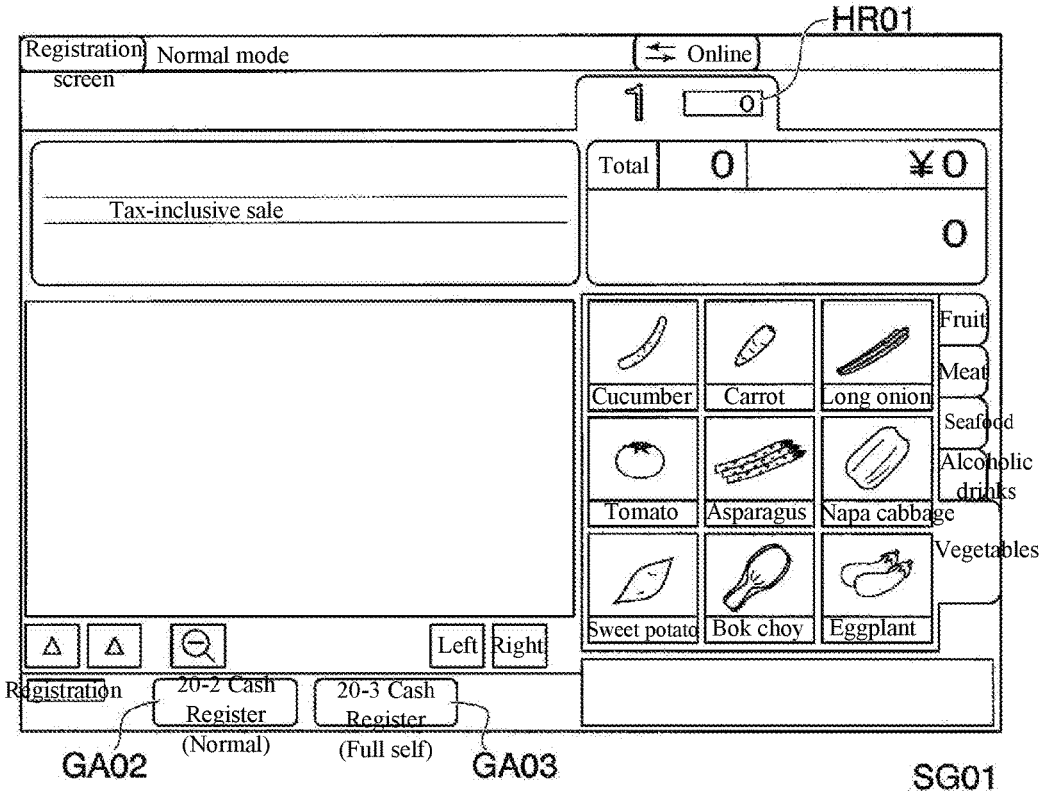
FIGS. 9A-9B each show a display example in the POS terminal according to one or more embodiments.

FIG. 9A is a display example in the employee-side display unit 210 of the POS terminal 20-1 in the normal mode. Specifically, FIG. 9A illustrates a display content of a registration screen in a state wherein not a single product is registered yet (registration screen in an initial state). In FIG. 9A, the display field HR01 in the upper right in the screen indicates the deposited amount from the customer. The image GA02 in the lower left in the screen indicates a state of another terminal (POS terminal 20-2) (specifically, that it is in the normal mode). The image GA03 in the lower left in the screen indicates a state of another terminal (POS terminal 20-3) (specifically, that it is in the full-self mode).

Figure 9B:
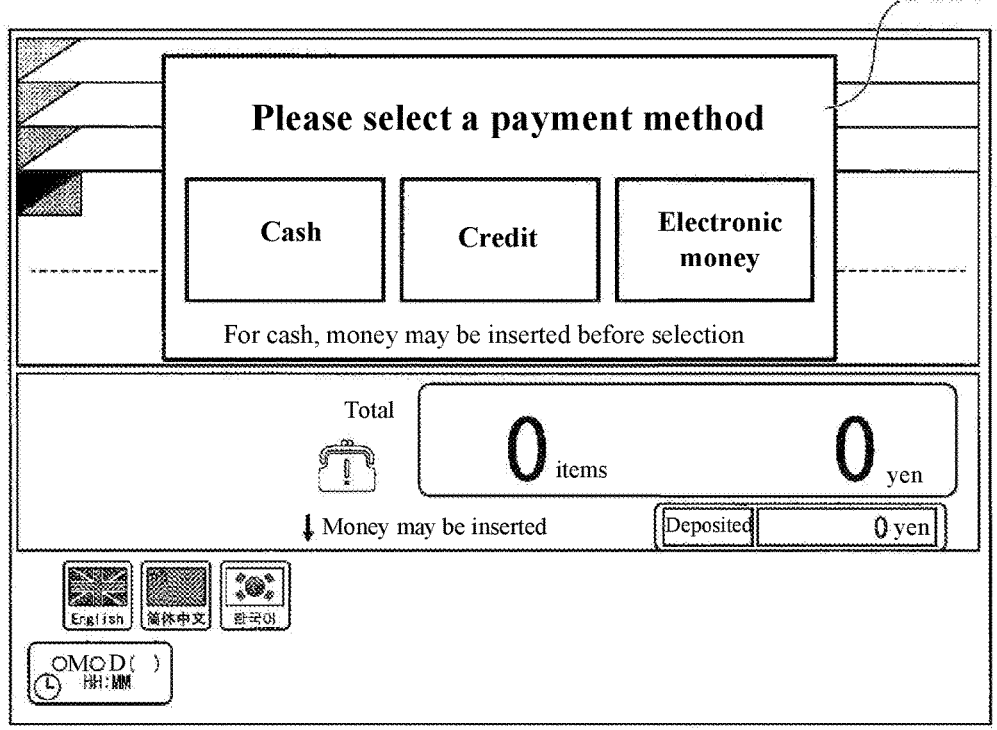

FIG. 9B is a display example in the customer-side display unit 205 of the POS terminal 20-1 in the normal mode. Specifically, FIG. 9B illustrates a display content in a state wherein not a single product is registered yet and no payment method is selected (determined) yet (state wherein no payment method is selected and no cash is inserted). That is, the POS terminal 20-1 displays the registration screen (registration screen in the initial state) as illustrated in FIG. 9A in the employee-side display unit 210 and, when no payment method is selected yet, displays the small screen (small window) SG01 as illustrated in FIG. 9B, superimposed on the settlement screen (deposit screen) in the customer-side display unit 205.

The small screen SG01 is for the customer to select the payment method. The customer selects any one among cash, credit, and electronic money as the payment method in the small screen SG01. Should they desire to use cash as the payment method, the customer may insert cash (deposited money) before selecting cash as the payment method in the small screen SG01. The POS terminal 20-1 erases the small screen SG01 when any one of the payment methods is selected in the small screen SG01. Moreover, when cash is inserted before the payment method is selected in the small screen SG01, the POS terminal 20-1 processes this as cash being selected as the payment method and erases the small screen SG01.

Figure 10A:
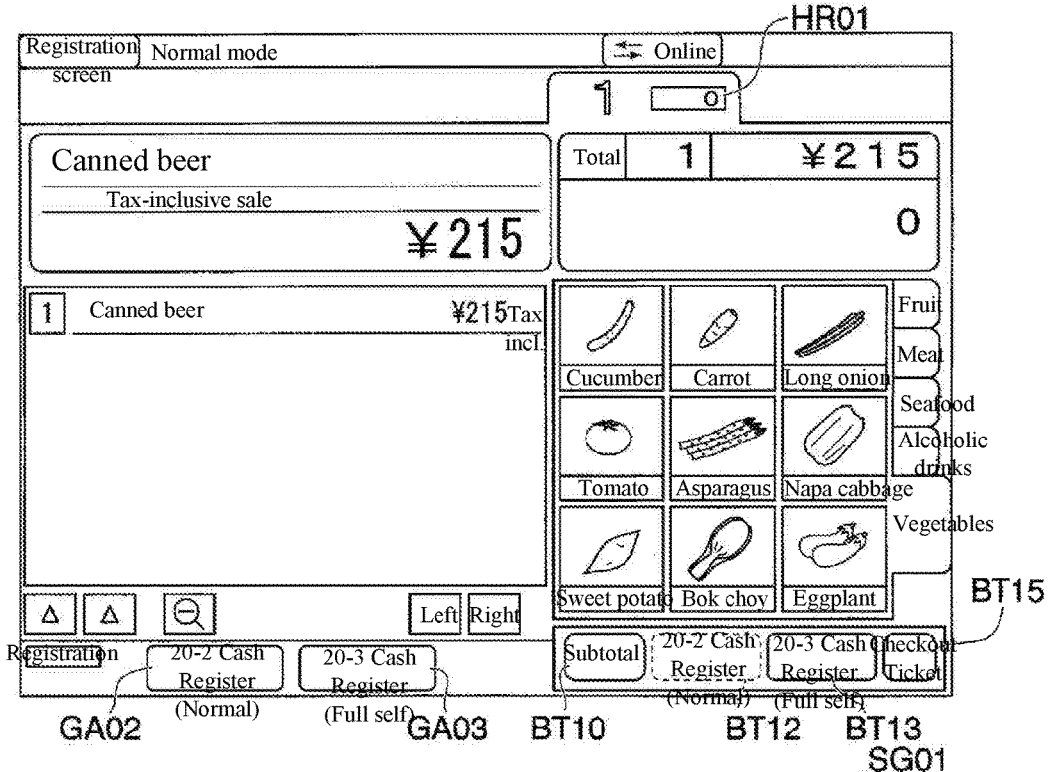
FIGS. 10A-10B each show a display example in the POS terminal according to one or more embodiments.

FIG. 10A is a display example in the employee-side display unit 210 of the POS terminal 20-1 in the normal mode. Specifically, FIG. 10A illustrates a display content of the registration screen when a first product (canned beer) is registered and no payment method is selected yet (when no payment method is selected and no cash is inserted). That is, when the employee registers canned beer from a state wherein the registration screen of FIG. 9A (registration screen in the initial state) is displayed on the employee-side display unit 210, the POS terminal 20-1 displays a registration screen such as that illustrated in FIG. 10A on the employee-side display unit 210.

In FIG. 10A, the Subtotal button BT10 in the lower right in the screen is a button for instructing ending product registration. The employee operates (touches) the Subtotal button BT10 after product registration is completed.

The 20-2 Cash Register button BT12 is a button for designating a 20-2 cash register (POS terminal 20-2). The employee operates the 20-2 Cash Register button BT12 when designating the POS terminal 20-2 as the terminal whereto the registration information is to be sent (including via the store controller 10; likewise hereinbelow). "(Normal)" indicated in the 20-2 Cash Register button BT12 indicates that the operation mode of the POS terminal 20-2 corresponding to the 20-2 Cash Register button BT12 is the normal mode.

The 20-3 Cash Register button BT13 is a button for designating a 20-3 cash register (POS terminal 20-3). The employee operates the 20-3 Cash Register button BT13 when designating the POS terminal 20-3 as the terminal whereto the registration information is to be sent. "(Full-self)" indicated in the 20-3 Cash Register button BT13 indicates that the operation mode of the POS terminal 20-3 corresponding to the 20-3 Cash Register button BT13 is the full-self mode.

The Checkout Ticket button BT15 is a button for issuing a checkout ticket from the printing unit 213. The employee operates the Checkout Ticket button BT15 to cause the POS terminal 20 that reads the checkout ticket (POS terminal 20 that is caused by the customer to read the checkout ticket) to execute the settlement processing.

In one or more embodiments, when the POS terminal 20 is to serve as the sending destination of the registration information, the POS terminal 20 in the full-self mode is preferable than the POS terminal 20 in the normal mode. This is because a POS terminal 20 in the normal mode is fundamentally operated with an employee being at the terminal (see FIG. 5A). As such, processes (such as the registration processing and customer interaction) are continuously present, and even if the registration information is sent thereto, there is a high possibility that this cannot be immediately processed. Moreover, even if the terminal is open (even if no employee or customer is at the terminal), this may be fundamentally left open in order to immediately respond to a customer desiring employee support in one or more embodiments. In contrast, a POS terminal 20 in the full-self mode can have the registration information sent thereto and immediately processed if there is no customer at the terminal. Even if a customer is at the terminal, it is sufficient to simply perform processing in order. This makes issues such as above less likely to occur.

That is, generally, a POS terminal 20 in the normal mode is in an employee usage state (state of being used by an employee), but a POS terminal 20 in the full-self mode is in an employee non-usage state (state of not being used by an employee). When the registration information is sent to a POS terminal 20 in the normal mode in the employee usage state, there is a fear of processing actually becoming delayed and inefficient. Therefore, a POS terminal 20 in the full-self mode in the employee non-usage state is more suited as the sending destination of the registration information than a POS terminal 20 in the normal mode in the employee usage state.

In view of the above, the employee is notified of whether a POS terminal 20 is preferable as the sending destination of the registration information or, which of a plurality of sending destinations of the registration information is preferable. As one example, FIG. 10A illustrates an outline portion of the 20-3 Cash Register button BT13 corresponding to the POS terminal 20-3 in the full-self mode that is preferable as the sending destination of the registration information with a solid line, and illustrates an outline portion of the 20-2 Cash Register button BT12 corresponding to the POS terminal 20-2 in the normal mode that is not preferable as the sending destination of the registration information with a dashed line. Note that the above notification by the outline portion is one example; a notification aspect is not limited as long as it enables the employee to recognize whether a POS terminal 20 is preferable as the sending destination of the registration information or, which of a plurality of sending destinations of the registration information is preferable. For example, the button for a terminal that is not preferable may be displayed in a grayed-down background color, or an X or a diagonal line may be added on the button overall. Moreover, a display size, a shape, and a display position of the button may be varied according to, for example, whether the POS terminal 20 is preferable as the sending destination of the registration information, and some type of information (such as a badge-like image with the word "Priority" or "Recommended" written thereon) may be added to the button.

Figure 18A:
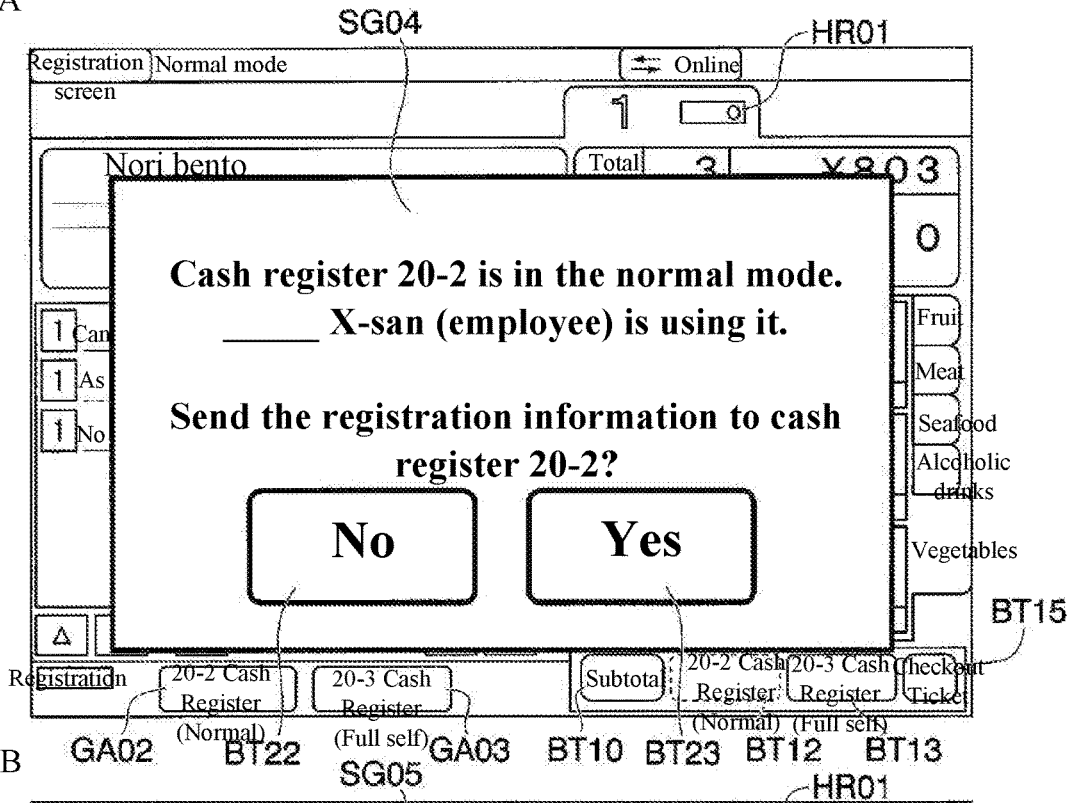
FIGS. 18A-18B each show a display example in the POS terminal according to one or more embodiments.
Figure 18B:
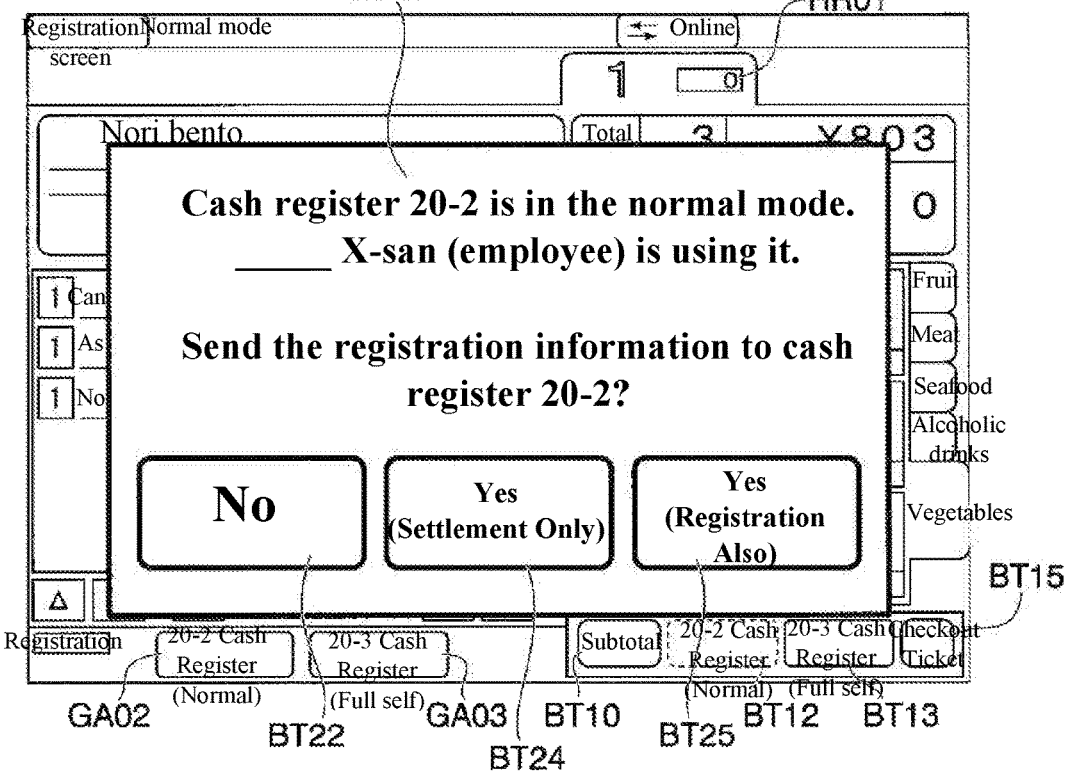

In view of the above and as detailed below, there is also a situation of prohibiting sending of the registration information to a POS terminal 20 in the normal mode (sending is prohibited when, for example, the "No button BT22" in FIG. 18A and FIG. 18B is operated). Prohibiting sending of the registration information to a POS terminal 20 in the normal mode in the employee usage state prevents inefficiency and enables efficient processing overall.

Furthermore, as detailed below, there is also a situation of canceling the prohibition of sending the registration information to a POS terminal 20 in the normal mode (prohibition is canceled when, for example, the "Yes button BT23" in FIG. 18A or the "Yes (Settlement Only) button BT24" or the "Yes (Registration Also) button BT25" in FIG. 18B is operated). For example, the prohibition of sending the registration information to a POS terminal 20 in the normal mode is canceled in a situation wherein sending the registration information to a POS terminal 20 in the normal mode is not inefficient and in a situation wherein not sending the registration information to a POS terminal 20 in the normal mode is actually inefficient. This enables the registration information to be sent as appropriate, which enables efficient processing. Note that the situation wherein sending the registration information to a POS terminal 20 in the normal mode is not inefficient is, for example, a situation wherein an employee is at the terminal but the registration information can be immediately processed if sent or a situation wherein no employee is actually at the terminal. The situation wherein not sending the registration information to a POS terminal 20 in the normal mode is actually inefficient is, for example, a situation wherein, due to a hardware or software failure, insufficient change, or the like, the terminal cannot perform cash settlement; a situation wherein, due to a hardware or software failure, running out of paper, or the like, the terminal cannot issue a receipt; or a situation wherein, due to a hardware or software failure or not yet handling the transaction, settlement by a specific transaction type (such as a credit-card transaction or an electronic-money transaction) cannot be performed.

Figure 10B:
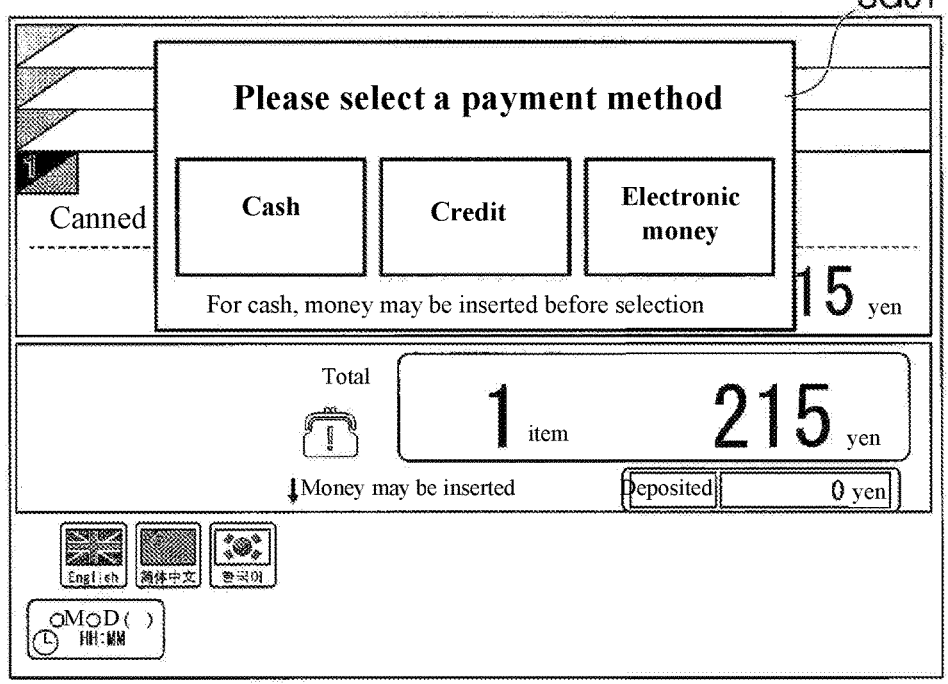

FIG. 10B is a display example in the customer-side display unit 205 of the POS terminal 20-1 in the normal mode. When displaying a registration screen such as that illustrated in FIG. 10A on the employee-side display unit 210, the POS terminal 20-1 displays the small screen SG01 as illustrated in FIG. 10B, superimposed on the settlement screen (deposit screen) in the customer-side display unit 205. Note that although the total amount in the settlement screen (deposit screen) of FIG. 9B is 0 yen because no product is registered, the total amount in the settlement screen (deposit screen) of FIG. 10B is 215 because canned beer that costs 215 yen is registered.

Figure 11A:
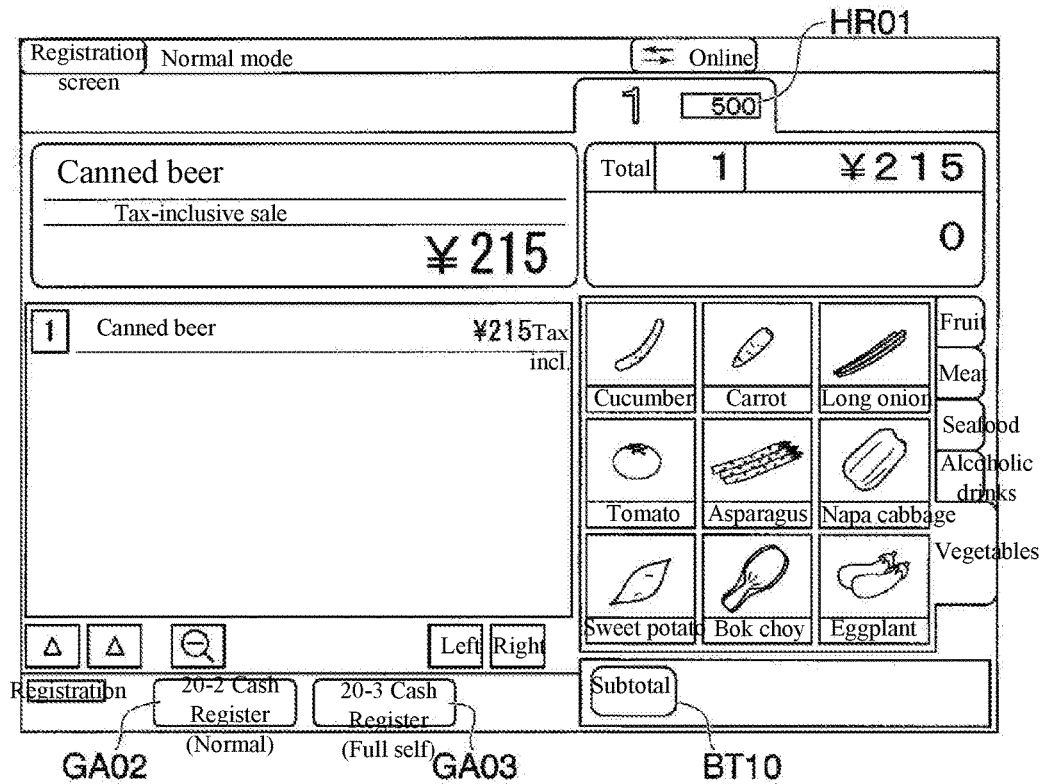
FIGS. 11A-11B each show a display example in the POS terminal according to one or more embodiments.

FIG. 11A is a display example in the employee-side display unit 210 of the POS terminal 20-1 in the normal mode. Specifically, FIG. 11A illustrates a display content of the registration screen when the first product (canned beer) is registered and 500 yen is inserted. That is, the POS terminal 20-1 displays a registration screen such as that illustrated in FIG. 11A on the employee-side display unit 210 when the customer inserts 500 yen from a state wherein the registration screen of FIG. 10A is displayed on the employee-side display unit 210.

Because the customer inserts 500 yen, in FIG. 11A, 500 is displayed in the display field HR01 in the upper right in the screen. Moreover, due to the 500 yen being inserted, settlement processing is performed in this terminal (POS terminal 20-1). As such, buttons used when performing settlement processing in another terminal (POS terminal 20-2, POS terminal 20-3) (20-2 Cash Register button BT12, 20-3 Cash Register button BT13, Checkout Ticket button BT15) are not displayed (are erased).

Figure 11B:
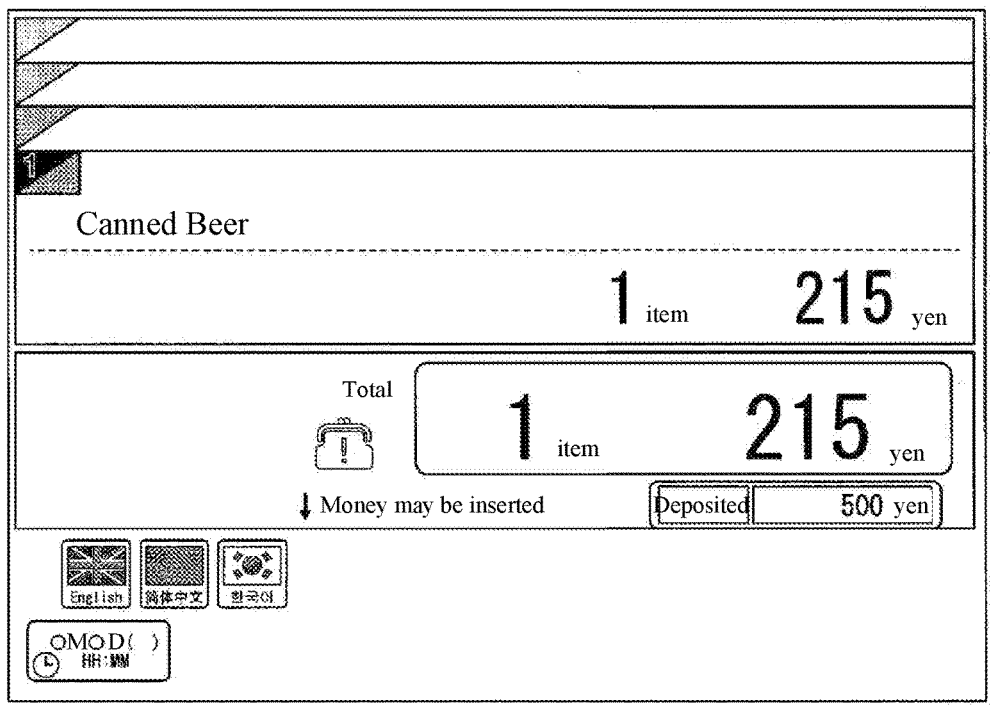

FIG. 11B is a display example in the customer-side display unit 205 of the POS terminal 20-1 in the normal mode. When displaying a registration screen such as that illustrated in FIG. 11A on the employee-side display unit 210, the POS terminal 20-1 displays the settlement screen (deposit screen) on the customer-side display unit 205 as illustrated in FIG. 11B. Note that because 500 yen is inserted by the customer, the small screen SG01 is erased.

Figure 12A:
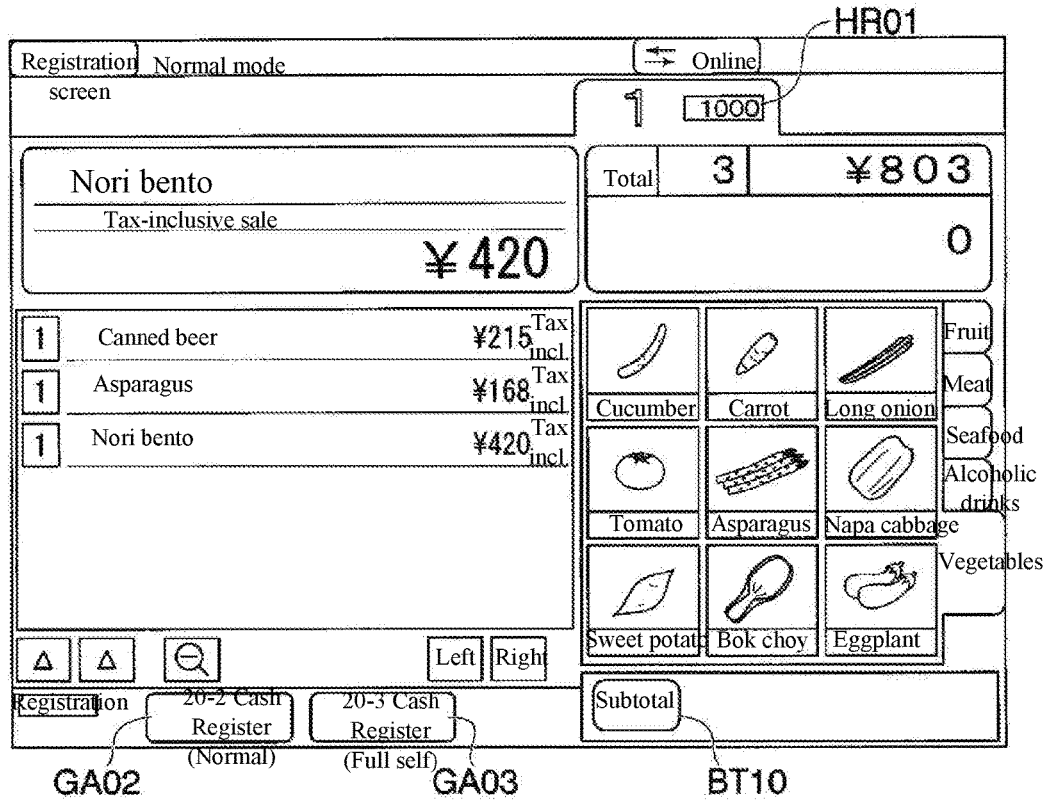
FIGS. 12A-12B each show a display example in the POS terminal according to one or more embodiments.

FIG. 12A is a display example in the employee-side display unit 210 of the POS terminal 20-1 in the normal mode. Specifically, FIG. 12A illustrates a display content of the registration screen when a third product (nori bento) is registered and an additional 500 yen is inserted. That is, the POS terminal 20-1 displays a registration screen such as that illustrated in FIG. 12A on the employee-side display unit 210 when, from a state wherein the registration screen of FIG. 11A is displayed on the employee-side display unit 210, the employee registers a second product (asparagus) and the third product (nori bento) and the customer inserts 500 more yen. Because the customer inserts the additional 500 yen, in FIG. 12A, 1,000 is displayed in the display field HR01 in the upper right in the screen.

Figure 12B:
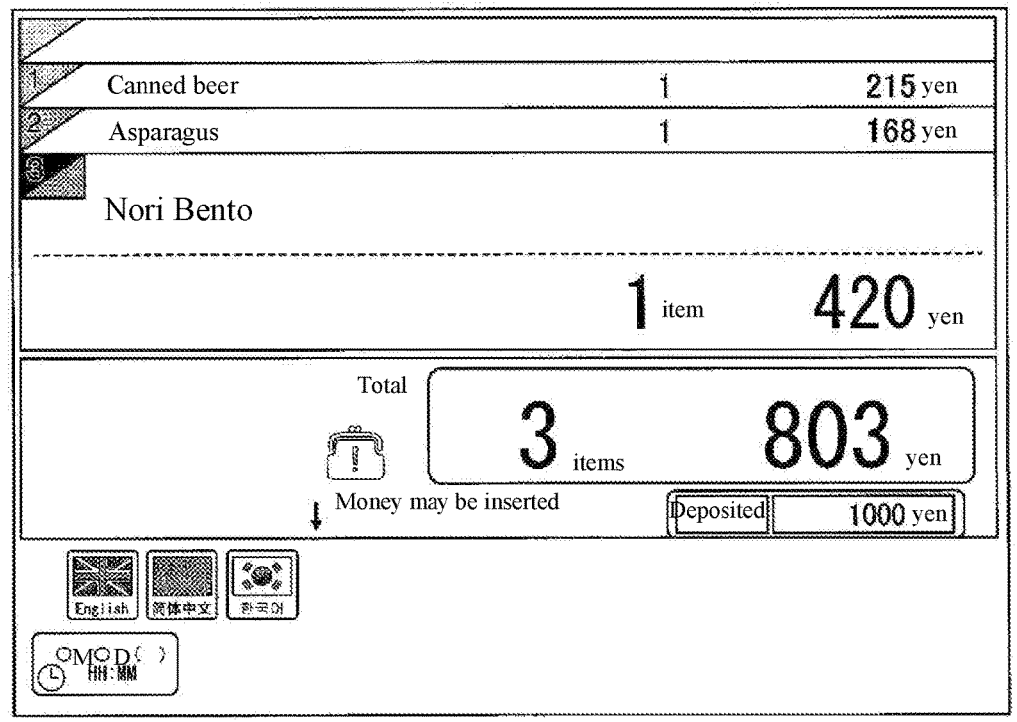

FIG. 12B is a display example in the customer-side display unit 205 of the POS terminal 20-1 in the normal mode. When displaying a registration screen such as that illustrated in FIG. 12A on the employee-side display unit 210, the POS terminal 20-1 displays the settlement screen (deposit screen) on the customer-side display unit 205 as illustrated in FIG. 12B.

Figure 13A:
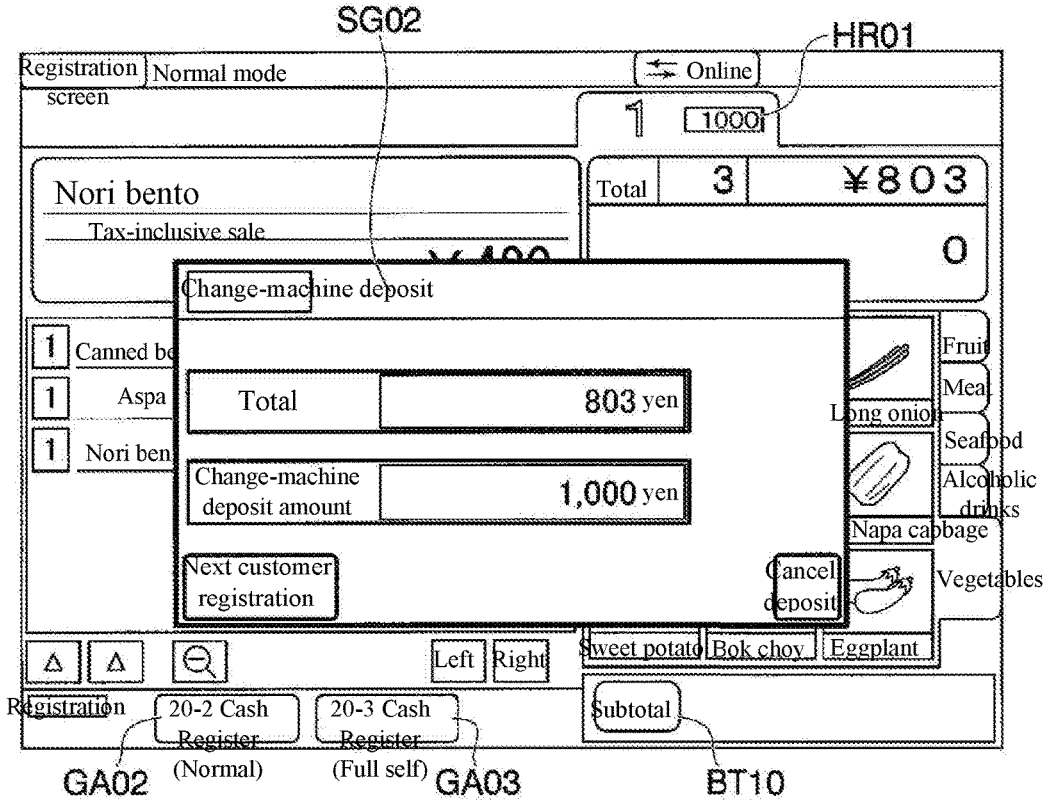
FIGS. 13A-13B each show a display example in the POS terminal according to one or more embodiments.
Figure 13B:
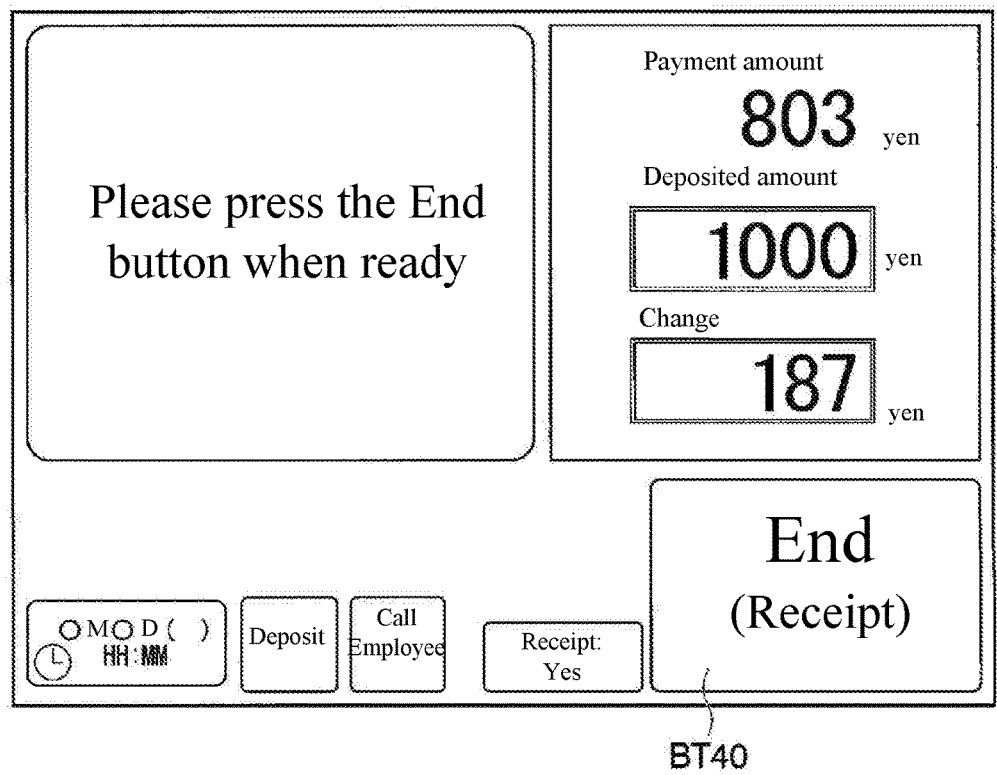

FIG. 13B is described before describing FIG. 13A. FIG. 13B is a display example in the customer-side display unit 205 of the POS terminal 20-1 in the normal mode. Specifically, FIG. 13B illustrates a display content of the settlement screen that is displayed when determining the deposited amount (deposit screen). That is, the POS terminal 20-1 displays a settlement screen (deposit screen) such as that illustrated in FIG. 13B on the customer-side display unit 205 when the employee operates the Subtotal button BT10 from a state wherein the registration screen of FIG. 12A is displayed on the employee-side display unit 210.

FIG. 13A is a display example in the employee-side display unit 210 of the POS terminal 20-1 in the normal mode. When displaying a settlement screen such as that illustrated in FIG. 13B on the customer-side display unit 205, the POS terminal 20-1 displays the small screen (small window) SG02 as illustrated in FIG. 13A, superimposed on the registration screen in the employee-side display unit 210. The small screen SG02 notifies the employee of settlement-related information (total amount, amount deposited into machine (deposited amount)).

Figure 14A:
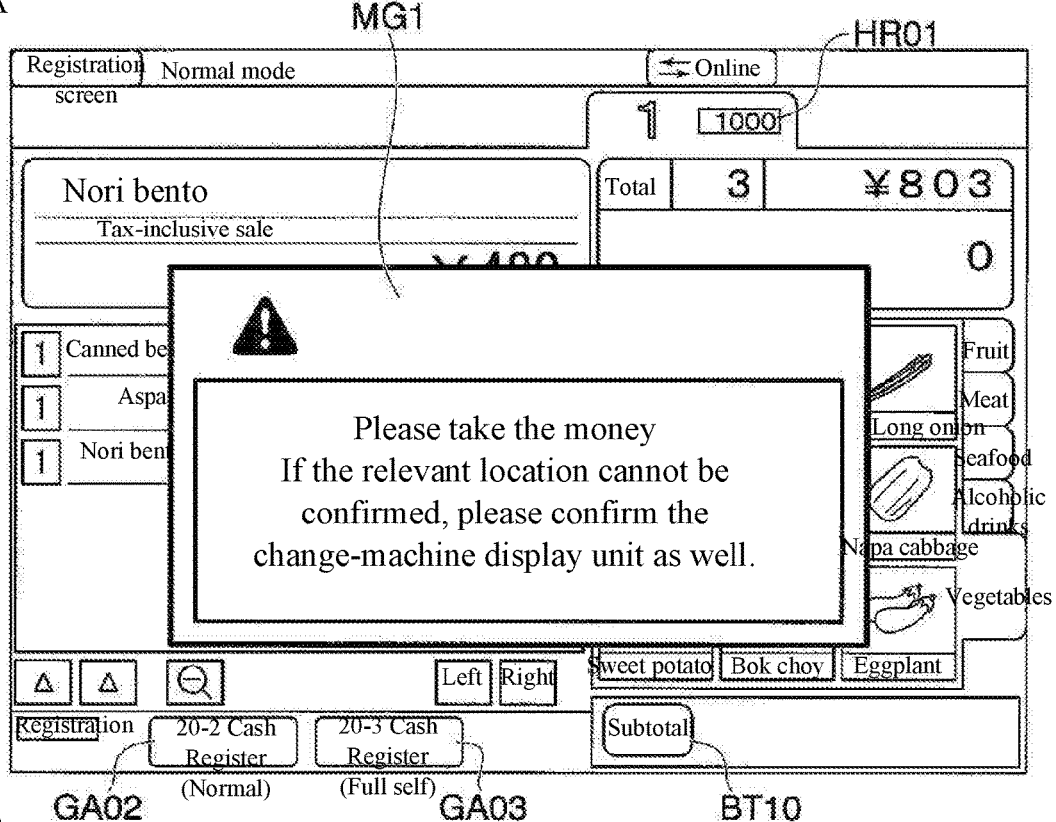
FIGS. 14A-14B each show a display example in the POS terminal according to one or more embodiments.
Figure 14B:
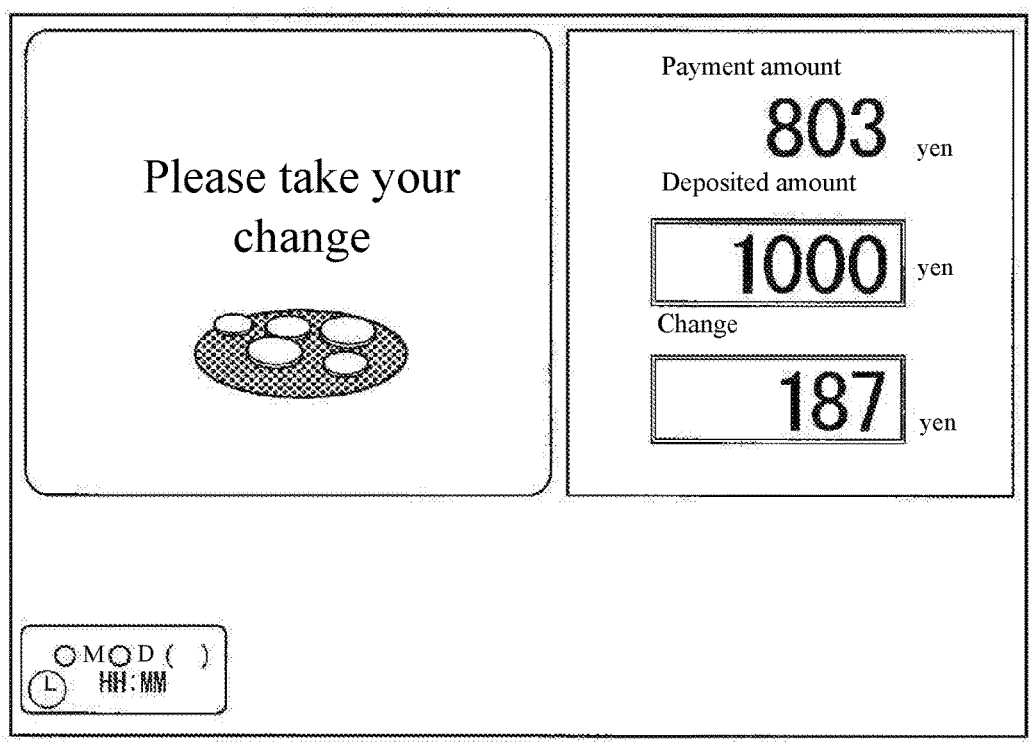

FIG. 14B is described before describing FIG. 14A. FIG. 14B is a display example in the customer-side display unit 205 of the POS terminal 20-1 in the normal mode. Specifically, FIG. 14B illustrates a display content of the settlement screen that is displayed when discharging change (change screen). That is, the POS terminal 20-1 displays a settlement screen (change screen) such as that illustrated in FIG. 14B on the customer-side display unit 205 when the customer operates the End (Receipt) button BT40 from a state wherein the settlement screen (deposit screen) of FIG. 13B is displayed on the customer-side display unit 205.

FIG. 14A is a display example in the employee-side display unit 210 of the POS terminal 20-1 in the normal mode. When displaying a settlement screen (change screen) such as that illustrated in FIG. 14B on the customer-side display unit 205, the POS terminal 20-1 displays the message screen MG1 as illustrated in FIG. 14A, superimposed on the registration screen in the employee-side display unit 210. The message screen MG1 notifies the employee of a change-related message.

Illustration past FIGS. 14A-14B is omitted, but the customer-side display unit 205 displays a settlement screen (receipt screen) similar to that of FIG. 8E on the customer-side display unit 205 and displays a message according to the settlement screen (receipt screen) on the employee-side display unit 210.

(Sending Registration Information)

Next, another flow is described. FIG. 15A is a display example in the employee-side display unit 210 of the POS terminal 20-1 in the normal mode. Specifically, FIG. 15A illustrates a display content of the registration screen when no payment method is selected (determined) yet (when no payment method is selected and no cash is inserted) at the point in time of FIG. 12A (when the third product is registered).

Because no cash is inserted yet, in FIG. 15A, 0 is displayed in the display field HR01 in the upper right in the screen. Moreover, because there is a possibility of settlement processing in this terminal (POS terminal 20-1) and a possibility of settlement processing in another terminal (POS terminal 20-2, POS terminal 20-3), the button used when performing settlement processing in this terminal (Subtotal button BT10) and the buttons used when performing settlement processing in another terminal (20-2 Cash Register button BT12, 20-3 Cash Register button BT13, Checkout Ticket button BT15) are displayed.

FIG. 15B is a display example in the customer-side display unit 205 of the POS terminal 20-1 in the normal mode. When displaying a registration screen such as that illustrated in FIG. 15A on the employee-side display unit 210, the POS terminal 20-1 displays the small screen SG01 as illustrated in FIG. 15B, superimposed on the settlement screen (deposit screen) in the customer-side display unit 205.

Figure 16A:
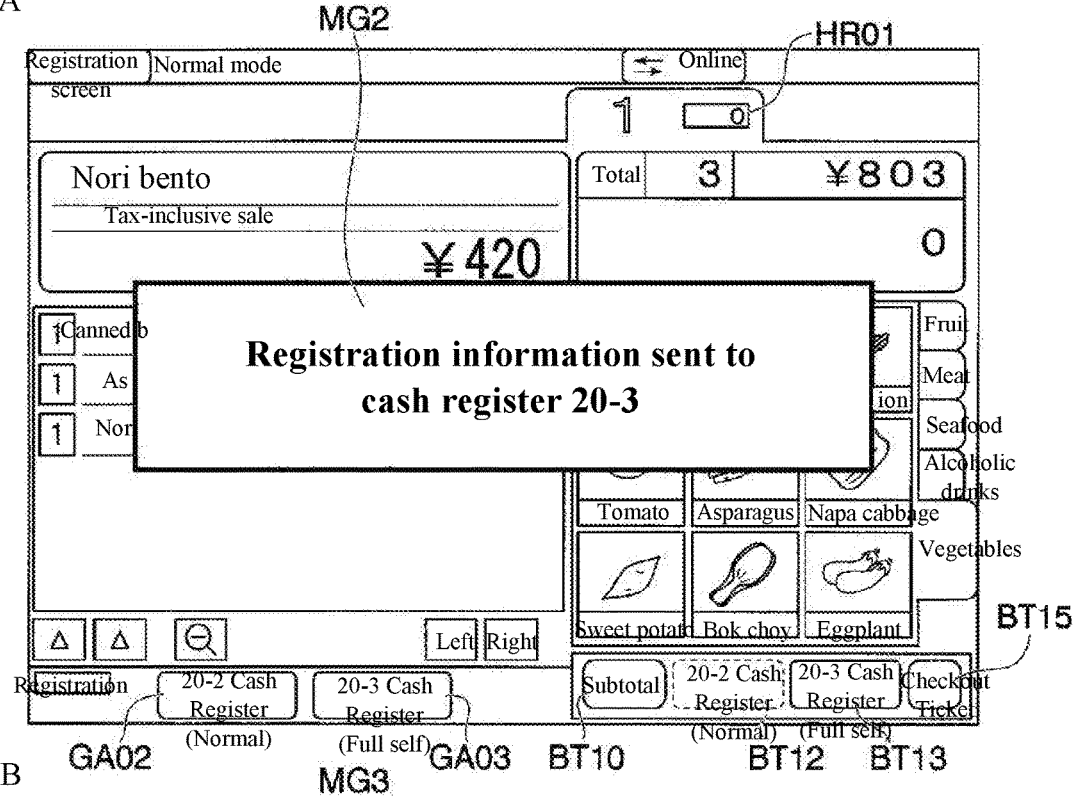
FIGS. 16A-16B each show a display example in the POS terminal according to one or more embodiments.

FIG. 16A is a display example in the employee-side display unit 210 of the POS terminal 20-1 in the normal mode. The POS terminal 20-1 displays a message screen MG2 such as that illustrated in FIG. 16A on the employee-side display unit 210 when the employee operates the 20-3 Cash Register button BT13 (that is, when the POS terminal 20-3 in the full-self mode is designated) from the state illustrated in FIG. 15A. The message screen MG2 notifies the employee that the registration information is sent to this designated terminal (POS terminal 20-3). Note that the POS terminal 20-1 may erase the message screen MG2 and display the registration screen (registration screen in the initial state) once some time has passed after displaying the message screen.

Figure 16B:
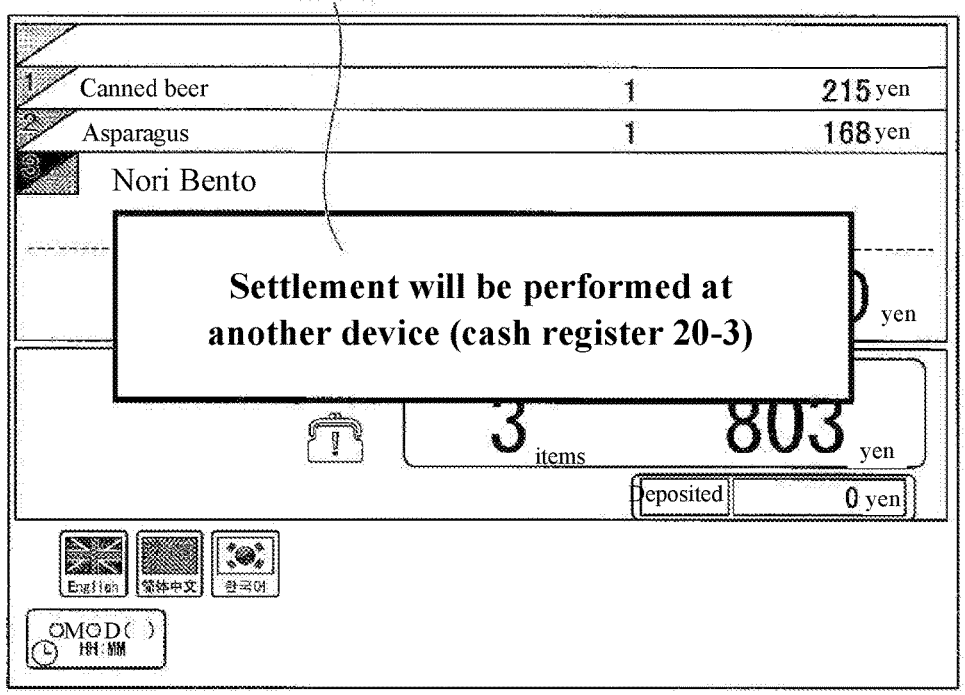

FIG. 16B is a display example in the customer-side display unit 205 of the POS terminal 20-1 in the normal mode. When displaying the message screen MG2 on the employee-side display unit 210 as illustrated in FIG. 16A, the POS terminal 20-1 displays the message screen MG3 as illustrated in FIG. 16B, superimposed on the settlement screen (deposit screen) in the customer-side display unit 205. The message screen MG3 notifies the customer that settlement processing is to be performed in another terminal (specifically, the POS terminal 20-3 that is the designated terminal) (in other words, that it is desired of the customer to move to another terminal for settlement processing). Note that operations (such as inserting cash) cannot be performed while the message screen MG3 is displayed. Moreover, the POS terminal 20-1 may erase the message screen MG3 and display a settlement screen (payment-method selection screen) such as that illustrated in FIG. 9B once some time has passed after displaying the message screen.

Figure 17A:
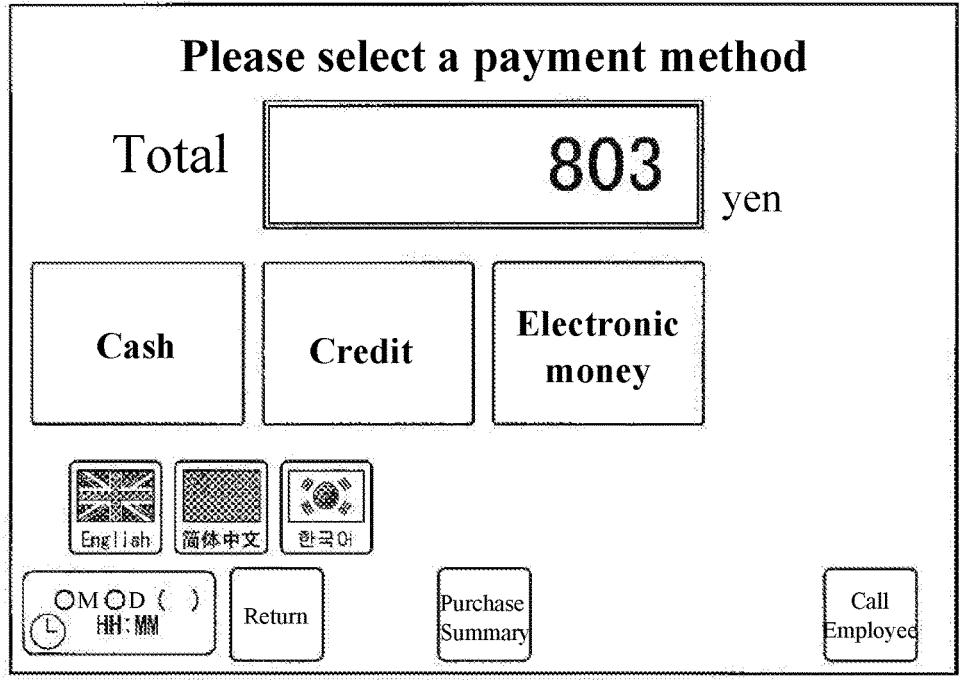
FIGS. 17A-17B each show a display example in the POS terminal according to one or more embodiments.

FIG. 17A is a display example in the customer-side display unit 205 of the POS terminal 20-3 in the full-self mode. Specifically, FIG. 17A illustrates a display content of a settlement screen when the registration information is acquired from another terminal. That is, the POS terminal 20-3 that receives the registration information—this registration information being sent to the POS terminal 20-3 by the POS terminal 20-1—displays the settlement screen (payment-method selection screen) on the customer-side display unit 205 as illustrated in FIG. 17A. Note that if the registration information is received during operations of another customer, the POS terminal 20-3 may display the settlement screen (payment-method selection screen) after the processing of this other customer ends.

(Registration Processing on Designated-Terminal Side)

When the registration information is sent to another terminal, on a designated-terminal side that is a receiving side of this registration information, the settlement processing may be executed without performing the registration processing. Alternatively, the registration processing may be further executed on the designated-terminal side that is the receiving side of this registration information. In terms of the above example, when registration information wherein three items (canned beer, asparagus, nori bento) are registered on a normal-mode POS-terminal 20-1 side is sent to the POS terminal 20-3 in the full-self mode (see FIGS. 16A-16B), on a full-self-mode POS-terminal 20-3 side, the settlement processing may be immediately started using this registration information on the three items (see FIG. 17A) or, instead of immediately starting the settlement processing, a fourth or subsequent item may be additionally registered.

Figure 17B:
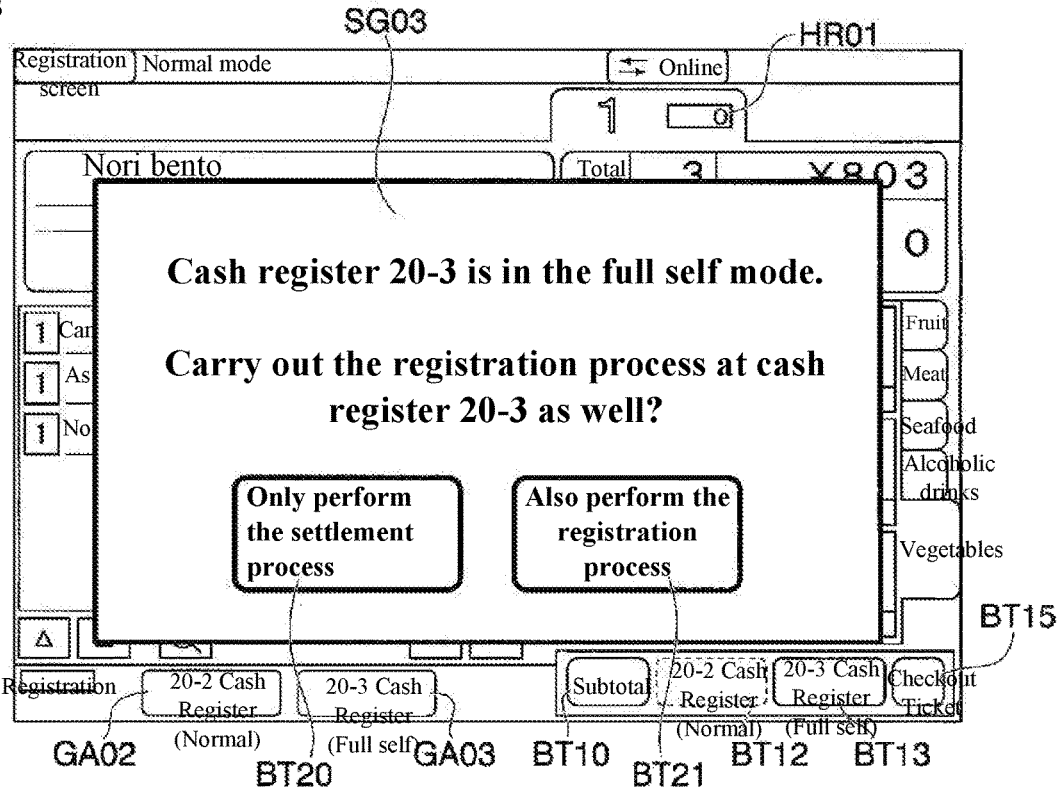

FIG. 17B is a display example in the employee-side display unit 210 of the POS terminal 20-1 in the normal mode. Before displaying a message screen MG2 such as that illustrated in FIG. 16A on the employee-side display unit 210, the POS terminal 20-1 may display the small screen (small window) SG03 as illustrated in FIG. 17B, superimposed on the registration screen in the employee-side display unit 210. That is, a small screen SG03 such as that illustrated in FIG. 17B may be displayed when the employee operates the 20-3 Cash Register button BT13 (that is, when the POS terminal 20-3 in the full-self mode is designated) from the state illustrated in FIG. 15A.

The small screen SG03 of FIG. 17B notifies the employee that the operation mode of this designated terminal (POS terminal 20-3) is the full-self mode and causes the sending-side employee to select whether to only perform the settlement processing, without performing the registration processing, in this designated terminal based on the registration information or to also perform the registration processing in this designated terminal based on the registration information. That is, the employee at the POS terminal 20-1 operates the "Only Perform Settlement Process button BT20" to only perform the settlement processing, without performing the registration processing, in this designated terminal based on the registration information and operates the "Also Perform Registration Process button BT21" to also perform the registration processing in this designated terminal. Note that during display of the small screen SG03, operations on the small screen SG03 ("Only Perform Settlement Process button BT20," "operation of Also Perform Registration Process button BT21") are prioritized, and other operations (operations on the registration screen, product registration, and the like) cannot be performed. Note that a return button (button for returning to the state illustrated in FIG. 15A when operated) may be provided in the small screen SG03.

When the "Only Perform Settlement Process button BT20" of the small screen SG03 of FIG. 17B is operated, the POS terminal 20-1 erases the small screen SG03 and sends the registration information to the designated terminal (POS terminal 20-3) so that this designated terminal starts from the settlement processing. As an aspect of sending the registration information so that the designated terminal starts from the settlement processing, various aspects are conceivable. For example, the POS terminal 20-1 may send the registration information to the designated terminal in an aspect whereby the designated-terminal side can recognize (determine) that it is to start from the settlement processing. As one example, the POS terminal 20-1 may send registration information added with information (a flag) indicating starting from the settlement processing to the designated terminal. Moreover, the POS terminal 20-1 may send the registration information to the designated terminal together with information (a flag) indicating starting from the settlement processing.

When the "Also Perform Registration Process button BT21" of the small screen SG03 of FIG. 17B is operated, the POS terminal 20-1 erases the small screen SG03 and sends the registration information to the designated terminal (POS terminal 20-3) so that this designated terminal starts from the registration processing. As an aspect of sending the registration information so that the designated terminal starts from the registration processing, various aspects are conceivable. For example, the POS terminal 20-1 may send the registration information to the designated terminal in an aspect whereby the designated-terminal side can recognize (determine) that it is to start from the registration processing. As one example, the POS terminal 20-1 may send registration information added with information (a flag) indicating starting from the registration processing to the designated terminal. Moreover, the POS terminal 20-1 may send the registration information to the designated terminal together with information (a flag) indicating starting from the registration processing.

Note that in any one situation among the situation of causing the designated terminal to start from the settlement processing and the situation of causing the designated terminal to start from the registration processing, the POS terminal 20-1 may send registration information added with information (a flag) for recognizing whether to start from the settlement processing or start from the registration processing on the designated-terminal side or send the registration information together with this information. Here, on the designated-terminal side, whether to start from the settlement processing or start from the registration processing is recognized based on a presence or absence of receiving the information (the flag) for recognizing whether to start from the settlement processing or start from the registration processing on the designated-terminal side.

In an aspect of displaying a small screen SG03 such as that illustrated in FIG. 17B when the employee operates the 20-3 Cash Register button BT13 (that is, when the POS terminal 20-3 in the full-self mode is designated) from the state illustrated in FIG. 15A, the POS terminal 20-1 may display a message screen MG2 such as that illustrated in FIG. 16A on the employee-side display unit 210 after the registration information is sent to the designated terminal based on the "Only Perform Settlement Process button BT20" or the "Also Perform Registration Process button BT21" of the small screen SG03 being operated.

FIG. 18A is a display example in the employee-side display unit 210 of the POS terminal 20-1 in the normal mode. The POS terminal 20-1 displays a small screen (small window) SG04 such as that illustrated in FIG. 18A on the employee-side display unit 210 when the employee operates the 20-2 Cash Register button BT12 (that is, when the POS terminal 20-2 in the normal mode is designated) from the state illustrated in FIG. 15A.

The small screen SG04 of FIG. 18A notifies the employee that the operation mode of this designated terminal (POS terminal 20-2) is the normal mode and that this designated terminal is in use by another employee and causes the sending-side employee to select whether to not send the registration information to this designated terminal or to send the registration information to this designated terminal. That is, the employee at the POS terminal 20-1 operates the "No button BT22" to not send the registration to this designated terminal and operates the "Yes button BT23" to send the registration information to this designated terminal. Note that during display of the small screen SG04, operations on the small screen SG04 ("No button BT22," "operation of Yes button BT23") are prioritized, and other operations (operations on the registration screen, product registration, and the like) cannot be performed.

When the "No button BT22" of the small screen SG04 of FIG. 18A is operated, the POS terminal 20-1 simply erases the small screen SG04 (returns to the state of FIG. 15A). That is, no registration information is sent to the designated terminal (POS terminal 20-2).

When the "Yes button BT23" of the small screen SG04 of FIG. 18A is operated, the POS terminal 20-1 erases the small screen SG04 and sends the registration information to the designated terminal (POS terminal 20-2) so that this designated terminal starts from the settlement processing, similarly to when the "Only Perform Settlement Process button BT20" of the small screen SG03 of FIG. 17B is operated.

FIG. 18B is a display example in the employee-side display unit 210 of the POS terminal 20-1 in the normal mode. The POS terminal 20-1 may display the small screen (small window) SG05 illustrated in FIG. 18B on the employee-side display unit 210 instead of the small screen SG04 illustrated in FIG. 18A.

The small screen SG05 of FIG. 18B notifies the employee that the operation mode of this designated terminal (POS terminal 20-2) is the normal mode and that this designated terminal is in use by another employee and causes the sending-side employee to select whether to send the registration information to this designated terminal and whether to also perform the registration processing in the designated terminal. That is, the employee at the POS terminal 20-1 operates the "No button BT22" to not send the registration information to this designated terminal; operates the "Yes (Settlement Only) button BT24" to send the registration information to this designated terminal and cause this designated terminal to only perform the settlement processing, without performing the registration processing, based on the registration information; and operates the "Yes (Registration Also) button BT25" to send the registration information to this designated terminal and cause this designated terminal to also perform the registration processing. Note that during display of the small screen SG05, operations on the small screen SG05 (operations of the "No button BT22," the "Yes (Settlement Only) button BT24," and the "Yes (Registration Also) button BT25") are prioritized, and other operations (operations on the registration screen, product registration, and the like) cannot be performed.

When the "No button BT22" of the small screen SG05 of FIG. 18B is operated, the POS terminal 20-1 simply erases the small screen SG05, similarly to when the "No button BT22" of the small screen SG04 of FIG. 18A is operated. That is, no registration information is sent to the designated terminal (POS terminal 20-2).

When the "Yes (Settlement Only) button BT24" of the small screen SG05 of FIG. 18B is operated, the POS terminal 20-1 erases the small screen SG05 and sends the registration information to the designated terminal (POS terminal 20-2) so that this designated terminal starts from the settlement processing, similarly to when the "Only Perform Settlement Process button BT20" of the small screen SG03 of FIG. 17B is operated.

When the "Yes (Registration Also) button BT25" of the small screen SG05 of FIG. 18B is operated, the POS terminal 20-1 erases the small screen SG05 and sends the registration information to the designated terminal (POS terminal 20-2) so that this designated terminal starts from the registration processing, similarly to when the "Also Perform Registration Process button BT21" of the small screen SG03 of FIG. 17B is operated.

Note that when the employee operates the 20-2 Cash Register button BT12 (that is, the POS terminal 20-2 in the normal mode is designated) from the state illustrated in FIG. 15A and a small screen SG04 such as that illustrated in FIG. 18A is displayed, the POS terminal 20-1 may send the registration information to the designated terminal based on the "Yes button BT23" of the small screen SG04 being operated and afterward display a message screen MG2 such as that illustrated in FIG. 16A (however, the sending destination being "cash register 20-2" instead of "cash register 20-3") on the employee-side display unit 210. Likewise, when the employee operates the 20-2 Cash Register button BT12 from the state illustrated in FIG. 15A and a small screen SG05 such as that illustrated in FIG. 18B is displayed, the POS terminal 20-1 may send the registration information to the designated terminal based on the "Yes (Settlement Only) button BT24" or the "Yes (Registration Also) button BT25" of the small screen SG05 being operated and afterward display a message screen MG2 such as that illustrated in FIG. 16A (however, the sending destination being "cash register 20-2" instead of "cash register 20-3") on the employee-side display unit 210.

Figure 19:
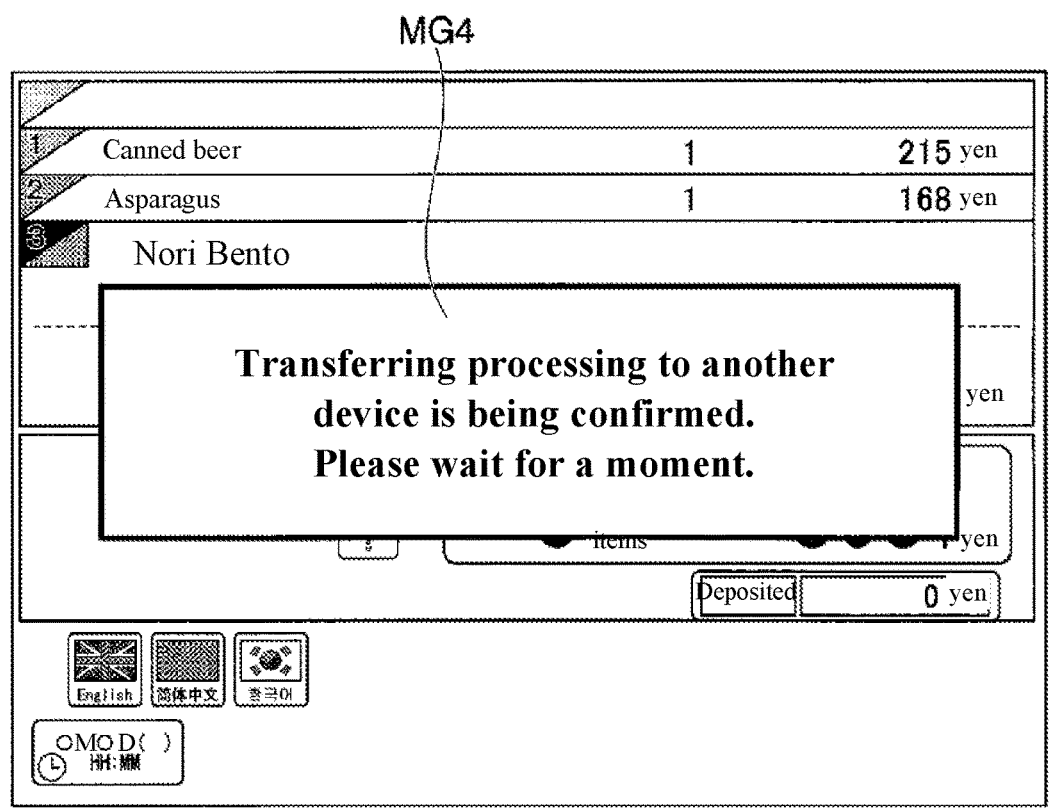
FIG. 19 shows a display example in the POS terminal according to one or more embodiments.

FIG. 19 is a display example in the customer-side display unit 205 of the POS terminal 20-1 in the normal mode. When a small screen SG03 such as that illustrated in FIG. 17B, a small screen SG04 such as that illustrated in FIG. 18A, or a small screen SG05 such as that illustrated in FIG. 18B is displayed on the employee-side display unit 210, the POS terminal 20-1 displays the message screen MG4 as illustrated in FIG. 19, superimposed on the settlement screen (deposit screen) in the customer-side display unit 205. The message screen MG4 notifies the customer that transferring processing to another terminal (designated terminal) is being confirmed (in other words, that it is desired of the customer to wait for a little while, that they may need to move to another terminal for settlement processing). Note that operations (such as inserting cash) cannot be performed while the message screen MG4 is displayed.

(Designated-Terminal Side Selection 1)

Whether to permit reception of the registration information—that is, whether to execute processing based on this registration information (registration processing, settlement processing)—may be made to be selectable on the designated-terminal side whereto this registration information is sent.

Figure 20A:
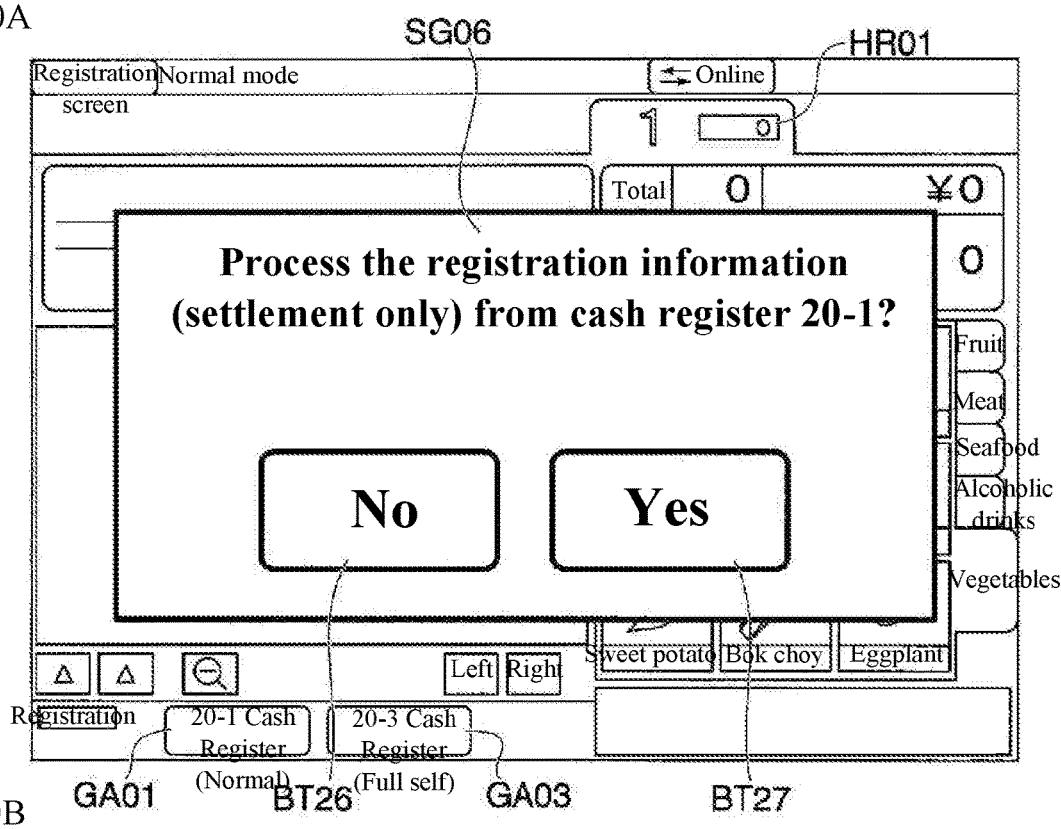
FIGS. 20A-20B each show a display example in the POS terminal according to one or more embodiments.

FIG. 20A is a display example in the employee-side display unit 210 of the POS terminal 20-2 in the normal mode. When the POS terminal 20-1 sends the registration information to the POS terminal 20-2 based on an operation of the "Yes button BT23" of the small screen SG04 of FIG. 18A (or when it sends the registration information to the POS terminal 20-2 based on an operation of the "Yes (Settlement Only) button BT24" of the small screen SG05 of FIG. 18B), the POS terminal 20-2 that receives this registration information may display a small screen (small window) SG06 such as that illustrated in FIG. 20A on the employee-side display unit 210. That is, when it receives the registration information added with the information indicating starting from the settlement processing (or when it receives the registration information together with the information indicating starting from the settlement processing), the POS terminal 20-2 may display a small screen SG06 such as that illustrated in FIG. 20A on the employee-side display unit 210.

The small screen SG06 of FIG. 20A causes a receiving-side employee to select whether to not perform the settlement processing based on the registration information in this terminal (POS terminal 20-2, which is the designated terminal) or to perform the settlement processing based on the registration information in this terminal. That is, the employee at the POS terminal 20-2 operates the "No button BT26" to not perform the settlement processing and operates the "Yes button BT27" to perform the settlement processing. Note that during display of the small screen SG06, operations on the small screen SG06 (operations of the "No button BT26" and the "Yes button BT27") are prioritized, and other operations cannot be performed. Note that if the registration information is received during processing for another customer, the POS terminal 20-2 may display the small screen SG06 during this processing for another customer.

When the "No button BT26" of the small screen SG06 illustrated in FIG. 20A is operated, the POS terminal 20-2 does not perform the settlement processing based on the registration information sent from the POS terminal 20-1. For example, the POS terminal 20-2 may ignore this registration information and notify the POS terminal 20-1 that is the sending source of this registration information that the settlement processing will not be performed.

Figure 20B:
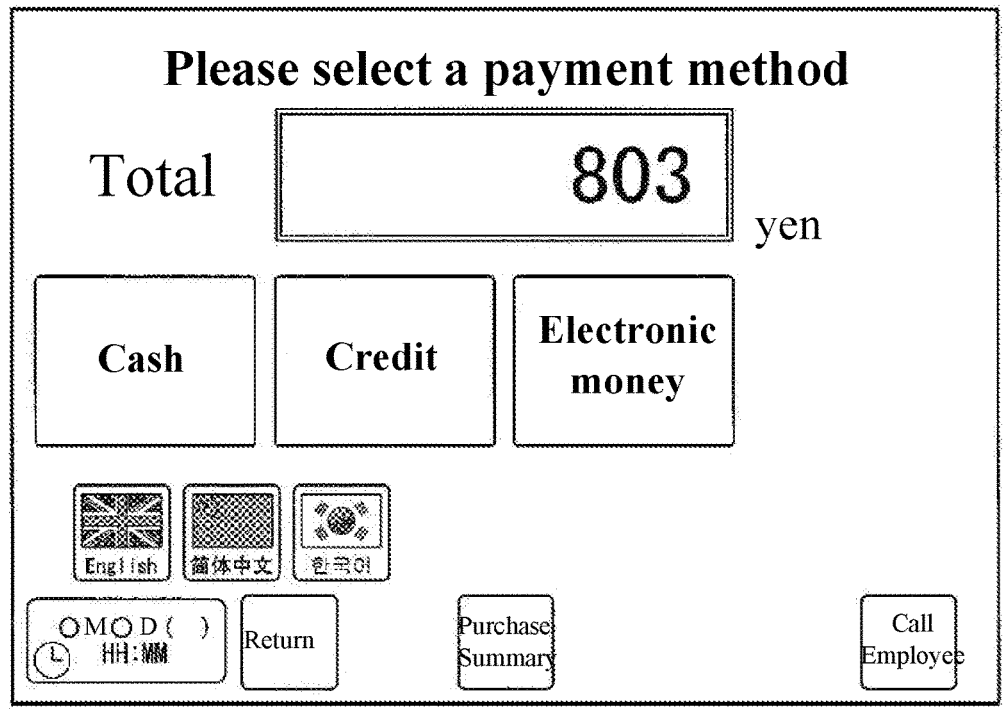

FIG. 20B is a display example in the customer-side display unit 205 of the POS terminal 20-2 in the normal mode. When the "Yes button BT27" of the small screen SG06 of FIG. 20A is operated, the POS terminal 20-2 may display a settlement screen (payment-method selection screen) such as that illustrated in FIG. 20B on the customer-side display unit 205. Note that if the "Yes button BT27" is operated during operations of another customer, the POS terminal 20-2 may display the above settlement screen (payment-method selection screen) after this processing for another customer ends.

Note that the POS terminal 20-2 may display the small screen SG06 as illustrated in FIG. 20A before actually receiving the registration information from the POS terminal 20-1. For example, when the "Yes button BT23" of the small screen SG04 of FIG. 18A is operated (or the "Yes (Settlement Only) button BT24" of the small screen SG05 of FIG. 18B is operated), the POS terminal 20-1 may send query information on whether to perform the settlement processing based on the registration information to the POS terminal 20-2 that is the designated terminal, and the POS terminal 20-2 that receives this query information may display the small screen SG06. Afterward, the POS terminal 20-1 may send the registration information to the POS terminal 20-2 based on a response from the POS terminal 20-2. Specifically, when the POS terminal 20-2 gives an indication to perform the settlement processing (OK response; a response of the "Yes button BT27) of the small screen SG06), the POS terminal 20-1 may send the registration information added with the information indicating starting from the settlement processing to the POS terminal 20-2 (or send the registration information to the POS terminal 20-2 together with the information indicating starting from the settlement processing).

Note that display of the small screen SG06 of FIG. 20A may be omitted. That is, when the POS terminal 20-1 sends the registration information to the POS terminal 20-2 based on an operation of the "Yes button BT23" of the small screen SG04 of FIG. 18A (or sends the registration information to the POS terminal 20-2 based on an operation of the "Yes (Settlement Only) button BT24" of the small screen SG05 of FIG. 18B), the POS terminal 20-2 may display the settlement screen (payment-method selection screen) of FIG. 20B on the customer-side display unit 205 without displaying the small screen SG06 on the employee-side display unit 210.

Figure 21A:
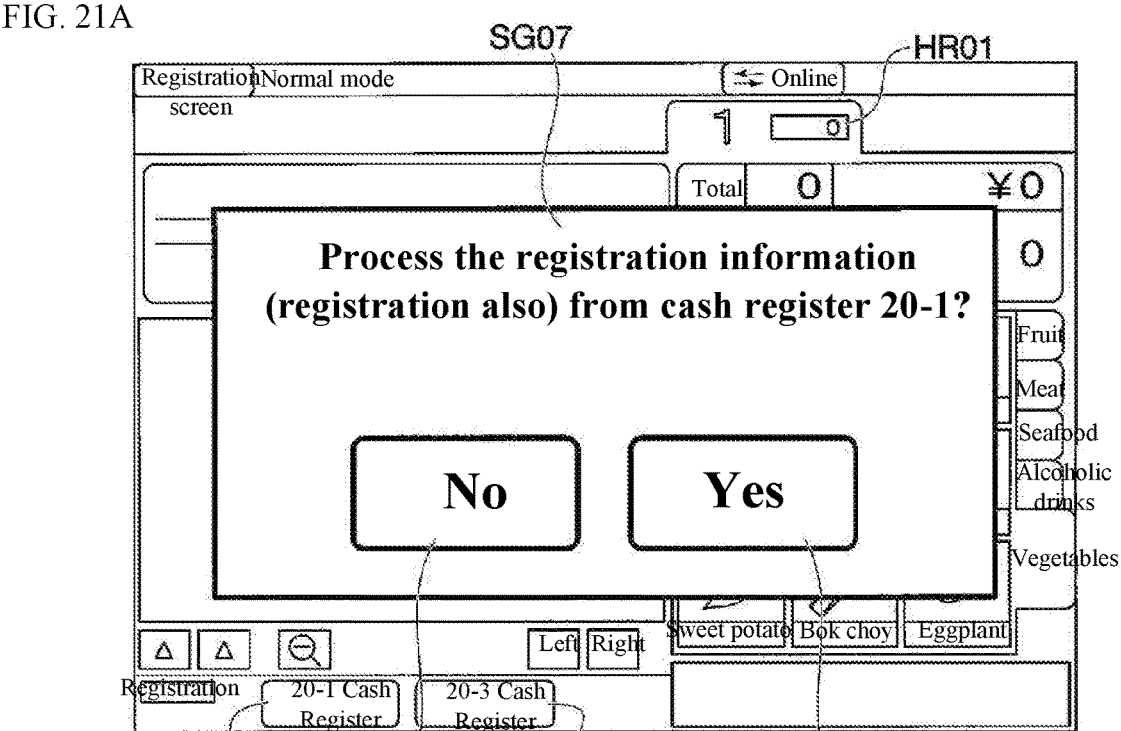
FIGS. 21A-21B each show a display example in the POS terminal according to one or more embodiments.

FIG. 21A is a display example in the employee-side display unit 210 of the POS terminal 20-2 in the normal mode. When the POS terminal 20-1 sends the registration information to the POS terminal 20-2 based on an operation of the "Yes (Registration Also) button BT25" of the small screen SG05 of FIG. 18B, the POS terminal 20-2 that receives this registration information may display a small screen (small window) SG07 such as that illustrated in FIG. 21A on the employee-side display unit 210. That is, when it receives the registration information added with the information indicating starting from the registration processing (or when it receives the registration information together with the information indicating starting from the registration processing), the POS terminal 20-2 may display a small screen SG07 such as that illustrated in FIG. 21A on the employee-side display unit 210.

The small screen SG07 of FIG. 21A causes the receiving-side employee to select whether to not perform the registration processing based on the registration information in this terminal (POS terminal 20-2, which is the designated terminal) or to perform the registration processing based on the registration information in this terminal. That is, the employee at the POS terminal 20-2 operates the "No button BT26" to not perform the registration processing and operates the "Yes button BT27" to perform the registration processing. Note that during display of the small screen SG07, operations on the small screen SG07 (operations of the "No button BT26" and the "Yes button BT27") are prioritized, and other operations cannot be performed. Note that if the registration information is received during processing for another customer, the POS terminal 20-2 may display the small screen SG07 during this processing for another customer.

When the "No button BT26" of the small screen SG07 illustrated in FIG. 21A is operated, the POS terminal 20-2 does not perform the registration processing based on the registration information sent from the POS terminal 20-1. For example, the POS terminal 20-2 may ignore this registration information and notify the POS terminal 20-1 that is the sending source of this registration information that the registration processing will not be performed.

Figure 21B:
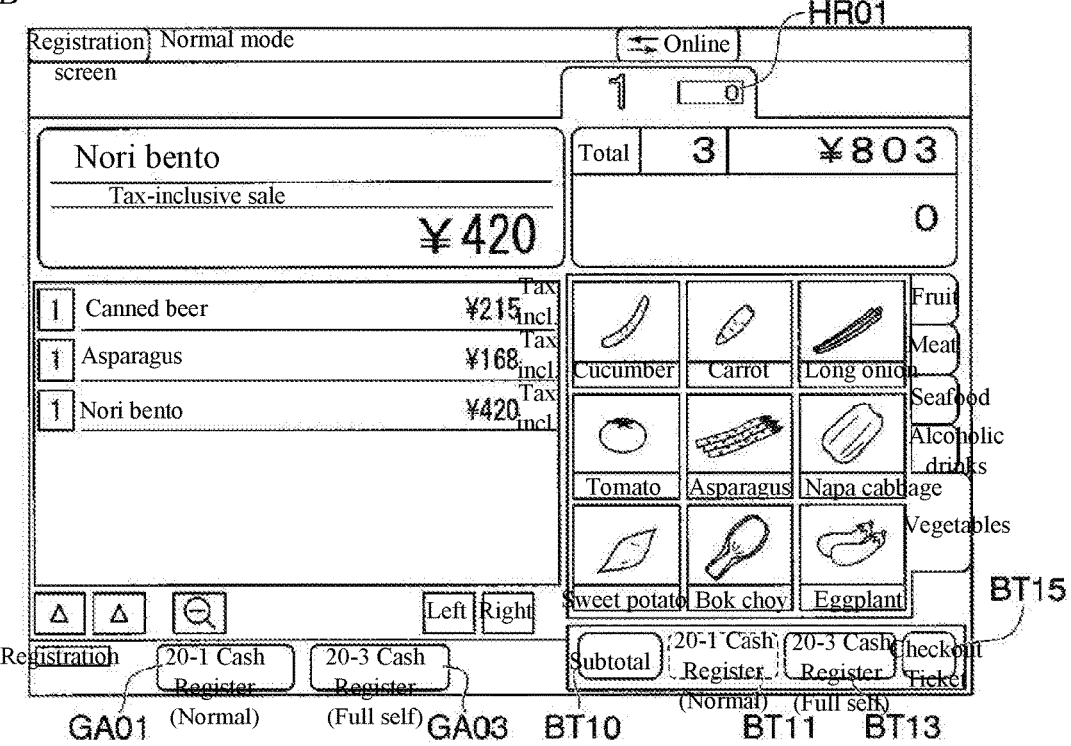

FIG. 21B is a display example in the employee-side display unit 210 of the POS terminal 20-2 in the normal mode. When the "Yes button BT27" of the small screen SG07 of FIG. 21A is operated, the POS terminal 20-2 may display a registration screen such as that illustrated in FIG. 21B on the employee-side display unit 210. Note that if the "Yes button BT27" is operated during operations of another customer, the POS terminal 20-2 may display the above registration screen after this processing for another customer ends.

The 20-1 Cash Register button BT11 is a button for designating a 20-1 cash register (POS terminal 20-1). The employee operates the 20-1 Cash Register button BT11 when designating the POS terminal 20-1 as the terminal whereto the registration information is to be sent. "(Normal)" indicated in the 20-1 Cash Register button BT11 indicates that the operation mode of the POS terminal 20-1 corresponding to the 20-1 Cash Register button BT11 is the normal mode.

Note that as with the small screen SG06 of FIG. 20A, the POS terminal 20-2 may display the small screen SG07 as illustrated in FIG. 21A before actually receiving the registration information from the POS terminal 20-1. For example, when the "Yes (Registration Also) button BT25" of the small screen SG05 of FIG. 18B is operated, the POS terminal 20-1 may send query information on whether to perform the registration processing based on the registration information to the POS terminal 20-2 that is the designated terminal, and the POS terminal 20-2 that receives this query information may display the small screen SG07. Afterward, the POS terminal 20-1 may send the registration information to the POS terminal 20-2 based on a response from the POS terminal 20-2. Specifically, when the POS terminal 20-2 gives an indication to perform the registration processing (OK response; a response of the "Yes button BT27") of the small screen SG07), the POS terminal 20-1 may send the registration information added with the information indicating starting from the registration processing to the POS terminal 20-2 (or send the registration information to the POS terminal 20-2 together with the information indicating starting from the registration processing).

Furthermore, as with the small screen SG06 of FIG. 20A, display of the small screen SG07 of FIG. 21A may be omitted. That is, when the POS terminal 20-1 sends the registration information to the POS terminal 20-2 based on an operation of the "Yes (Registration Also) button BT25" of the small screen SG05 of FIG. 18B, the POS terminal 20-2 may display the registration screen of FIG. 21B on the employee-side display unit 210 without displaying the small screen SG07 on the employee-side display unit 210.

(Designated-Terminal Side Selection 2)

Whether to execute the registration processing based on the registration information may be made to be selectable on the designated-terminal side whereto this registration information is sent.

Figure 22A:
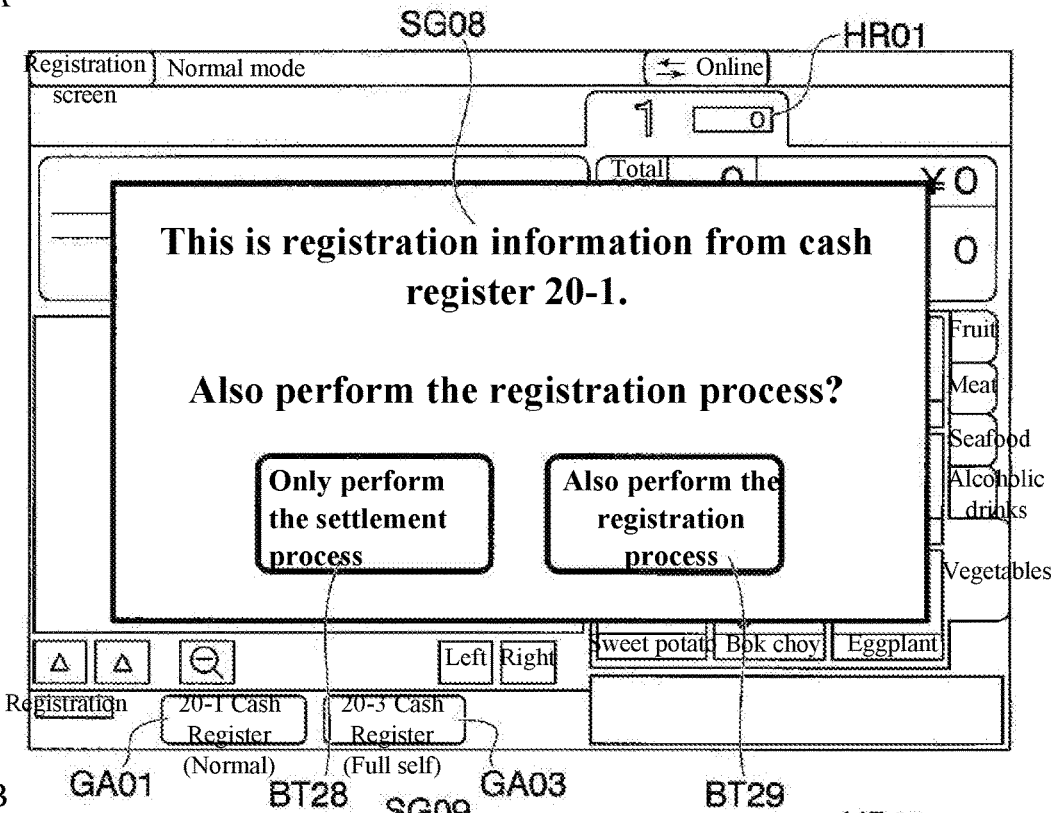
FIGS. 22A-22B each show a display example in the POS terminal according to one or more embodiments.

FIG. 22A is a display example in the employee-side display unit 210 of the POS terminal 20-2 in the normal mode. When the POS terminal 20-1 sends the registration information to the POS terminal 20-2 based on an operation of the "Yes button BT23" of the small screen SG04 of FIG. 18A, the POS terminal 20-2 that receives this registration information may display a small screen (small window) SG08 such as that illustrated in FIG. 22A on the employee-side display unit 210. That is, when it is not selected on the registration-information sending side whether to only perform the settlement processing or to also perform the registration processing in the designated terminal that is the registration-information receiving side, whether to perform only the settlement processing or to also perform the registration processing may be selected on the designated-terminal side.

When the "Only Perform Settlement Process button BT28" of the small screen SG08 of FIG. 22A is operated, the POS terminal 20-2 may display a settlement screen (payment-method selection screen) such as that illustrated in FIG. 20B on the customer-side display unit 205, similarly to when the "Yes button BT27" of the small screen SG06 of FIG. 20A is operated. Note that if the "Only Perform Settlement Process button BT28" is operated during operations of another customer, the POS terminal 20-2 may display the above settlement screen (payment-method selection screen) after this processing for another customer ends.

When the "Also Perform Registration Process button BT29" of the small screen SG08 of FIG. 22A is operated, the POS terminal 20-2 may display a registration screen such as that illustrated in FIG. 21B on the employee-side display unit 210, similarly to when the "Yes button BT27" of the small screen SG07 of FIG. 21A is operated. Note that if the "Also Perform Registration Process button BT29" is operated during operations of another customer, the POS terminal 20-2 may display the above registration screen after this processing for another customer ends.

Note that in addition to not selecting on the registration-information sending side whether to only perform the settlement processing or to also perform the registration processing in the designated terminal that is the registration-information receiving side (when the "Yes button BT23" of the small screen SG04 of FIG. 18A is operated), as an aspect wherein a final determination is made on the receiving side, whether to only perform the settlement processing or to also perform the registration processing may also be made to be selectable (ultimately selectable) on the designated-terminal side when selecting on the registration-information sending side whether to only perform the settlement processing or to also perform the registration processing in the designated terminal that is the registration-information receiving side (when the "Yes (Settlement Only) button BT24" or the "Yes (Registration Only) button BT25" of the small screen SG05 of FIG. 18B is operated).

Figure 22B:
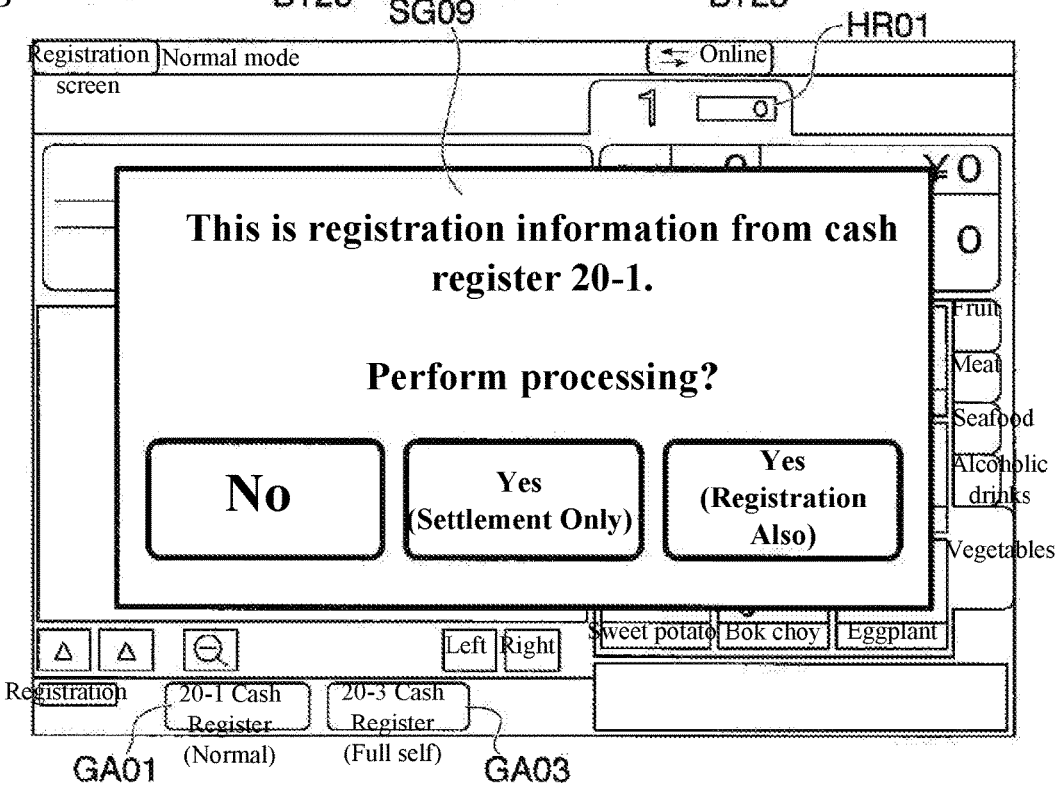

FIG. 22B is a display example in the employee-side display unit 210 of the POS terminal 20-2 in the normal mode. The POS terminal 20-2 may display a small screen SG09 such as that illustrated in FIG. 22B instead of the small screen SG08 of FIG. 22A.

When the "No button" of the small screen SG09 of FIG. 22B is operated, the POS terminal 20-2 does not perform processing based on the registration information sent from the POS terminal 20-1, similarly to when the "No button BT26" of the small screen SG06 of FIG. 20A is operated or when the "No button BT26" of the small screen SG07 of FIG. 21A is operated.

When the "Yes (Settlement Only) button" of the small screen SG09 of FIG. 22B is operated, the POS terminal 20-2 may display a settlement screen (payment-method selection screen) such as that illustrated in FIG. 20B on the customer-side display unit 205, similarly to when the "Only Perform Settlement Process button BT28" of the small screen SG08 of FIG. 22A is operated. Note that if the "Yes (Settlement Only) button" is operated during operations of another customer, the POS terminal 20-2 may display the above settlement screen (payment-method selection screen) after this processing for another customer ends.

When the "Yes (Registration Also) button" of the small screen SG09 of FIG. 22B is operated, the POS terminal 20-2 may display a registration screen such as that illustrated in FIG. 21B on the employee-side display unit 210, similarly to when the "Also Perform Registration Process button BT29" of the small screen SG08 of FIG. 22A is operated. Note that if the "Yes (Registration Also) button" is operated during operations of another customer, the POS terminal 20-2 may display the above registration screen after this processing for another customer ends.

(When Reserve Sending Button or Like is Operated)

Figure 23A:
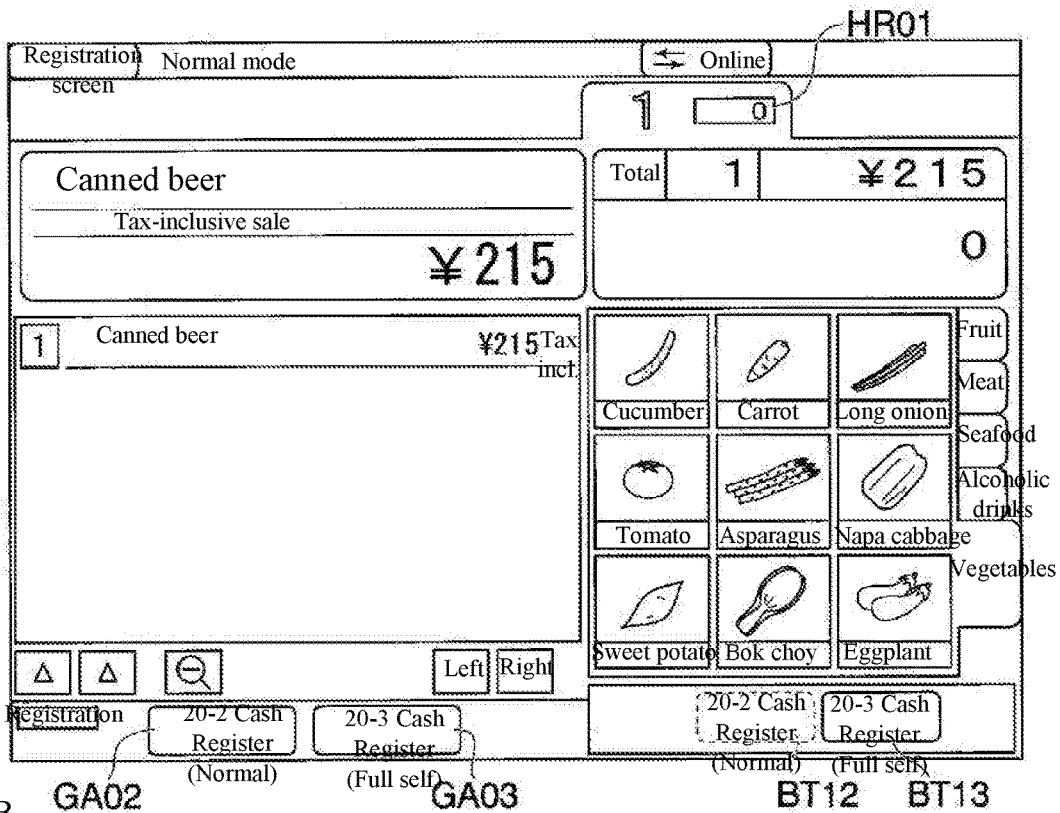
FIGS. 23A-23B each show a display example in the POS terminal according to one or more embodiments.

Next, yet another flow is described. FIG. 23A is a display example in the employee-side display unit 210 of the POS terminal 20-1 in the normal mode. Specifically, FIG. 23A illustrates a display content of the registration screen when the employee operates a Reserve Sending button (not illustrated) from the state illustrated in FIG. 10A. The Reserve Sending button is a button for reserving (declaring) sending of the registration information. The Reserve Sending button may be disposed on the registration screen or disposed in the key operation unit 211.

Because a reservation is made to send the registration information, in FIG. 23A, the Subtotal button BT10 used when performing settlement processing in this terminal (POS terminal 20-1) and the Checkout Ticket button BT15 used when issuing a checkout ticket are not displayed (are erased).

Figure 23B:
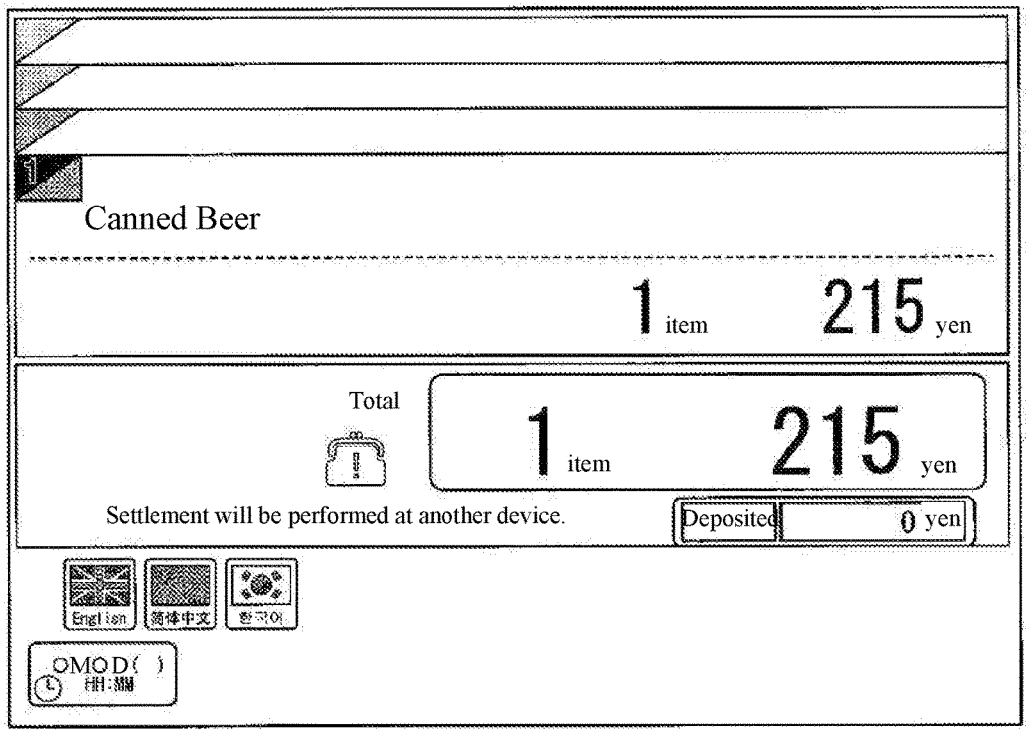

FIG. 23B is a display example in the customer-side display unit 205 of the POS terminal 20-1 in the normal mode. When displaying a registration screen such as that illustrated in FIG. 23A on the employee-side display unit 210, the POS terminal 20-1 displays the settlement screen (deposit screen) on the customer-side display unit 205 as illustrated in FIG. 23B.

Because a reservation is made to send the registration information (because settlement processing is not performed in this terminal), in FIG. 23B, the small screen SG01 for the customer to select the payment method is not displayed (is erased). Moreover, no operations (such as inserting cash) can be performed in the settlement screen (deposit screen) of FIG. 23B. Moreover, the settlement screen (deposit screen) of FIG. 23B displays the message, "Settlement will be performed on another device" instead of the message, "↓ Money may be inserted" that is displayed in other settings (for example, the setting of FIG. 10B).

The POS terminal 20 may be provided with a Reserve Issuing of Checkout Ticket button (not illustrated) instead of or in addition to the Reserve Sending button. The Reserve Issuing of Checkout Ticket button is a button for reserving (declaring) issuing of a checkout ticket. The Reserve Issuing of Checkout Ticket button may be disposed on the registration screen or disposed in the key operation unit 211.

Figure 24A:
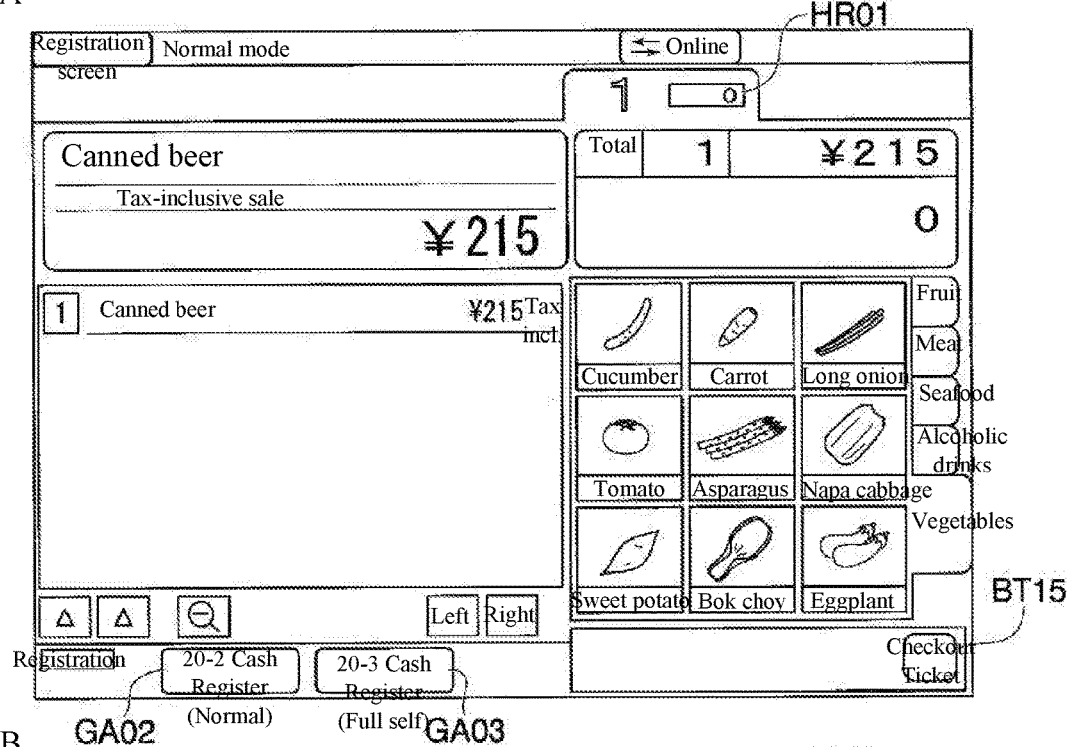
FIGS. 24A-24B each show a display example in the POS terminal according to one or more embodiments.

FIG. 24A is a display example in the employee-side display unit 210 of the POS terminal 20-1 in the normal mode. Specifically, FIG. 24A illustrates a display content of the registration screen when the employee operates the Reserve Issuing of Checkout Ticket button from the state illustrated in FIG. 10A. Because a reservation is made to issue a checkout ticket, in FIG. 24A, the Subtotal button BT10 used when performing settlement processing in this terminal (POS terminal 20-1), the 20-2 Cash Register button BT12 used when sending the registration information to the POS terminal 20-2, and the 20-3 Cash Register button BT13 used when sending the registration information to the POS terminal 20-3 are not displayed (are erased).

Note that the POS terminal 20-1 displays the settlement screen (deposit screen) on the customer-side display unit 205 as illustrated in FIG. 23B even when a registration screen such as that illustrated in FIG. 24A is displayed on the employee-side display unit 210, similarly to when a registration screen such as that illustrated in FIG. 23A is displayed.

The POS terminal 20 may be provided with a Reserve Settlement on Another Terminal button (not illustrated) instead of or in addition to the Reserve Sending button and the Reserve Issuing of Checkout Ticket button. The Reserve Settlement on Another Terminal button is a button for reserving (declaring) settlement processing on another terminal. In other words, it is a button provided with the functions of both the Reserve Sending button and the Reserve Issuing of Checkout Ticket button. The Reserve Settlement on Another Terminal button may be disposed on the registration screen or disposed in the key operation unit 211.

Figure 24B:
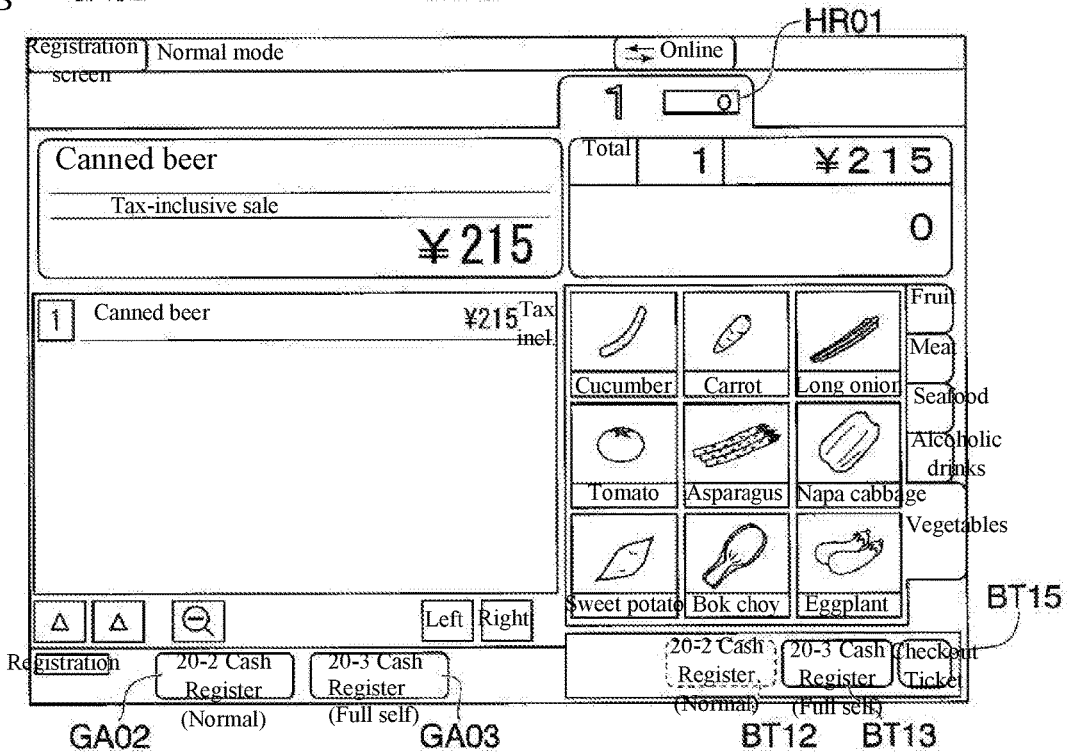

FIG. 24B is a display example in the employee-side display unit 210 of the POS terminal 20-1 in the normal mode. Specifically, FIG. 24B illustrates a display content of the registration screen when the employee operates the Reserve Settlement on Another Terminal button (not illustrated) from the state illustrated in FIG. 10A. Because a reservation is made to perform settlement processing on another terminal, in FIG. 24B, the Subtotal button BT10 used when performing settlement processing in this terminal (POS terminal 20-1) is not displayed (is erased).

Note that the POS terminal 20-1 displays the settlement screen (deposit screen) on the customer-side display unit 205 as illustrated in FIG. 23B even when the registration screen is displayed on the employee-side display unit 210 as illustrated in FIG. 24B, similarly to when the registration screen is displayed as illustrated in FIG. 23A.

(Operation Example of POS Terminal 20)

FIG. 25 to FIG. 32 are flowcharts illustrating one example of the operations of the POS terminal 20. Note that in describing FIG. 25 to FIG. 32, it is supposed that the POS terminal 20 is provided with the Reserve Settlement on Another Terminal button (not illustrated).

(Summaries of Each Flowchart)

Figure 25:
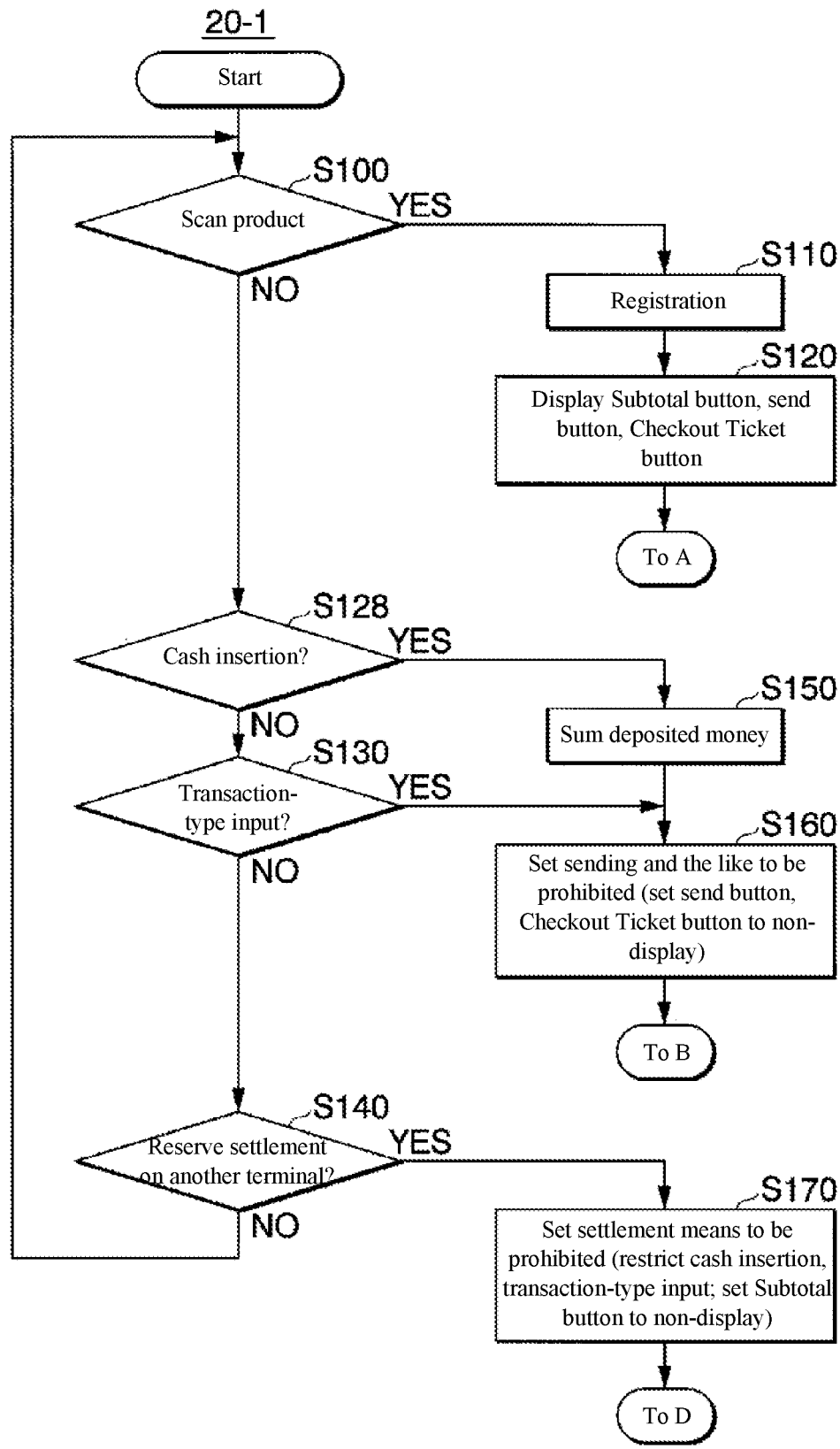
FIG. 25 shows a flowchart illustrating one example of operations of the POS terminal according to one or more embodiments.

First, summaries of each flowchart are described. The flowchart in FIG. 25 illustrates operations in the POS terminal 20-1 in the normal mode from starting the registration processing (from the state wherein not a single product is registered yet and a state wherein no cash is inserted and no transaction type (payment method, payment type, transaction method) is input) until any one of the following is performed: a: product registration of the first product, b: insertion of cash, c: input of a transaction type, d: operation of the Reserve Settlement on Another Terminal button. Note that a to d above are given for convenience in description.

Figure 26:
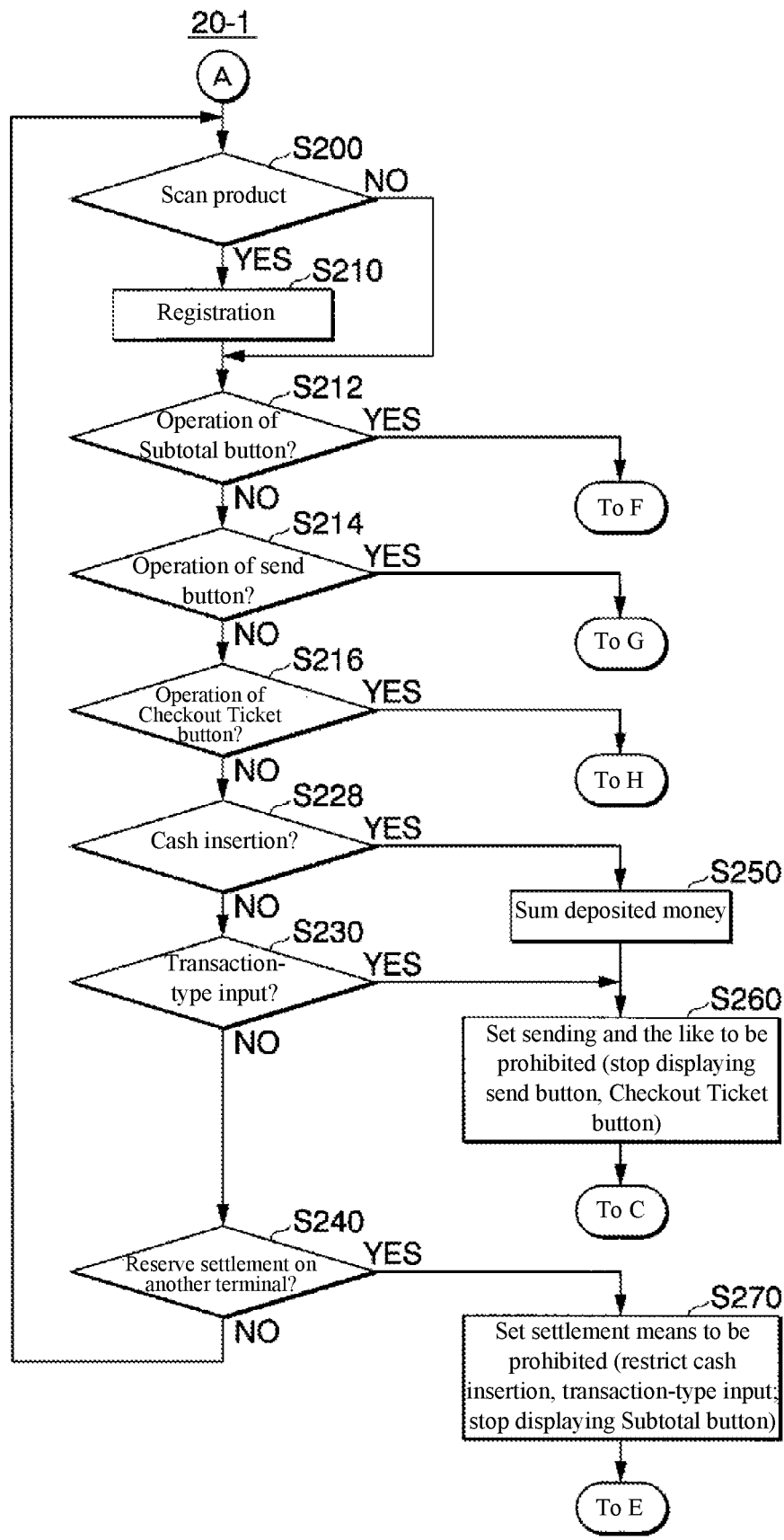
FIG. 26 shows a flowchart illustrating one example of the operations of the POS terminal according to one or more embodiments.

The flowchart in FIG. 26 illustrates operations in the POS terminal 20-1 in the normal mode after a: product registration of the first product is performed first among a: product registration of the first product, b: insertion of cash, c: input of a transaction type, and d: operation of the Reserve Settlement on Another Terminal button. Specifically, the flowchart in FIG. 26 illustrates operations from a: product registration of the first product being performed in FIG. 25 until any one of the following is performed: e: operation of the Subtotal button BT10, f: operation of a send button (20-2 Cash Register button BT12, 20-3 Cash Register button BT13), g: operation of the Checkout Ticket button BT15, b: insertion of cash, c: input of a transaction type, d: operation of the Reserve Settlement on Another Terminal button. Note that e to g above are also given for convenience in description.

Figure 27A:
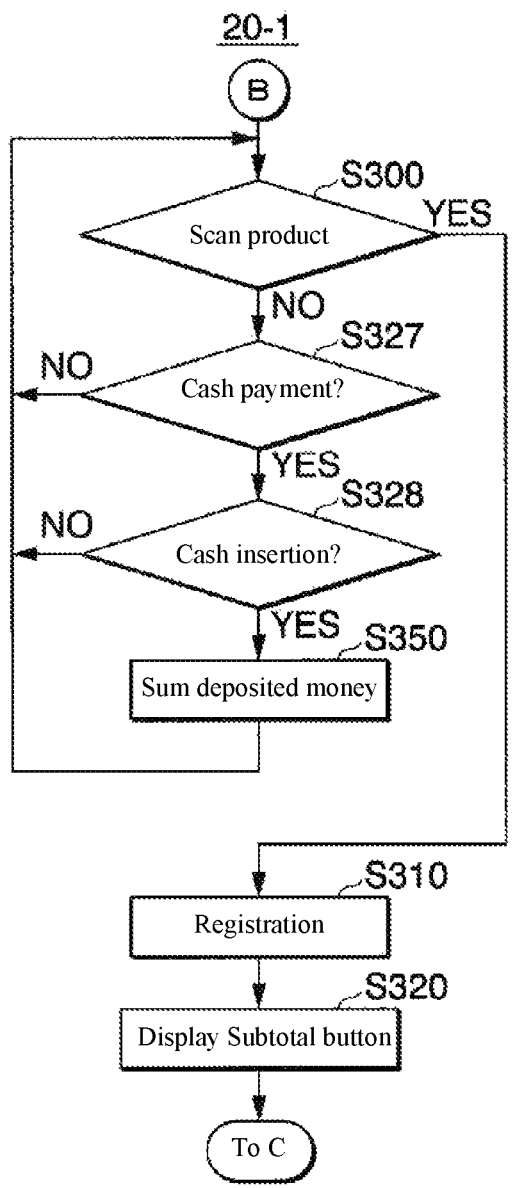
FIGS. 27A-27B each show a flowchart illustrating one example of the operations of the POS terminal according to one or more embodiments.

The flowchart in FIG. 27A illustrates operations in the POS terminal 20-1 in the normal mode after b: insertion of cash (or c: input of a transaction type) is performed first among a: product registration of the first product, b: insertion of cash, c: input of a transaction type, and d: operation of Reserve Settlement on Another Terminal button. Specifically, the flowchart in FIG. 27A illustrates operations from b: insertion of cash (or c: input of a transaction type) being performed in FIG. 25 until a: product registration of the first product is performed.

Figure 27B:
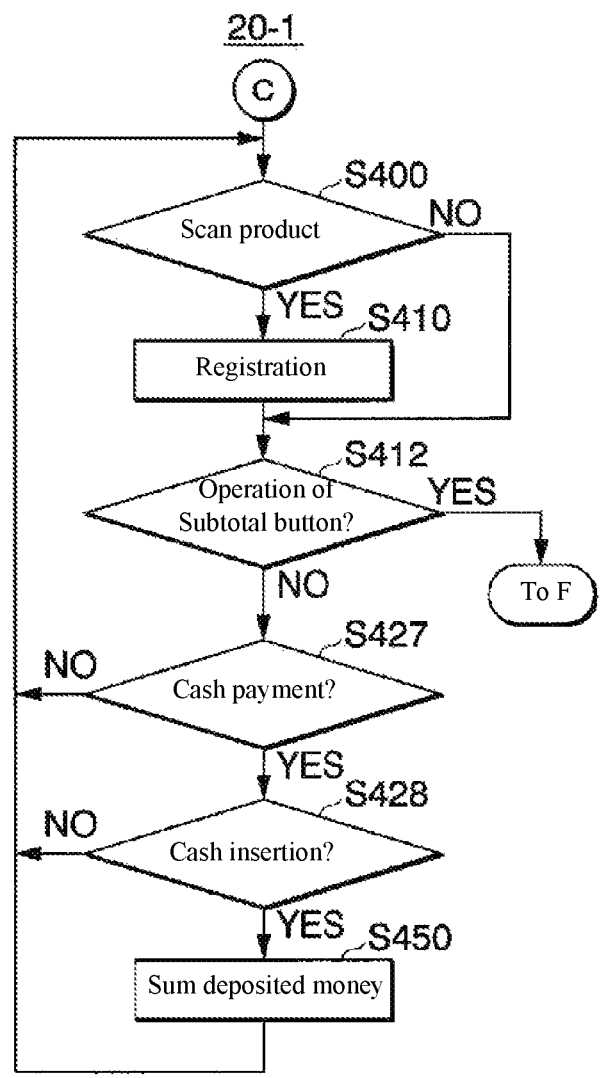

The flowchart in FIG. 27B illustrates operations in the POS terminal 20-1 in the normal mode after a: product registration of the first product and b: insertion of cash (or c: input of a transaction type) are performed among a: product registration of the first product, b: insertion of cash, c: input of a transaction type, and d: operation of the Reserve Settlement on Another Terminal button. Specifically, the flowchart in FIG. 27B illustrates operations from b: insertion of cash (or c: input of a transaction type) being performed in FIG. 26 until e: operation of the Subtotal button BT10 is performed. Moreover, the flowchart in FIG. 27B also illustrates operations from a: product registration of the first product being performed in FIG. 27A until e: operation of the Subtotal button BT10 is performed.

Figure 28A:
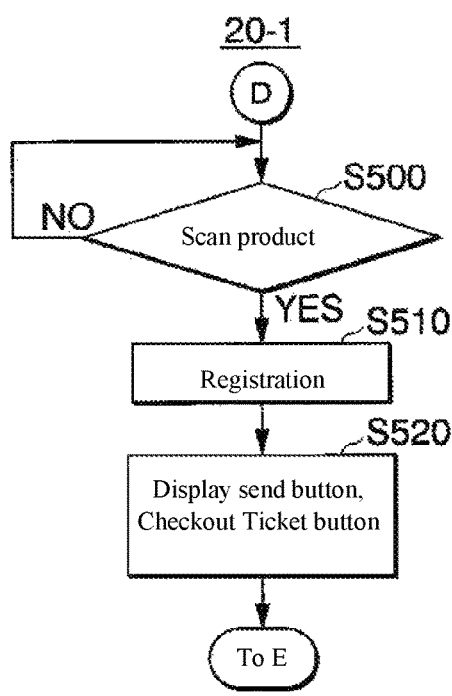
FIGS. 28A-28B each show a flowchart illustrating one example of the operations of the POS terminal according to one or more embodiments.

The flowchart in FIG. 28A illustrates operations in the POS terminal 20-1 in the normal mode after d: operation of the Reserve Settlement on Another Terminal button is performed first among a: product registration of the first product, b: insertion of cash, c: input of a transaction type, and d: operation of the Reserve Settlement on Another Terminal button. Specifically, the flowchart in FIG. 28A illustrates operations from d: operation of the Reserve Settlement on Another Terminal button in FIG. 25 until a: product registration of the first product is performed.

Figure 28B:
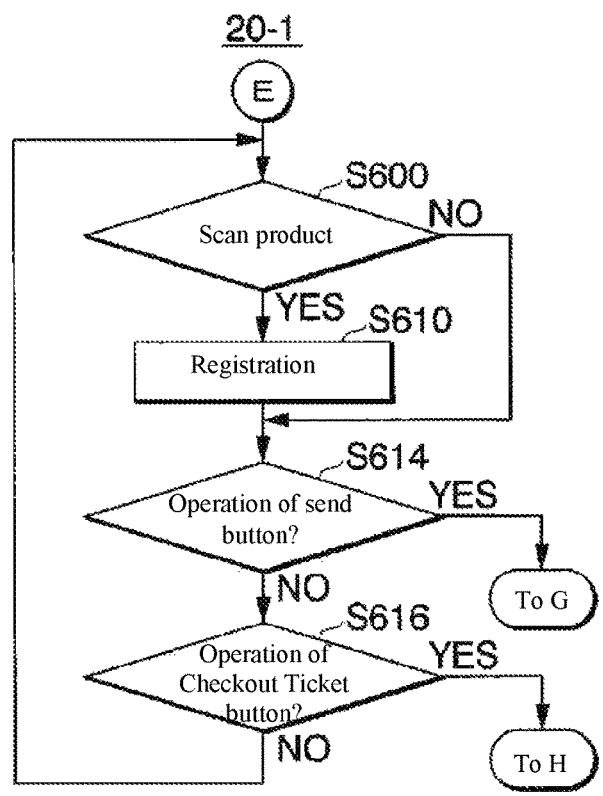

The flowchart in FIG. 28B illustrates operations in the POS terminal 20-1 in the normal mode after a: product registration of the first product and d: operation of the Reserve Settlement on Another Terminal button are performed among a: product registration of the first product, b: insertion of cash, c: input of a transaction type, and d: operation of the Reserve Settlement on Another Terminal button. Specifically, the flowchart in FIG. 28B illustrates operations from d: operation of the Reserve Settlement on Another Terminal button being performed in FIG. 26 until f: operation of a send button (20-2 Cash Register button BT12, 20-3 Cash Register button BT13) (or g: operation of the Checkout Ticket button BT15) is performed. Moreover, the flowchart in FIG. 28B illustrates operations from a: product registration of the first product being performed in FIG. 28A until f: operation of a send button (20-2 Cash Register button BT12, 20-3 Cash Register button BT13) (or g: operation of the Checkout Ticket button BT15) is performed.

Figure 29A:
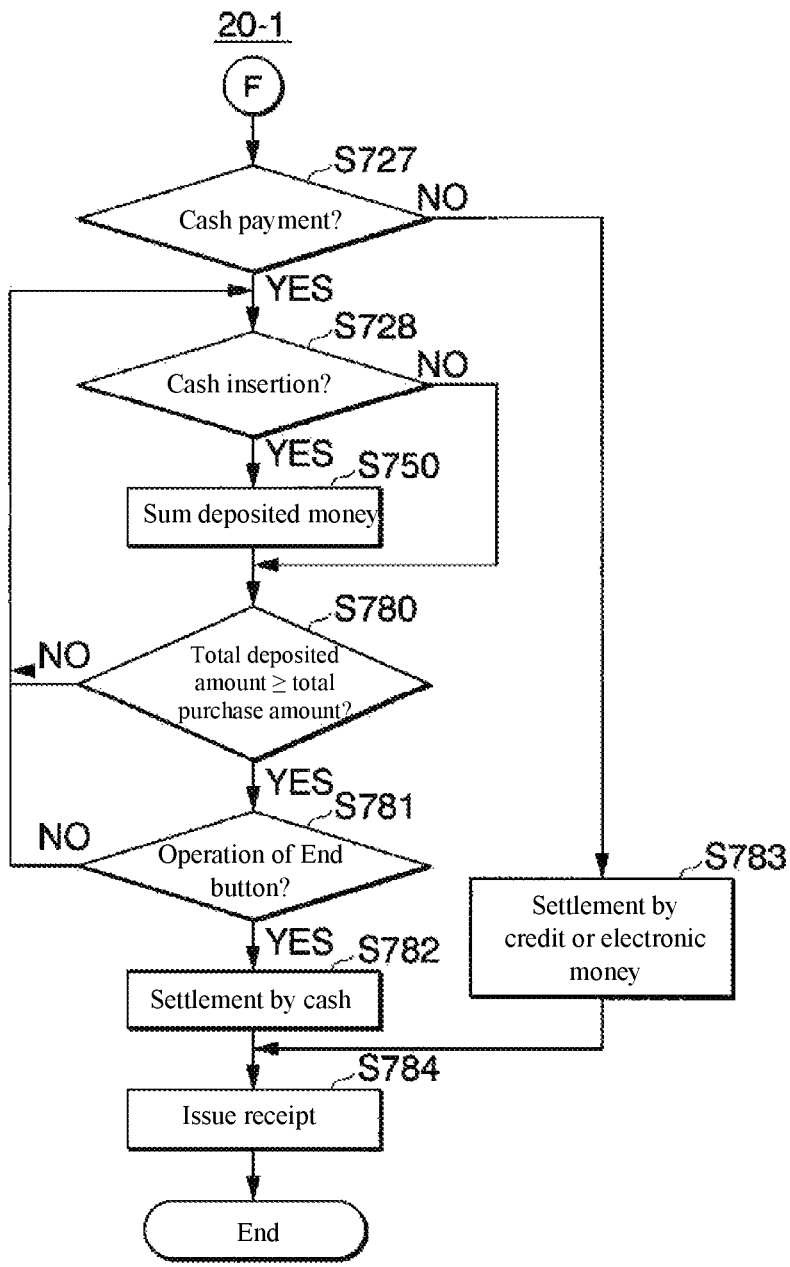
FIGS. 29A-29B each show a flowchart illustrating one example of the operations of the POS terminal according to one or more embodiments.

The flowchart in FIG. 29A illustrates operations after e: operation of the Subtotal button BT10 is performed. Specifically, the flowchart in FIG. 29A illustrates operations from e: operation of the Subtotal button BT10 being performed in FIG. 26 until the settlement processing is completed. Moreover, the flowchart in FIG. 29A illustrates operations from e: operation of the Subtotal button BT10 being performed in FIG. 27B until the settlement processing is completed.

Figure 29B:
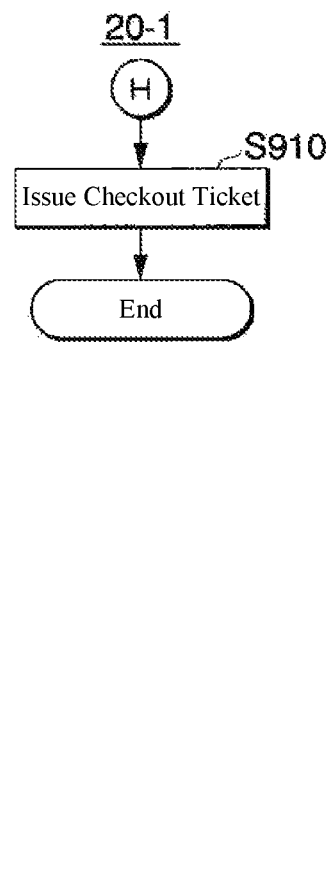

The flowchart in FIG. 29B illustrates operations after g: operation of the Checkout Ticket button BT15 is performed. Specifically, the flowchart in FIG. 29B illustrates operations from g: operation of the Checkout Ticket button BT15 being performed in FIG. 26 until a checkout ticket is issued. Moreover, the flowchart in FIG. 29B illustrates operations from g: operation of the Checkout Ticket button BT15 being performed in FIG. 28B until a checkout ticket is issued.

Figure 30:
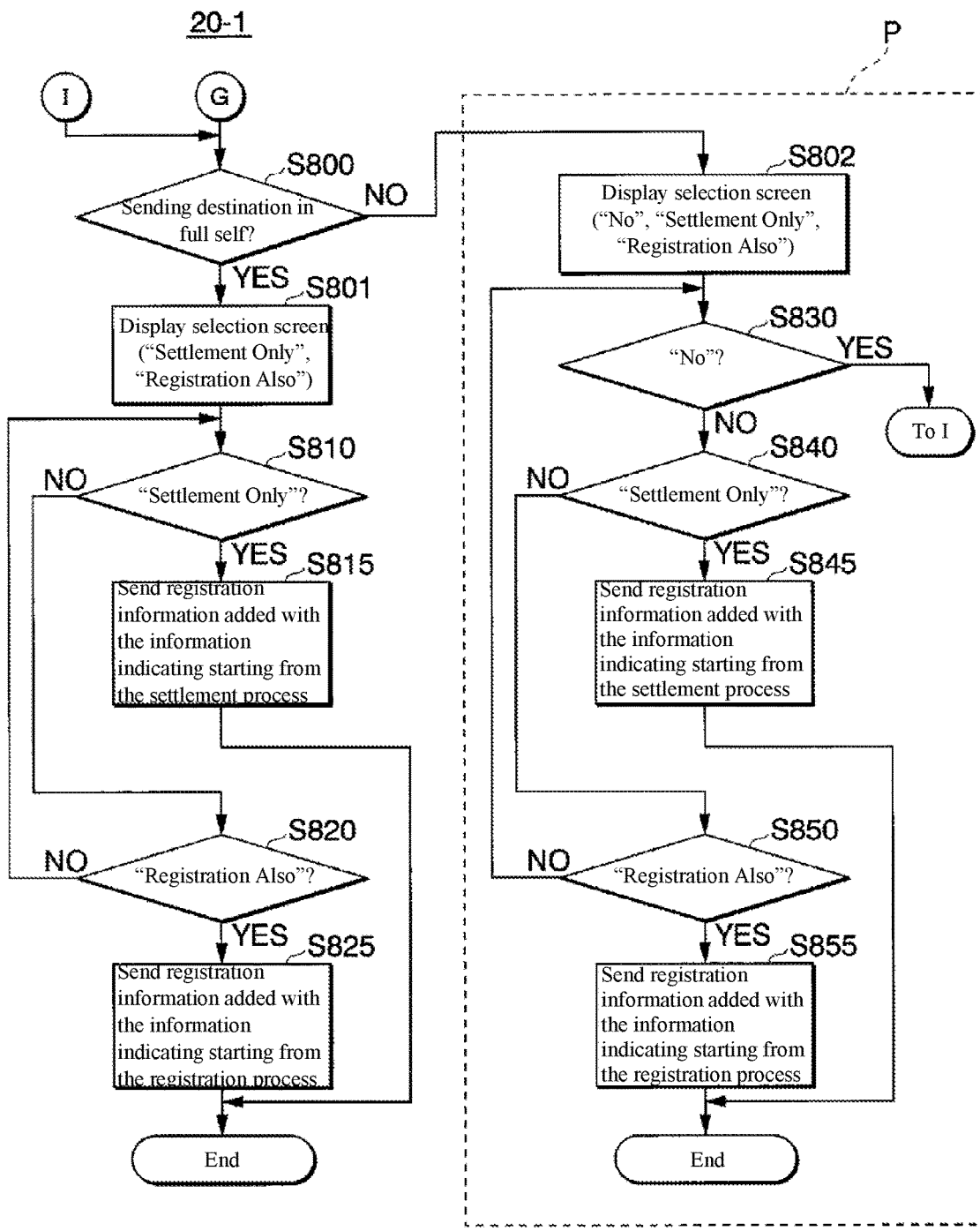
FIG. 30 shows a flowchart illustrating one example of the operations of the POS terminal according to one or more embodiments.

The flowchart in FIG. 30 illustrates operations after f: operation of a send button (20-2 Cash Register button BT12, 20-3 Cash Register button BT13) is performed. Specifically, the flowchart in FIG. 30 illustrates operations from f: operation of a send button being performed in FIG. 26 until the registration information is sent to another terminal. Furthermore, the flowchart in FIG. 30 illustrates operations from f: operation of a send button being performed in FIG. 28B until the registration information is sent to another terminal.

Figure 31:
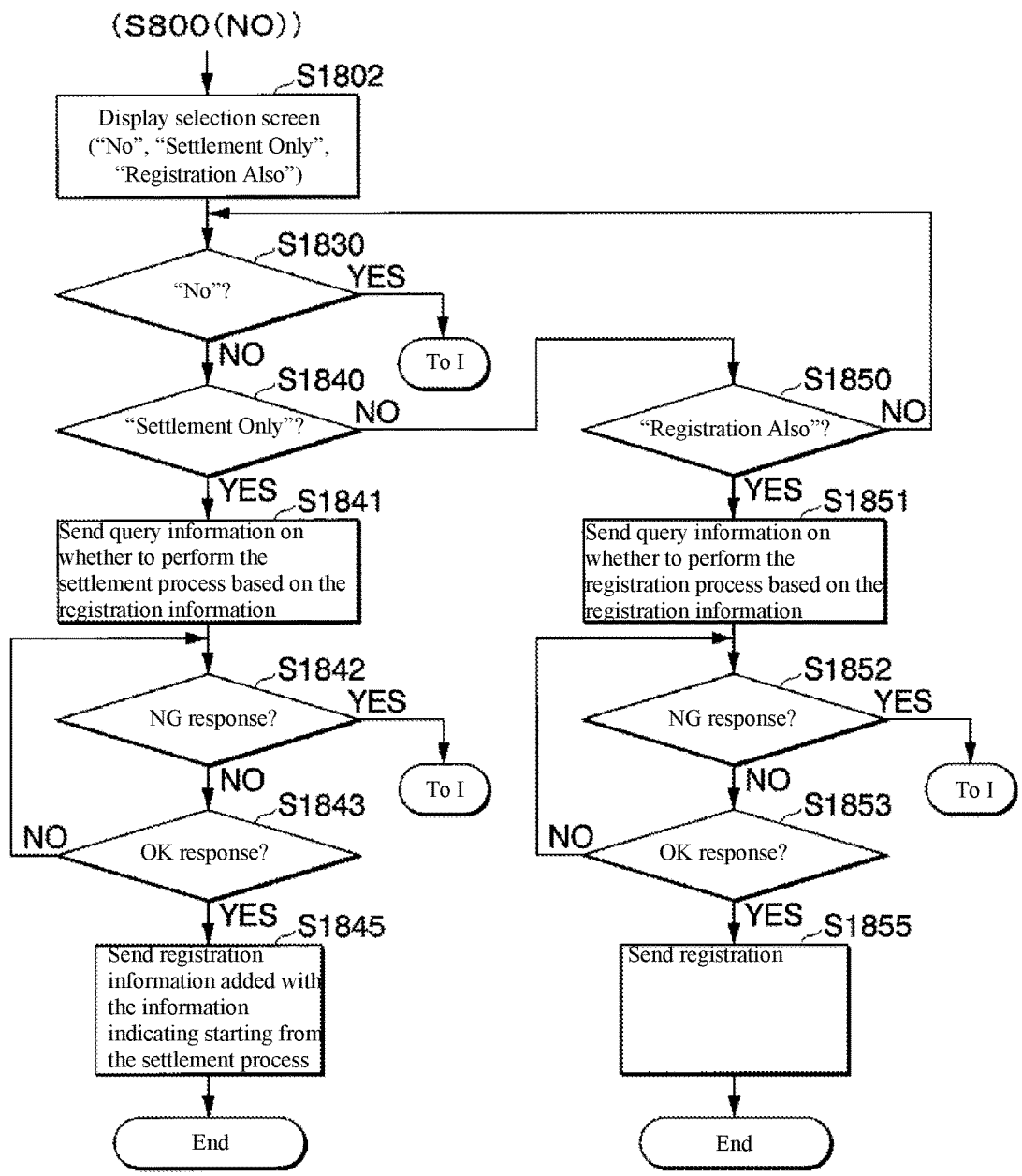
FIG. 31 shows a flowchart illustrating one example of the operations of the POS terminal according to one or more embodiments.

The flowchart in FIG. 31 illustrates other operations after f: operation of a send button (20-3 Cash Register button BT13) is performed. Specifically, the flowchart in FIG. 31 illustrates a variation (variation 1) of the processing illustrated in the dashed-line rectangle P in FIG. 30.

Figure 32:
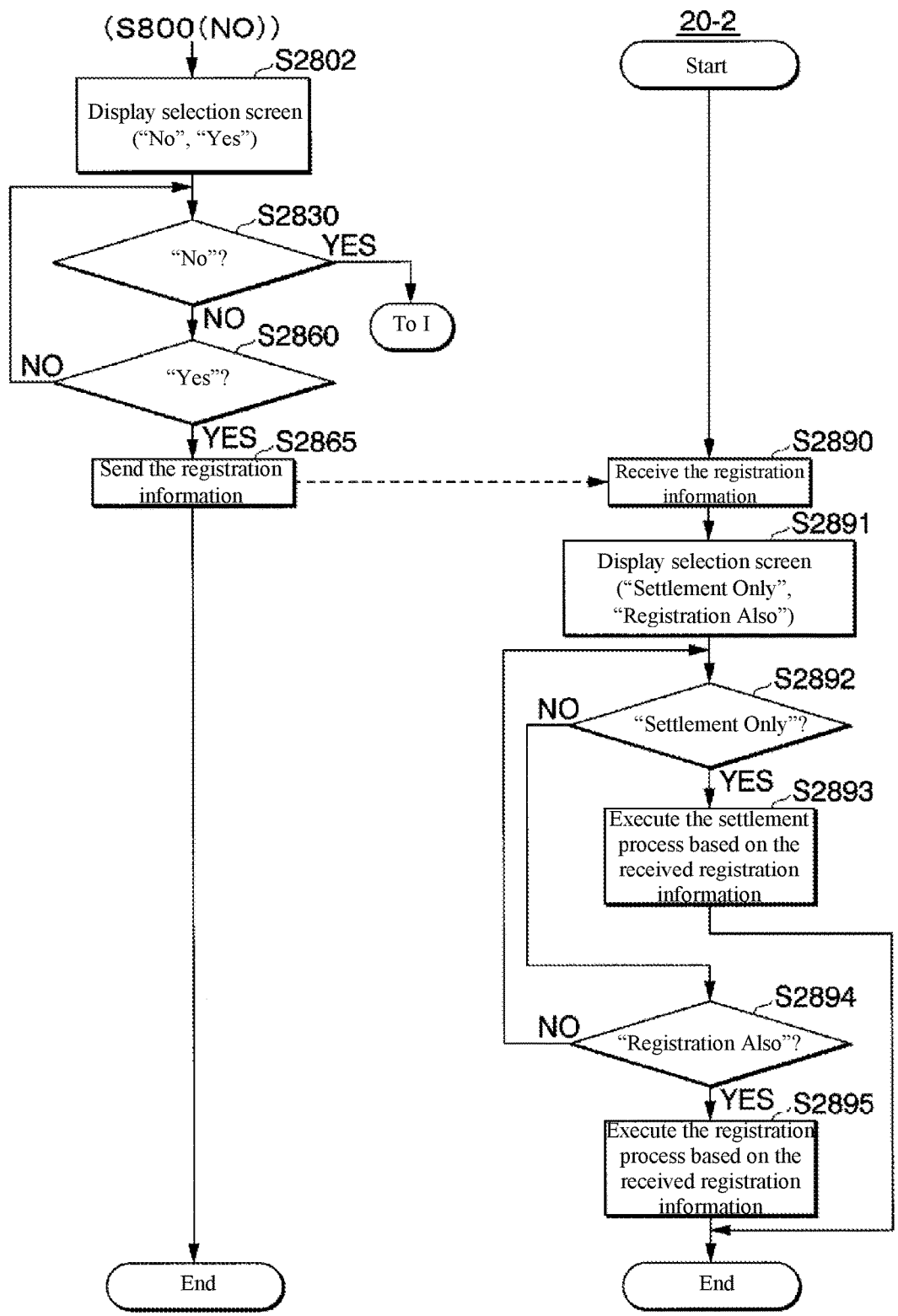
FIG. 32 shows a flowchart illustrating one example of the operations of the POS terminal according to one or more embodiments.

The left side of the flowchart in FIG. 32 (steps S2802 to S2865) illustrates other operations after f: operation of a send button (20-3 Cash Register button BT13) is performed. Specifically, the left side of the flowchart in FIG. 32 illustrates a variation (variation 2) of the processing illustrated in the dashed-line rectangle P in FIG. 30. The right side of the flowchart in FIG. 32 (steps S2890 to S2895) illustrates operations on the designated-terminal (normal-mode POS-terminal 20-2) side corresponding to the operations illustrated on the left side of the flowchart in FIG. 32.

(Description of Flowchart in FIG. 25)

At the start of the flowchart in FIG. 25, the POS terminal 20-1 is in the state wherein not a single product is registered yet and the state wherein no cash is inserted and no transaction type is input. That is, at the start of the flowchart in FIG. 25, a registration screen such as that illustrated in FIG. 9A (registration screen in the initial state) is displayed on the employee-side display unit 210 of the POS terminal 20-1.

Step S100: The POS terminal 20-1 determines whether a product is scanned or the like (scanned by the employee-side scanning unit 212, touched on the employee-side display unit 210). That is, the POS terminal 20-1 determines whether the first product is registered. If the product is scanned or the like, the flow proceeds to step S110. If no product is scanned or the like, the flow proceeds to step S128.

Step S110: The POS terminal 20-1 registers the product that is scanned or the like. Next, the flow proceeds to step S120.

Step S120: As illustrated in FIG. 10A for example, the POS terminal 20-1 displays the Subtotal button BT10, a send button (20-2 Cash Register button BT12, 20-3 Cash Register button BT13), and the Checkout Ticket button BT15. Next, the flow proceeds to step S200 in FIG. 26.

Step S128: The POS terminal 20-1 determines whether cash is inserted into the change machine 209. If cash is inserted, the flow proceeds to step S150. If no cash is inserted, the flow proceeds to step S130.

Step S130: The POS terminal 20-1 determines whether a transaction type is input. If a transaction type is input, the flow proceeds to step S160. If no transaction type is input, the flow proceeds to step S140.

Step S140: The POS terminal 20-1 determines whether the Reserve Settlement on Another Terminal button is operated. If the Reserve Settlement on Another Terminal button is operated, the flow proceeds to step S170. If the Reserve Settlement on Another Terminal button is not operated, the flow returns to step S100.

Step S150: The POS terminal 20-1 sums the inserted cash as the deposited money. Next, the flow proceeds to step S160.

Step S160: The POS terminal 20-1 sets sending and the like (sending of the registration information, issuing of a checkout ticket) to be prohibited. Specifically, the POS terminal 20-1 performs a control of not displaying a send button (20-2 Cash Register button BT12, 20-3 Cash Register button BT13) and the Checkout Ticket button BT15 at and after the present step (step S160). For example, a flag referred to when respectively determining display/non-display for a send button and the Checkout Ticket button BT15 may be provided, and this flag may be set to non-display at the present step. A similar control is performed for the Subtotal button BT10 in step S170 below. Moreover, the POS terminal 20-1 may be made to not accept an operation of the Reserve Settlement on Another Terminal button. As a method of not accepting an operation of the Reserve Settlement on Another Terminal button, for example, in an aspect wherein the Reserve Settlement on Another Terminal button is disposed on the registration screen, this Reserve Settlement on Another Terminal button may be erased or disabled (by, for example, notifying an error after operation), and in an aspect wherein the Reserve Settlement on Another Terminal button is disposed in the key operation unit 211, this Reserve Settlement on Another Terminal button may be disabled (by, for example, notifying an error after operation). Next, the flow proceeds to step S300 in FIG. 27A.

Step S170: The POS terminal 20-1 sets the settlement processing in this terminal (POS terminal 20-1) to be prohibited. Specifically, the POS terminal 20-1 performs a control of not accepting cash insertion and transaction-type input and a control of not displaying the Subtotal button BT10 at and after the present step (step S170). As a method of not accepting cash insertion, for example, the cash insertion port may be made to mechanically not open. As a method of not accepting transaction-type input, the small screen SG01 disposed with buttons (i.e., selection buttons) corresponding to each transaction type may not be displayed, the above buttons may be displayed (for example, displayed in an aspect whereby prohibition is understood) but made to not react even if operated, or the above buttons may react to operation but return an error. Next, the flow proceeds to step S500 in FIG. 28A.

(Description of Flowchart in FIG. 26)

Step S200: The POS terminal 20-1 determines whether a product is scanned or the like. That is, the POS terminal 20-1 determines whether a second or subsequent product is registered. If a product is scanned or the like, the flow proceeds to step S210. If no product is scanned or the like, the flow proceeds to step S212.

Step S210: The POS terminal 20-1 registers the product that is scanned or the like. Next, the flow proceeds to step S212.

Step S212: The POS terminal 20-1 determines whether the Subtotal button BT10 is operated. If the Subtotal button BT10 is operated, the flow proceeds to step S727 in FIG. 29A. If the Subtotal button BT10 is not operated, the flow proceeds to step S214.

Step S214: The POS terminal 20-1 determines whether a send button (20-2 Cash Register button BT12, 20-3 Cash Register button BT13) is operated. If a send button is operated, the flow proceeds to step S800 in FIG. 30. If a send button is not operated, the flow proceeds to step S216.

Step S216: The POS terminal 20-1 determines whether the Checkout Ticket button BT15 is operated. If the Checkout Ticket button BT15 is operated, the flow proceeds to step S910 in FIG. 29B. If a send button is not operated, the flow proceeds to step S228.

Step S228: The POS terminal 20-1 determines whether cash is inserted into the change machine 209. If cash is inserted, the flow proceeds to step S250. If no cash is inserted, the flow proceeds to step S230.

Step S230: The POS terminal 20-1 determines whether a transaction type is input. If a transaction type is input, the flow proceeds to step S260. If no transaction type is input, the flow proceeds to step S240.

Step S240: The POS terminal 20-1 determines whether the Reserve Settlement on Another Terminal button is operated. If the Reserve Settlement on Another Terminal button is operated, the flow proceeds to step S270. If the Reserve Settlement on Another Terminal button is not operated, the flow returns to step S200.

Step S250: As in step S150 in FIG. 25, the POS terminal 20-1 sums the inserted cash as the deposited money. Next, the flow proceeds to step S260.

Step S260: The POS terminal 20-1 sets sending and the like (sending of the registration information, issuing of a checkout ticket) to be prohibited. Specifically, the POS terminal 20-1 does not display (erases) a send button (20-2 Cash Register button BT12, 20-3 Cash Register button BT13) and the Checkout Ticket button BT15 at and after the present step (step S260). Moreover, the POS terminal 20-1 may be made to not accept an operation of the Reserve Settlement on Another Terminal button. Next, the flow proceeds to step S400 in FIG. 27B.

Step S270: The POS terminal 20-1 sets the settlement processing in this terminal (POS terminal 20-1) to be prohibited. Specifically, the POS terminal 20-1 performs a control of not accepting cash insertion and transaction-type input and does not display (erases) the Subtotal button BT10 at and after the present step (step S270). Next, the flow proceeds to step S600 in FIG. 28B.

(Description of Flowchart in FIG. 27A).

Step S300: The POS 20-1 determines whether a product is scanned or the like. That is, the POS terminal 20-1 determines whether the first product is registered. If a product is scanned or the like, the flow proceeds to step S310. If no product is scanned or the like, the flow proceeds to step S327.

Step S310: The POS terminal 20-1 registers the product that is scanned or the like. Next, the flow proceeds to step S320.

Step S320: The POS terminal 20-1 displays the Subtotal button BT10. That is, because the POS terminal 20-1 sets sending and the like (sending of the registration information, issuing of a checkout ticket) to be prohibited at step S160 in FIG. 25, among the Subtotal button BT10, a send button (20-2 Cash Register button BT12, 20-3 Cash Register button BT13), and the Checkout Ticket button BT15, a send button and the Checkout Ticket button BT15 are not displayed, and only the Subtotal button BT10 is displayed. Next, the flow proceeds to step S400 in FIG. 27B.

Step S327: The POS terminal 20-1 determines whether payment is by cash. That is, the POS terminal 20-1 determines whether cash is inserted or cash is selected as the transaction type. If payment is by cash, the flow proceeds to step S328. If payment is not by cash (that is, if payment is by credit or electronic money), the flow returns to step S300.

Step S328: The POS terminal 20-1 determines whether cash is inserted into the change machine 209. If cash is inserted, the flow proceeds to step S350. If no cash is inserted, the flow returns to step S300.

Step S350: As in step S150 in FIG. 25, the POS terminal 20-1 sums the inserted cash as the deposited money. Next, the flow returns to step S300.

(Description of Flowchart in FIG. 27B)

Step S400: The POS terminal 20-1 determines whether a product is scanned or the like. If a product is scanned or the like, the flow proceeds to step S410. If no product is scanned or the like, the flow proceeds to step S412.

Step S410: The POS terminal 20-1 registers the product that is scanned or the like. Next, the flow proceeds to step S412.

Step S412: The POS terminal 20-1 determines whether the Subtotal button BT10 is operated. If the Subtotal button BT10 is operated, the flow proceeds to step S727 in FIG. 29A. If the Subtotal button BT10 is not operated, the flow proceeds to step S427.

Step S427: As in step S327 in FIG. 27A, the POS terminal 20-1 determines whether payment is by cash. If payment is by cash, the flow proceeds to step S428. If payment is not by cash, the flow returns to step S400.

Step S428: The POS terminal 20-1 determines whether cash is inserted into the change machine 209. If cash is inserted, the flow proceeds to step S450. If no cash is inserted, the flow returns to step S400.

Step S450: As in step S150 in FIG. 25, the POS terminal 20-1 sums the inserted cash as the deposited money. Next, the flow returns to step S400.

(Description of Flowchart in FIG. 28A)

Step S500: The POS terminal 20-1 determines whether a product is scanned or the like. If a product is scanned or the like, the flow proceeds to step S510. If no product is scanned or the like, the flow returns to step S500.

Step S510: The POS terminal 20-1 registers the product that is scanned or the like. Next, the flow proceeds to step S520.

Step S520: The POS terminal 20-1 displays a send button (20-2 Cash Register button BT12, 20-3 Cash Register button BT13) and the Checkout Ticket button BT15. That is, because the POS terminal 20-1 sets the settlement processing in this terminal (POS terminal 20-1) to be prohibited at step S170 in FIG. 25, among the Subtotal button BT10, a send button (20-2 Cash Register button BT12, 20-3 Cash Register button BT13), and the Checkout Ticket button BT15, the Subtotal button BT10 is not displayed, and a send button and the Checkout Ticket button BT15 are displayed. Next, the flow proceeds to step S600 in FIG. 28B.

(Description of Flowchart in FIG. 28B)

Step S600: The POS terminal 20-1 determines whether a product is scanned or the like. If a product is scanned or the like, the flow proceeds to step S610. If no product is scanned or the like, the flow proceeds to step S614.

Step S610: The POS terminal 20-1 registers the product that is scanned or the like. Next, the flow proceeds to step S614.

Step S614: The POS terminal 20-1 determines whether a send button (20-2 Cash Register button BT12, 20-3 Cash Register button BT13) is operated. If a send button is operated, the flow proceeds to step S800 in FIG. 30. If a send button is not operated, the flow proceeds to step S616.

Step S616: The POS terminal 20-1 determines whether the Checkout Ticket button BT15 is operated. If the Checkout Ticket button BT15 is operated, the flow proceeds to step S910 in FIG. 29B. If a send button is not operated, the flow returns to step S600.

(Description of Flowchart in FIG. 29A)

Step S727: As in step S327 in FIG. 27A, the POS terminal 20-1 determines whether payment is by cash. If payment is by cash, the flow proceeds to step S728. If payment is not by cash, the flow proceeds to step S783.

Step S728: The POS terminal 20-1 determines whether cash is inserted into the change machine 209. If cash is inserted, the flow proceeds to step S750. If no cash is inserted, the flow proceeds to step S780

Step S750: As in step S150 in FIG. 25, the POS terminal 20-1 sums the inserted cash as the deposited money. Next, the flow proceeds to step S780

Step S780: The POS terminal 20-1 determines whether a total deposited amount (total inserted amount) is no less than a total purchase amount. If the total deposited amount is no less than the total purchase amount, the flow proceeds to step S781. Note that the POS terminal 20-1 displays the End (Receipt) button BT40 when the total deposited amount is no less than the total purchase amount. When the total deposited amount is not no less than the total purchase amount, the flow returns to step S728.

Step S781: The POS terminal 20-1 determines whether the End (Receipt) button BT40 is operated. If the End (Receipt) button BT40 is operated, the flow proceeds to step S782. If the End (Receipt) button BT40 is not operated, the flow returns to step S728.

Step S782: The POS terminal 20-1 executes settlement processing by cash (settlement processing by the change machine 209). For example, the POS terminal 20-1 discharges change when there is change. Next, the flow proceeds to step S784.

Step S783: The POS terminal 20-1 executes settlement processing by credit or electronic money (for example, settlement processing by the card transaction unit 208). Next, the flow proceeds to step S784.

Step S784: The POS terminal 20-1 issues a receipt.

(Description of Flowchart in FIG. 29B)

Step S910: A checkout ticket is issued.

(Description of Flowchart in FIG. 30)

Step S800: The POS terminal 20-1 determines whether the sending destination of the registration information (designated terminal) is a POS terminal 20 in the full-self mode. If the sending destination of the registration information is a POS terminal 20 in the full-self mode, the flow proceeds to step S801. If the sending destination of the registration information is not a POS terminal 20 in the full-self mode, the flow proceeds to step S802. Specifically, in the description of FIG. 25 to FIG. 32, the POS terminal 20-1 and the POS terminal 20-2 are in the normal mode, and the POS terminal 20-3 is in the full-self mode. As such, if the sending destination of the registration information is the POS terminal 20-3 in the full-self mode, the flow proceeds to step S801. Moreover, if the sending destination of the registration information is the POS terminal 20-2 in the normal mode, the flow proceeds to step S802.

Step S801: The POS terminal 20-1 displays a selection screen for the employee to select whether to only perform the settlement processing, without performing the registration processing, or to also perform the registration processing in this sending destination (designated terminal; specifically, the POS terminal 20-3 in the full-self mode). Specifically, for example, the POS terminal 20-1 may display the small screen SG03 disposed with the "Only Perform Settlement Process button BT20" and the "Also Perform Registration Process button BT21" (see FIG. 17B). Next, the flow proceeds to step S810.

Step S802: The POS terminal 20-1 displays a selection screen for the employee to select whether to send the registration information in this sending destination (designated terminal; specifically, the POS terminal 20-2 in the normal mode) and whether to only perform the settlement processing, without performing the registration processing, or to also perform the registration processing in this sending destination (designated terminal). Specifically, for example, the POS terminal 20-1 may display the small screen SG05 disposed with the "No button BT22," the "Yes (Settlement Only) button BT24," and the "Yes (Registration Also) button BT25" (see FIG. 18B). Next, the flow proceeds to step S830.

Step S810: The POS terminal 20-1 determines whether it is selected in the selection screen to only perform the settlement processing, without performing the registration processing. For example, the POS terminal 20-1 determines whether the "Only Perform Settlement Process button BT20" is operated in the small screen SG03 in FIG. 17B. If it is selected to perform only the settlement processing, without performing the registration processing, the flow proceeds to step S815. If it is not selected to perform only the settlement processing, without performing the registration processing, the flow proceeds to step S820.

Step S815: The POS terminal 20-1 sends the registration information added with the information (flag) indicating starting from the settlement processing to the designated terminal (POS terminal 20-3 in the full-self mode). Alternatively, the POS terminal 20-1 may send the registration information to the designated terminal (POS terminal 20-3 in the full-self mode) together with the information (flag) indicating starting from the settlement processing.

Step S820: The POS terminal 20-1 determines whether it is selected in the selection screen to also perform the registration processing. For example, the POS terminal 20-1 determines whether the "Also Perform Registration Process button BT21" is operated in the small screen SG03 in FIG. 17B. If it is selected to also perform the registration processing, the flow proceeds to step S825. If is it not selected to also perform the registration processing, the flow returns to step S810.

Step S825: The POS terminal 20-1 sends the registration information added with the information (flag) indicating starting from the registration processing to the designated terminal (specifically, the POS terminal 20-3 in the full-self mode). Alternatively, the POS terminal 20-1 may send the registration information to the designated terminal (POS terminal 20-3 in the full-self mode) together with the information (flag) indicating starting from the registration processing.

Step S830: The POS terminal 20-1 determines whether it is selected in the selection screen to not send the registration information. For example, the POS terminal 20-1 determines whether the "No button BT22" is operated in the small screen SG05 in FIG. 18B. If it is selected to not send the registration information, the flow returns to step S800. If it is not selected to not send the registration information, the flow proceeds to step S840. Note that if it is selected to not send the registration information, the flow may return to before a send button (20-2 Cash Register button BT12, 20-3 Cash Register button BT13) is operated. For example, if the flow proceeds from (YES) at step S214 in FIG. 26 to step S800 in FIG. 30, the flow may return to step S214 in FIG. 26. Moreover, if the flow proceeds from step S614 in FIG. 28B to step S800 in FIG. 30, the flow may return to step S614 in FIG. 26.

Step S840: The POS terminal 20-1 determines whether it is selected in the selection screen to only perform the settlement processing, without performing the registration processing. For example, the POS terminal 20-1 determines whether the "Yes (Settlement Only) button BT24" is operated in the small screen SG05 in FIG. 18B. If it is selected to only perform the settlement processing, without performing the registration processing, the flow proceeds to step S845. If it is not selected to only perform the settlement processing, without performing the registration processing, the flow proceeds to step S850.

Step S845: The POS terminal 20-1 sends the registration information added with the information (flag) indicating starting from the settlement processing to the designated terminal (POS terminal 20-2 in the normal mode). Alternatively, the POS terminal 20-1 may send the registration information to the designated terminal (POS terminal 20-2 in the normal mode) together with the information (flag) indicating starting from the settlement processing.

Step S850: The POS terminal 20-1 determines whether it is selected in the selection screen to also perform the registration processing. For example, the POS terminal 20-1 determines whether the "Yes (Registration Also) button BT25" is operated in the small screen SG05 in FIG. 18B. If it is selected to also perform the registration processing, the flow proceeds to step S855. If it is not selected to also perform the registration processing, the flow returns to step S830.

Step S855: The POS terminal 20-1 sends the registration information added with the information (flag) indicating starting from the registration processing to the designated terminal (specifically, the POS terminal 20-2 in the normal mode). Alternatively, the POS terminal 20-1 may send the registration information to the designated terminal (POS terminal 20-2 in the normal mode) together with the information (flag) indicating starting from the registration processing.

(Description of Flowchart in FIG. 31)

As above, the flowchart in FIG. 31 illustrates a variation (variation 1) of the processing illustrated in the dashed-line rectangle P in FIG. 30. The POS terminal 20-1 may execute step S1802 and subsequent steps in FIG. 31 in continuation from (NO) at step S800 in FIG. 30.

Step S1802: As in step S802 in FIG. 30, the POS terminal 20-1 displays a selection screen for the employee to select whether to send the registration information in this sending destination (designated terminal; specifically, the POS terminal 20-2 in the normal mode) and whether to only perform the settlement processing, without performing the registration processing, or to also perform the registration processing in this sending destination (designated terminal). Next, the flow proceeds to step S1830.

Step S1830: As in step S830 in FIG. 30, the POS terminal 20-1 determines whether it is selected in the selection screen to not send the registration information. If it is selected to not send the registration information, the flow returns to step S800 in FIG. 30. If it is not selected to not send the registration information, the flow proceeds to step S1840. Note that if it is selected to not send the registration information, the flow may return to before a send button (20-2 Cash Register button BT12, 20-3 Cash Register button BT13) is operated, similarly to when it is selected to not send the registration information at step S830 in FIG. 30.

Step S1840: As in step S840 in FIG. 30, the POS terminal 20-1 determines whether it is selected in the selection screen to only perform the settlement processing, without performing the registration processing. If it is selected to only perform the settlement processing, without performing the registration processing, the flow proceeds to step S1841. If it is not selected to only perform the settlement processing, without performing the registration processing, the flow proceeds to step S1850.

Step S1841: The POS terminal 20-1 sends query information on whether to perform the settlement processing based on the registration information to the designated terminal (POS terminal 20-2 in the normal mode). Next, the flow proceeds to step S1842.

Note that when the query information on whether to perform the settlement processing based on the registration information is received, the designated terminal (POS terminal 20-2) displays the selection screen for the employee (employee at the designated terminal) to select whether to perform the settlement processing based on the registration information. Specifically, for example, the POS terminal 20-2 may display the small screen SG06 disposed with the "No button BT26" and the "Yes button BT27" (see FIG. 20A).

Step S1842: The POS terminal 20-1 determines whether there is a response from the designated terminal of not performing the settlement processing based on the registration information (of refusal) (NG response; response of "No button BT26"). If there is an NG response, the flow returns to step S800 in FIG. 30. If there is no NG response, the flow proceeds to step S1843. Note that if there is an NG response, the flow may return to before a send button (20-2 Cash Register button BT12, 20-3 Cash Register button BT13) is operated, similarly to when it is selected to not send the registration information at step S1830.

Step S1843: The POS terminal 20-1 determines whether there is a response from the designated terminal of performing the settlement processing based on the registration information (of permission) (OK response; response of "Yes button BT27"). If there is an OK response, the flow proceeds to step S1845. If there is no OK response, the flow returns to step S1842.

Step S1845: As in step S845 in FIG. 30, the POS terminal 20-1 sends the registration information added with the information indicating starting from the settlement processing to the designated terminal. Alternatively, the POS terminal 20-1 may send the registration information to the designated terminal together with the information indicating starting from the settlement processing.

Step S1850: As in step S850 in FIG. 30, the POS terminal 20-1 determines whether it is selected in the selection screen to also perform the registration processing. If it is selected to also perform the registration processing, the flow proceeds to step S1851. If it is not selected to also perform the registration processing, the flow returns to step S1830.

Step S1851: The POS terminal 20-1 sends query information on whether to perform the registration processing based on the registration information to the designated terminal (POS terminal 20-2 in the normal mode). Next, the flow proceeds to step S1852.

Note that when the query information on whether to perform the registration processing based on the registration information is received, the designated terminal (POS terminal 20-2) displays the selection screen for the employee (employee at the designated terminal) to select whether to perform the registration processing based on the registration information. Specifically, for example, the POS terminal 20-2 may display the small screen SG07 disposed with the "No button BT26" and the "Yes button BT27" (see FIG. 21A).

Step S1852: The POS terminal 20-1 determines whether there is a response from the designated terminal of not performing the registration processing based on the registration information (of refusal) (NG response; response of "No button BT26"). If there is an NG response, the flow returns to step S800 in FIG. 30. If there is no NG response, the flow proceeds to step S1853. Note that if there is an NG response, the flow may return to before a send button (20-2 Cash Register button BT12, 20-3 Cash Register button BT13) is operated, similarly to when it is selected to not send the registration information at step S1830.

Step S1853: The POS terminal 20-1 determines whether there is a response from the designated terminal of performing the registration processing based on the registration information (of permission) (OK response; response of "Yes button BT27"). If there is an OK response, the flow proceeds to step S1855. If there is no OK response, the flow proceeds to step S1852.

Step S1855: As in step S855 in FIG. 30, the POS terminal 20-1 sends the registration information added with the information indicating starting from the registration processing to the designated terminal. Alternatively, the POS terminal 20-1 may send the registration information to the designated terminal together with the information indicating starting from the registration processing.

(Description of Flowchart (Left Side) in FIG. 32)

As above, the flowchart (left side) in FIG. 32 illustrates a variation (variation 2) of the processing illustrated in the dashed-line rectangle P in FIG. 30. The POS terminal 20-1 may execute step S2802 and subsequent steps in the flowchart (left side) in FIG. 32 in continuation from (NO) at step S800 in FIG. 30.

Step S2802: The POS terminal 20-1 displays a selection screen for the employee to select whether to send the registration information in this sending destination (designated terminal; specifically, the POS terminal 20-2 in the normal mode). Specifically, for example, the POS terminal 20-1 may display the small screen SG04 disposed with the "No button BT22" and the "Yes button BT23" (see FIG. 18A). Next, the flow proceeds to step S2830.

Step S2830: The POS terminal 20-1 determines whether it is selected in the selection screen to not send the registration information. For example, the POS terminal 20-1 determines whether the "No button BT22" is operated in the small screen SG04 in FIG. 18A. If it is selected to not send the registration information, the flow returns to step S800 in FIG. 30. If it is not selected to not send the registration information, the flow proceeds to step S2860. Note that if it is selected to not send the registration information, the flow may return to before a send button (20-2 Cash Register button BT12, 20-3 Cash Register button BT13) is operated, similarly to when it is selected to not send the registration information at step S830 in FIG. 30.

Step S2860: The POS terminal 20-1 determines whether it is selected in the selection screen to send the registration information. For example, the POS terminal 20-1 determines whether the "Yes button BT23" is operated in the small screen SG04 in FIG. 18A. If it is selected to send the registration information, the flow proceeds to step S2865. If it is not selected to not send the registration information, the flow returns to step S2830.

Step S2865: The POS terminal 20-1 sends the registration information (registration information that is not, for example, added with the flag) to the designated terminal (POS terminal 20-2 in the normal mode)).

(Description of Flowchart (Right Side) in FIG. 32)

As above, the flowchart (right side) in FIG. 32 illustrates operations on the designated-terminal (normal-mode POS-terminal 20-2) side corresponding to the operations in the flowchart (left side) in FIG. 32.

Step S2890: The POS terminal 20-2 receives the registration information sent at step S2865 in the flowchart (right side) in FIG. 32. Next, the flow proceeds to step S2891.

Step S2891: The POS terminal 20-2 displays a selection screen for the employee to select whether to only perform the settlement processing, without performing the registration processing, based on the registration information or to also perform the registration processing based on the registration information. Specifically, for example, the POS terminal 20-2 may display the small screen SG08 disposed with the "Only Perform Settlement Process button BT28" and the "Also Perform Registration Process button BT29" (see FIG. 22A). Next, the flow proceeds to step S2892.

Step S2892: The POS terminal 20-2 determines whether it is selected in the selection screen to only perform the settlement processing, without performing the registration processing. For example, the POS terminal 20-2 determines whether the "Only Perform Settlement Process button BT28" is operated in the small screen SG08 in FIG. 22A. If it is selected to only perform the settlement processing, without performing the registration processing, the flow proceeds to step S2893. If it is not selected to only perform the settlement processing, without performing the registration processing, the flow proceeds to step S2894.

Step S2893: The POS terminal 20-2 executes the settlement processing based on the registration information received at step S2890 (displays the settlement screen).

Step S2894: The POS terminal 20-2 determines whether it is selected in the selection screen to also perform the registration processing. For example, the POS terminal 20-2 determines whether the "Also Perform Registration Process button BT29" is operated in the small screen SG08 in FIG. 22A.

If it is selected to also perform the registration processing, the flow proceeds to step S2895. If it is not selected to also perform the registration processing, the flow returns to step S2892.

Step S2895: The POS terminal 20-2 executes the registration processing based on the registration information received at step S2890 (displays the registration screen).

An operation example of the POS terminal 20 is described above using the flowcharts in FIG. 25 to FIG. 32. Using the above flowcharts, a supplemental description is given concerning the display examples (partial) in the employee-side display unit 210 illustrated in FIG. 9A to FIG. 24B.

(Registration Screen of FIG. 9A (Registration Screen in Initial State))

The POS terminal 20-1 in the normal mode displays the registration screen of FIG. 9A (registration screen in the initial state) at the start of the flowchart in FIG. 25.

(Registration Screen of FIG. 10A)

In continuation from the state of the display content of FIG. 9A, when the first product (canned beer) is scanned ((YES) at step S100 in FIG. 25) and this product is registered (step S110 in FIG. 25), as illustrated in FIG. 10A, the POS terminal 20-1 in the normal mode displays the Subtotal button BT10, a send button (20-2 Cash Register button BT12, 20-3 Cash Register button BT13), and the "Checkout Ticket button BT15" (step S120 in FIG. 25).

(Registration Screen of FIG. 11A)

In continuation from the state of the display content of FIG. 10A, when 500 yen in cash is inserted ((YES) at step S228 in FIG. 26) and the deposited money is summed (step S250 in FIG. 26), as illustrated in FIG. 11A, the POS terminal 20-1 in the normal mode stops displaying (erases) a send button (20-2 Cash Register button BT12, 20-3 Cash Register button BT13) and the "Checkout Ticket button BT15" (step S260 in FIG. 26).

(Registration Screen of FIG. 12A)

In continuation from the state of the display content of FIG. 11A, in the POS terminal 20-1 in the normal mode, when the second product (asparagus) and the third product (nori bento) are scanned ((YES) at step S400 in FIG. 27B), each product is registered (step S410 in FIG. 27B), an additional 500 yen in cash is inserted ((YES) at step S428 in FIG. 27B), and the deposited money is summed (step S450 in FIG. 27B), the display content of the registration screen becomes as illustrated in FIG. 12A. Note that a timing of inserting the additional 500 yen in cash may be before the second product is scanned, after the second product is scanned and before the third product is scanned, or after the third product is scanned.

(Registration Screen of FIG. 13A (Small Screen SG02))

In continuation from the state of the display content of FIG. 12A, when the Subtotal button BT10 is operated ((YES) at step S412 in FIG. 27B), as illustrated in FIG. 13A, the POS terminal 20-1 in the normal mode displays the small screen SG02.

(Registration Screen of FIG. 15A)

In continuation from the state of the display content of FIG. 10A, in the POS terminal 20-1 in the normal mode, when the second product (asparagus) and the third product (nori bento) are scanned ((YES) at step S200 in FIG. 26) and each product is registered (step S210 in FIG. 26), the display content of the registration screen becomes as illustrated in FIG. 15A. In the state of FIG. 15A, no cash is inserted yet, and no payment method is selected.

(Registration Screen of FIG. 17A (Small Screen SG03) and Like)

In continuation from the state of the display content of FIG. 15A, when the 20-3 Cash Register button BT13 is operated ((YES) at step S214 in FIG. 26), as illustrated in FIG. 17B, the POS terminal 20-1 in the normal mode displays the small screen SG03 (step S801 in FIG. 30).

When the "Only Perform Settlement Process button BT20" of the small screen SG03 is operated ((YES) at step S810 in FIG. 30) and the registration information added with the information indicating starting from the settlement processing is sent to the POS terminal 20-3 in the full-self mode (or the registration information is sent to the POS terminal 20-3 in the full-self mode together with the information indicating starting from the settlement processing) (step S815 in FIG. 30), as illustrated in FIG. 16A, the POS terminal 20-1 displays the message screen MG2. Note that as illustrated in FIG. 17A, the POS terminal 20-3 in the full-self mode that receives the above registration information displays the settlement screen (payment-method selection screen).

When the "Also Perform Registration Process button BT21" of the small screen SG03 is operated ((YES) at step S820 in FIG. 30) and the registration information added with the information indicating starting from the registration processing is sent to the POS terminal 20-3 in the full-self mode (or the registration information is sent to the POS terminal 20-3 in the full-self mode together with the information indicating starting from the registration processing) (step S825 in FIG. 30), as illustrated in FIG. 16A, the POS terminal 20-1 displays the message screen MG2. Note that the POS terminal 20-3 in the full-self mode that receives the above registration information displays the registration screen (screen similar to the registration screen of FIG. 21B described as an example in the POS terminal 20-2 in the normal mode).

(Registration Screen of FIG. 18B (Small Screen SG05) and Like)

In continuation from the state of the display content of FIG. 15A, when the 20-2 Cash Register button BT12 is operated ((YES) at step S214 in FIG. 26), as illustrated in FIG. 18B, the POS terminal 20-1 displays the small screen SG05 (step S802 in FIG. 30).

When the "Yes (Settlement Only) button BT24" of the small screen SG05 is operated ((YES) at step S840 in FIG. 30) and the registration information added with the information (flag) indicating starting from the settlement processing is sent to the POS terminal 20-2 in the normal mode (or the registration information is sent to the POS terminal 20-2 in the normal mode together with the information indicating starting from the settlement processing) (step S845 in FIG. 30), the POS terminal 20-1 displays a message screen MG2 such as that illustrated in FIG. 16A (however, the sending destination being "cash register 20-2" instead of "cash register 20-3"). Note that the POS terminal 20-2 in the normal mode that receives the above registration information displays the small screen SG06 as illustrated in FIG. 20A (or does not display the small screen SG06) and displays the settlement screen (payment-method selection screen) as illustrated in FIG. 20B.

When the "Yes (Registration Also) button BT25" of the small screen SG03 is operated ((YES) at step S850 in FIG. 30) and the registration information added with the information (flag) indicating starting from the registration processing is sent to the POS terminal 20-2 in the normal mode (or the registration information is sent to the POS terminal 20-2 in the normal mode together with the information indicating starting from the registration processing) (step S855 in FIG. 30), the POS terminal 20-1 displays a message screen MG2 such as that illustrated in FIG. 16A (however, the sending destination being "cash register 20-2" instead of "cash register 20-3"). Note that the POS terminal 20-2 in the normal mode that receives the above registration information displays the small screen SG07 as illustrated in FIG. 21A (or does not display the small screen SG07) and displays the registration screen as illustrated in FIG. 21B. (Registration Screen of FIG. 18A (Small Screen SG04) and Like)

In continuation from the state of the display content of FIG. 15A, when the 20-2 Cash Register button BT12 is operated ((YES) at step S214 in FIG. 26), as illustrated in FIG. 18A, the POS terminal 20-1 in the normal mode displays the small screen SG04 (step S2802 in FIG. 32).

When the "Yes button BT23" of the small screen SG04 is operated ((YES) at step S2860 in FIG. 32) and the registration information (registration information that is not, for example, added with the flag) is sent to the POS terminal 20-2 in the normal mode (step S2865 in FIG. 32), the POS terminal 20-1 displays a message screen MG2 such as that illustrated in FIG. 16A (however, the sending destination being "cash register 20-2" instead of "cash register 20-3").

The POS terminal 20-2 in the normal mode receives the above registration information (step S2890 in FIG. 32) and, as illustrated in FIG. 22A, displays the small screen SG08 (step S2891 in FIG. 32).

When the "Only Perform Settlement Process button BT28" of the small screen SG08 is operated ((YES) at step S2892 in FIG. 32), the POS terminal 20-2 displays the settlement screen (payment-method selection screen) as illustrated in FIG. 20B and executes the settlement processing based on the registration information received at step S2890 (step S2893 in FIG. 32).

When the "Also Perform Registration Process button BT29" of the small screen SG08 is operated ((YES) at step S2894 in FIG. 32), the POS terminal 20-2 displays the registration screen as illustrated in FIG. 21B and executes the registration processing based on the registration information received at step S2890 (step S2895 in FIG. 32).
(Registration Screen of FIG. 24B)

In continuation from the state of the display content of FIG. 10A, when the Reserve Settlement on Another Terminal button (not illustrated) is operated ((YES) at step S240 in FIG. 26), as illustrated in FIG. 24B, the POS terminal 20-1 in the normal mode stops displaying (erases) the Subtotal button BT10 (step S270 in FIG. 26).

Note that in the flowcharts of FIG. 25 to FIG. 32, the POS terminal 20 is described as being provided with the Reserve Settlement on Another Terminal button (not illustrated). However, the POS terminal 20 may be provided with the Reserve Sending button (not illustrated) instead of or in addition to the Reserve Settlement on Another Terminal button. Moreover, the Reserve Issuing of Checkout Ticket button (not illustrated) may be provided instead of or in addition to the Reserve Settlement on Another Terminal button (or the Reserve Sending button).

When the Reserve Sending button is operated, the POS terminal 20-1 sets the settlement processing and checkout-ticket issuing in this terminal to be prohibited. For example, in the flowchart in FIG. 25, when the Reserve Sending button is operated, the POS terminal 20-1 performs a control of not accepting cash insertion and transaction-type input and a control of not displaying the Subtotal button BT10 and the Checkout Ticket button BT15. Moreover, for example, in the flowchart in FIG. 26, when the Reserve Sending button is operated, the POS terminal 20-1 performs a control of not accepting cash insertion and transaction-type input and, as illustrated in FIG. 23A, stops displaying (erases) the Subtotal button BT10 and the Checkout Ticket button BT15.

When the Reserve Issuing of Checkout Ticket button is operated, the POS terminal 20-1 sets the settlement processing and sending to another terminal in this terminal to be prohibited. For example, in the flowchart in FIG. 25, when the Reserve Issuing of Checkout Ticket button is operated, the POS terminal 20-1 performs a control of not accepting cash insertion and transaction-type input and a control of not displaying the Subtotal button BT10 and a send button (20-2 Cash Register button BT12, 20-3 Cash Register button BT13). Moreover, for example, in the flowchart in FIG. 26, when the Reserve Issuing of Checkout Ticket button is operated, the POS terminal 20-1 performs a control of not accepting cash insertion and transaction-type input and, as illustrated in FIG. 24A, stops displaying (erases) the Subtotal button BT10, the 20-2 Cash Register button BT12, and the 20-3 Cash Register button BT13."
(Prohibition of Sending Registration Information to POS Terminal 20-2 in Normal Mode, Canceling Thereof)

The POS system 1 of one or more embodiments is described above. According to the POS system 1 of one or more embodiments, when, for example, the POS terminal 20-1 in the normal mode sends the registration information with another POS terminal 20-2 in the normal mode as the destination, whether to send the registration information is confirmed by the sending-side employee (employee logged into the POS terminal 20-1) (see FIG. 18A, FIG. 18B, step S802 in FIG. 30, step S1802 in FIG. 31, step S2802 in FIG. 32, and the like).

That is, the POS terminal 20-1 prohibits (momentarily prohibits, temporarily prohibits) sending of the registration information wherein another POS terminal 20-2 in the normal mode is the destination. Moreover, the POS terminal 20-1 notifies that sending of the registration information wherein another POS terminal 20-2 in the normal mode is the destination is prohibited.

Furthermore, when sending the registration information with another POS terminal 20-2 in the normal mode as the destination, the POS terminal 20-1 in the normal mode sends the registration information with this POS terminal 20-2 as the destination when the sending-side employee performs an operation indicating sending in the above confirmation (see steps S845 and S855 in FIG. 30, step S2865 in FIG. 32, and the like).

That is, the POS terminal 20-1 cancels the prohibition of sending the registration information with the POS terminal 20-2 as the destination. More specifically, the above sending prohibition is canceled based on the sending-side employee performing an operation indicating sending after the notice that sending of the registration information with another POS terminal 20-2 in the normal mode as the destination is prohibited.

Furthermore, when sending the registration information with another POS terminal 20-2 in the normal mode as the destination, the POS terminal 20-1 in the normal mode has the sending-side employee confirm whether to also perform the registration processing based on the registration information or to only perform the settlement processing based on this registration information in the POS terminal 20-2 that is the destination of this registration information (see FIG. 18B, step S802 in FIG. 30, step S1802 in FIG. 31, and the like). Note that the POS terminal 20-2 that is the destination of the registration information can also have the receiving-side employee (employee logged into the POS terminal 20-2) confirm whether to perform or not perform processing based on this registration information (see FIG. 20A, FIG. 21A, and the like).

That is, when sending the registration information with another POS terminal 20-2 in the normal mode as the destination, the POS terminal 20-1 sends instruction information (in one or more embodiments, a flag)—added to this registration information or together with this registration information—on how to process this registration information (settlement only, registration also) to the POS terminal 20-2 that is the destination of the registration information. (Prohibition of Executing One Among Settlement Processing in Present Terminal, Settlement Processing in Another Terminal)

Furthermore, according to the POS system 1 of one or more embodiments, when cash is inserted into the change machine 209, the POS terminal 20-1 in the normal mode stops display of the buttons used when performing settlement processing in another terminal (POS terminal 20-2, POS terminal 20-3) (20-2 Cash Register button BT12, 20-3 Cash Register button BT13, Checkout Ticket button BT15) (see FIG. 11A, step S160 in FIG. 25, step S260 in FIG. 26, and the like). This is also the case when a transaction type is selected (see step S160 in FIG. 25, step S260 in FIG. 26, and the like).

That is, the POS terminal 20-1, when settlement processing is to be performed therein (POS terminal 20-1), prohibits sending of the registration information to another terminal (POS terminal 20-2, POS terminal 20-3) and prohibits issuing of a checkout ticket before actually performing settlement processing (for example, while the registration processing is being performed).

Meanwhile, when there is a declaration by the Reserve Sending button, the POS terminal 20-1 in the normal mode stops displaying the Subtotal button BT10 used when performing settlement processing in this terminal (POS terminal 20-1) and the Checkout Ticket button BT15 used when issuing a checkout ticket (see FIG. 23A). Moreover, when there is a declaration by the Reserve Issuing of Checkout Ticket button, the POS terminal 20-1 in the normal mode stops displaying the Subtotal button BT10 used when performing settlement processing in this terminal (POS terminal 20-1) and a send button (20-2 Cash Register button BT12, 20-3 Cash Register button BT13) used when sending the registration information to another terminal (see FIG. 24A). Moreover, when there is a declaration by the Reserve Settlement on Another Terminal button, the POS terminal 20-1 in the normal mode stops display of the Subtotal button BT10 used when performing settlement processing in this terminal (POS terminal 20-1) (see FIG. 24B, and see step S170 in FIG. 25, step S270 in FIG. 26, and the like).

That is, when settlement processing is to be performed in another terminal (POS terminal 20-2, POS terminal 20-3), the POS terminal 20-1 prohibits settlement processing therein (POS terminal 20-1) before actually performing settlement processing (for example, while the registration processing is being performed).

The POS system 1 of one or more embodiments is described above, but a data configuration, a processing flow, display and output aspects, and the like can be varied and revised as appropriate.

For example, in one or more embodiments, when sending the registration information with the POS terminal 20-2 in the normal mode as the destination, the POS terminal 20-1 in the normal mode has the sending-side employee confirm whether to send the registration information to the POS terminal 20-2. However, the POS terminal 20-1 may have the sending-side employee confirm whether to send the registration information to a terminal that differs from the POS terminal 20-2 (specifically, the POS terminal 20-3 in the full-self mode).

For example, a "Send to Another Device (POS Terminal 20-3) button" may be disposed in addition to the "No button BT22" and the "Yes button BT23" in the small screen SG04 of FIG. 18A, and when the "Send to Another Device (POS Terminal 20-3) button" is operated, the small screen SG04 may be erased, and the registration information may be sent to the POS terminal 20-3 in the full-self mode instead of the POS terminal 20-2 in the normal mode so that the former starts from the settlement processing.

Alternatively, the "Send to Another Device (POS Terminal 20-3) button" may be disposed instead of the "Yes button BT23" of the small screen SG04 of FIG. 18A. That is, the small screen SG04 may be disposed with the "No button BT22" and the "Send to Another Device (POS Terminal 20-3) button," without being disposed with the "Yes button BT23." That is, the POS terminal 20-1 may prohibit sending of the registration information with the POS terminal 20-2 in the normal mode as the destination.

Furthermore, a "Send to Another Device (POS Terminal 20-3) (Settlement Only) button" and a "Send to Another Device (POS Terminal 20-3) (Registration Also) button" may be disposed in addition to the "No button BT22," the "Yes (Settlement Only) button BT24," and the "Yes (Registration Also) button BT25" in the small screen SG05 of FIG. 18B. When the "Send to Another Device (POS Terminal 20-3) (Settlement Only) button" is operated, the small screen SG05 may be erased, and the registration information may be sent to the POS terminal 20-3 in the full-self mode instead of the POS terminal 20-2 in the normal mode so that the former starts from the settlement processing. When the "Send to Another Device (POS Terminal 20-3) (Registration Also) button" is operated, the small screen SG05 may be erased, and the registration information may be sent to the POS terminal 20-3 in the full-self mode instead of the POS terminal 20-2 in the normal mode so that the former starts from the registration processing.

Alternatively, the "Send to Another Device (POS Terminal 20-3) (Settlement Only) button" may be disposed instead of the "Yes (Settlement Only) button BT24" of the small screen SG05 of FIG. 18B, and the "Send to Another Device (POS Terminal 20-3) (Registration Also) button" may be disposed instead of the "Yes (Registration Also) button BT25."

Furthermore, in one or more embodiments, when sending the registration information with the POS terminal 20-2 in the normal mode as the destination, the POS terminal 20-1 in the normal mode provides the sending-side employee with the option to send or not send the registration information to the POS terminal 20-2. However, the POS terminal 20-1 does not have to provide this option and may simply prohibit sending of the registration information with the POS terminal 20-2 as the destination. For example, the POS terminal 20-1 may perform a control similar to that of the "No button BT22" of the small screen SG04 of FIG. 18A and the small screen SG05 of FIG. 18B being operated without displaying the small screen SG04 of FIG. 18A and the small screen SG05 of FIG. 18B. Note that the POS terminal 20-1 may notify that sending of the registration information with the POS terminal 20-2 as the destination is prohibited.

Furthermore, the POS terminal 20-1 in the normal mode may vary whether to provide the option to send or not send the registration information with the POS terminal 20-2 in the normal mode as the destination and whether to provide an option in how to process the registration information in this destination (settlement only, registration also) when sending this registration information to this destination according to a permission of the sending-side employee. For example, when the permission of the sending-side employee is high, the "Send to Another Device (POS Terminal 20-3) (Settlement Only) button" and the "Send to Another Device (POS Terminal 20-3) (Registration Also) button" may be disposed and displayed in addition to the "No button BT22," the "Yes (Settlement Only) button BT24," and the "Yes (Registration Also) button BT25" in the small screen SG05 of FIG. 18B. When the permission of the sending-side employee is mid-level, the small screen SG04 of FIG. 18A and the small screen SG05 of FIG. 18B are displayed. When the permission of the sending-side employee is low, no option may be provided (sending of the registration information with the POS terminal 20-2 in the normal mode as the destination may simply be prohibited).

Furthermore, the above embodiments also describe the POS terminal 20-2 in the normal mode that is the destination of the registration information providing the receiving-side employee with the option to process or not process this registration information in this terminal (POS terminal 20-2) (see FIG. 20A, FIG. 21A, and the like). However, whether to provide the receiving-side employee with this option may be varied according to a permission of the receiving-side employee. For example, when the permission of the receiving-side employee is high, the small screen SG06 of FIG. 20A and the small screen SG07 of FIG. 21A may be displayed, and when the permission of the receiving-side employee is not high, no option may be provided (for example, processing may be performed according to a preset content concerning whether to process registration information from another terminal).

Furthermore, the above embodiments describe the POS terminal 20-2 in the normal mode that is the destination of the registration information providing the receiving-side employee with the option in how to process this registration information in this terminal (POS terminal 20-2) (settlement only, registration also) (see FIG. 22A, FIG. 22B, and the like). However, whether to provide the receiving-side employee with this option may be varied according to the permission of the receiving-side employee. For example, when the permission of the receiving-side employee is high, the small screen SG08 of FIG. 22A and the small screen SG09 of FIG. 22B may be displayed, and when the permission of the receiving-side employee is not high, no option may be provided (for example, processing may be performed according to a preset content concerning how to process registration information from another terminal).

Furthermore, in the above embodiments, the employee (sending-side or receiving-side employee) can select how to process the registration information in the POS terminal 20-2 on the receiving side of this registration information (settlement only, registration also) (see FIG. 18B, FIG. 22A, FIG. 22B, and the like). However, how to process this registration information in the POS terminal 20-2 on the receiving side of the registration information (settlement only, registration also) may be made to differ according to an installation position of this POS terminal 20-2. In other words, whether the registration processing is to be succeeded by (entrusted to) another terminal that is the sending destination of the registration information may be determined based on a placement of a product or the like (positional relationship between this other terminal and a product or the like) instead of or in addition to the permission of the employee (sending-side or receiving-side employee).

For example, for products such as cigarettes, hot snacks, and oden, it is convenient to perform the registration processing at the closest terminal, whereat a presence or absence and a quantity are easily confirmed and the products are easily provided. Moreover, there are situations wherein only one store stamp that is used in work of proxy payment of utility bills and the like and delivery work is placed in a predetermined location; in a setting of using the store stamp, it is convenient to perform the registration processing at the terminal closest to the store stamp. Therefore, whether the registration processing is to be succeeded by another terminal that is the sending destination of the registration information may be determined according to whether this other terminal is close to products such as above or a predetermined location of a store stamp. For example, when the installation location of the POS terminal 20-2 is near products such as above or a predetermined location of a store stamp, the POS terminal 20-2 on the receiving side may display the option to execute the registration processing (in succession) based on the registration information received from another terminal (POS terminal 20-1) (see FIG. 18B, FIG. 22A, FIG. 22B, and the like). When the installation location of the POS terminal 20-2 is not near products such as above or a predetermined location of a store stamp, an option such as above does not have to be displayed. Note that for each POS terminal 20, it is favorable to preset whether the installation location is near products such as above or a predetermined location of a store stamp (or whether to display the option to execute the registration processing based on the registration information received from another terminal).

Furthermore, because there is a possibility of worsened efficiency when an inexperienced employee is made to perform work they are not yet educated in (such as proxy payment, deliveries, and in-store cooking), determinations may be made based on attributes of this employee (experience level, skill level) and locations associated with the work (the stamp used for proxy payments and deliveries, a cooking location).

Furthermore, in the above embodiments, "Process registration information (settlement only) from cash register 20-1?" in the small screen SG06 of FIG. 20A and "Process registration information (registration also) from cash register 20-1?" in the small screen SG07 of FIG. 21B are illustrated as messages based on instruction information sent to another employee (employee at the POS terminal 20-2) together with the registration information. However, the contents of the messages are not limited thereto. Moreover, a plurality of types of messages is prepared, and the sending-side employee may be made able to select which message to display.

Furthermore, in the above embodiments, response buttons ("No button BT26," "Yes button BT27") are disposed together with the message based on the instruction information in the small screen SG06 of FIG. 20A and the small screen SG07 of FIG. 21B. However, only the message may be displayed, without disposing the response buttons (a confirmation button (such as an OK button) for simply erasing this small screen may be disposed). Moreover, the sending-side employee may be made able to select whether to dispose the response buttons.

Note that the above embodiments describe an example of using the information (flag) added to the registration information or the information (flag) sent together with the registration information as the instruction information. However, whether to start from the settlement processing or to start from the registration processing may be controlled in the designated terminal without using this information (flag or the like). For example, the designated terminal may start from the settlement processing when registration information that includes the total amount is received on the designated-terminal side and start from the registration processing when registration information that includes no total amount is received. That is, the POS terminal 20-1 may send registration information that includes the total amount to the designated terminal when the "Only Perform Settlement Process button BT20" of the small screen SG03 of FIG. 17B is operated, the "Yes button BT23" of the small screen SG04 of FIG. 18A is operated, and when the "Yes (Settlement Only) button BT24" of the small screen SG05 of FIG. 18B is operated. Moreover, the POS terminal 20-1 may send registration information that includes no total amount to the designated terminal when the "Also Perform Registration Process button BT21" of the small screen SG03 of FIG. 17B is operated and when the "Yes (Registration Also) button BT25" of the small screen SG05 of FIG. 18B is operated.

Furthermore, in the above embodiments, to reduce sent and received data amounts, messages per se displayed on the receiving-side terminal (messages "such as "Process registration information (settlement only) from cash register 20-1?") are not sent and received. However, the messages per se displayed on the receiving-side terminal may be sent and received.

Furthermore, in the above embodiments, for the registration information with the POS terminal 20-2 in the normal mode as the destination, the POS terminal 20-1 in the normal mode displays small screens (small screen SG04, small screen SG05) after a send button (20-2 Cash Register button BT12) is pressed and prohibits (temporarily prohibits) sending of the registration information to this destination (POS terminal 20-2). However, an aspect of sending prohibition is not limited thereto. For example, sending may be prohibited (completely prohibited) by not displaying a send button (20-2 Cash Register button BT12). Moreover, a send button may be displayed but made to not react even if operated, or a send button may react by being operated but return an error.

Furthermore, in the above embodiments, the POS terminal 20-1 that sends the registration information performs different processes according to the operation mode (normal mode, full-self mode) of the receiving-side POS terminal 20 (see for example step S800 in FIG. 30). However, as above, in the normal mode, the terminal is fundamentally in use by the employee. In other words, the POS terminal 20-1 performs different processes according to a usage status (usage status inferred from the operation mode) of the receiving-side POS terminal 20.

Furthermore, in the above embodiments, different processes are performed according to the operation mode of the receiving-side POS terminal 20 (see for example step S800 in FIG. 30). However, different processes may be performed according to, for example, an employee usage status (actual usage status) of the receiving-side POS terminal 20 instead of the operation mode of the receiving-side POS terminal 20. As one example, in the situation of (a) below, the flow may proceed to step S801 in FIG. 30 (processing similar to a situation of the full-self mode), and in the situation of (b) below, the flow may proceed to step S802 in FIG. 30 (processing similar to a situation of the normal mode):

(a) Situation wherein the receiving-side POS terminal 20 is not being used by an employee (regardless of the operation mode)
(b) Situation wherein the receiving-side POS terminal 20 is being used by an employee (regardless of the operation mode)

Furthermore, different processes may be performed according to, for example, the employee usage status (actual usage status) of the receiving-side POS terminal 20 in addition to the operation mode of the receiving-side POS terminal 20. As one example, in the situations of (A), (B), and (C) below, the flow may proceed to step S801 in FIG. 30, and in the situation of (D) below, the flow may proceed to step S802 in FIG. 30. Alternatively, in the situation of (A) below, the flow may proceed to step S801 in FIG. 30, and in the situations of (B), (C), and (D) below, the flow may proceed to step S802 in FIG. 30.

(A) Situation wherein the receiving-side POS terminal 20 (full-self mode) is not being used by an employee
(B) Situation wherein the receiving-side POS terminal 20 (normal mode) is not being used by an employee
(C) Situation wherein the receiving-side POS terminal 20 (full-self mode) is being used by an employee
(D) Situation wherein the receiving-side POS terminal 20 (normal mode) is being used by an employee Note that whether the receiving-side POS terminal 20 is being used by an employee may be determined by a sensor or the like that detects that a human is near this terminal. For example, it may be determined that the terminal is not being used by an employee when a human is continuously not detected for a predetermined time (about 10 seconds). Note that this sensor may be installed in each POS terminal 20 or may be installed in a ceiling, a wall, or the like.

Furthermore, instead of or in addition to the above method by a sensor, whether the receiving-side POS terminal 20 is being used by an employee may be determined (inferred) by a standstill time (non-operation time) from last being operated. When the above standstill time is short (for example, when this is less than a predetermined threshold (reference time)), it may be determined that the terminal is being used by an employee. When this is long (for example, when this is no less than the predetermined threshold), it may be determined that the terminal is not being used by an employee. Note that the above threshold may be different for each store, each day of the week, each time zone, and each installation position (each terminal).

Furthermore, in the above embodiments, the POS terminal 20-1 stops displaying buttons used when performing settlement processing in another terminal (20-2 Cash Register button BT12, 20-3 Cash Register button BT13, Checkout Ticket button BT15) when cash is inserted (a deposit is detected) (see FIG. 11A and the like) and stops displaying the Subtotal button BT10 used when performing settlement processing in this terminal when the Reserve Settlement on Another Terminal button is operated (see (B) and the like) in FIGS. 24A-24B). That is, by erasing unnecessary buttons, processing by these buttons is prohibited. However, an aspect of prohibiting processing is not limited to a method of erasing the buttons. For example, the buttons may be displayed (for example, displayed in an aspect whereby prohibition is understood) but made to not react even if operated, or the buttons may react by being operated but return an error.

Furthermore, the terminal may stop display of the buttons used when performing settlement processing in another terminal or have operation of these buttons be nonreactive or return an error when the inserted amount (deposit amount) is no less than the purchase amount instead of when cash is inserted.

In an aspect of stopping button display or the like when the inserted amount is no less than the purchase amount, the display in the display field HR01 of the registration screen may be displayed in an aspect whereby it is understood whether the inserted amount is less than the purchase amount or no less than the purchase amount. For example, characters such as "Or More" or "Less than" may be displayed, or a sign indicating that this is no less than the purchase amount may be displayed. Moreover, a character color, a character size, a character thickness or font, a background (display-field) color, or the like of the amount may be made to differ depending on whether this is less than the purchase amount or no less than the purchase amount. Note that even in an aspect of stopping button display or the like when cash is inserted, display may likewise be performed in an aspect whereby it is understood whether the inserted amount is less than the purchase amount or no less than the purchase amount.

Note that when the inserted amount is at one point no less than the purchase amount but, due to subsequent product registration, the purchase amount is increased and the inserted amount is become less than the purchase amount, as above, button non-display or the like is not performed. This is because the inserted amount is previously no less than the purchase amount but is presently less than the purchase amount. Note that button non-display or the like may be performed when the inserted amount is previously no less than the purchase amount but is presently less than the purchase amount (that is, when the inserted amount becomes no less than the purchase amount even once).

Furthermore, concerning the display in the display field HRO1 of the registration screen, regardless of whether display is performed in an aspect whereby it is understood whether the inserted amount is less than the purchase amount or no less than the purchase amount, information indicating whether a transaction type is selected (determined), information that can specify the selected transaction type, and information that is read (for example, information that can specify a type of credit card or electronic money) may be displayed in the display field HR01. For example, a character, a symbol, or a picture (illustration) corresponding to the selected (or read) credit card or electronic money may be displayed.

Note that information whereby it is understood whether the inserted amount is less than the purchase amount or no less than the purchase amount, information indicating whether a transaction type is selected, information that can specify the selected transaction type, information that can specify the read information, and the like may be displayed in another position on the screen instead of or in addition to the display field HR01. As one example, this may be displayed by a region (sheet, tab) "1" overall wherein the display field HR01 is provided. For example, a deposit state (information on whether the inserted amount is less than the purchase amount or no less than the purchase amount) may be displayed by a background color of the region "1" overall, and a picture corresponding to the credit card or the like that is selected or the like may be displayed in a position that differs from the display field HR01 in the region "1."

Note that as above, the POS terminal 20 stops display or the like for the buttons used when performing settlement processing in another terminal when cash is inserted, a transaction type is selected, or the like. As such, these buttons are operable until cash is inserted, a transaction type is selected, or the like. Therefore, the POS terminal 20 may send the registration information by an erroneous operation (operation mistake) by the employee. To handle a situation wherein the registration information is sent by an erroneous operation by the employee, the POS system 1 may be made able to cancel this sending. For example, the POS terminal 20 may display a Cancel Sending button (not illustrated) until the next transaction (product registration, depositing, transaction-type selection by the next customer) is started and, when the Cancel Sending button is operated, return to a status before the registration information is sent by the erroneous operation by the employee. For example, in an aspect wherein the registration information is held on the sending side even after sending, the registering side may treat the registration information held after the operation of the Cancel Sending button as information from before sending, and the receiving side may destroy (or ignore so as to not subsequently use) this registration information. This enables the customer to insert cash, select a transaction type, and the like and enables the employee to, for example, correct a registered-product content. Note that operations after the Cancel Sending button is operated are not limited to the above as long as a status of before the registration information is sent is returned to. For example, a state of before the registration information is sent may be returned to by actually sending and receiving the registration information and the like after the Cancel Sending button is operated.

Furthermore, in the above embodiments, the POS terminal 20-1 is described as disabling cash insertion into the change machine 209 when settlement processing is not to be performed in this terminal (for example, when the Reserve Settlement on Another Terminal button is operated), but specifically, for example, the cash (bills, effects) insertion port may be blocked (made to not open), or the cash inserted into the insertion port may be directly discharged. Moreover, when not performing settlement processing in this terminal, the transaction-type input operation is also disabled (see step S170 in FIG. 25, step S270 in FIG. 26, and the like). Specifically, the terminal may stop displaying the small screen SG01 disposed with the buttons corresponding to each transaction type, display the above buttons (for example, display in an aspect whereby prohibition is understood) but make these nonreactive even if operated, or have the above buttons react by being operated but return an error.

Furthermore, the transaction types of the above embodiments are the three types of cash, credit card, and electronic money (see FIGS. 15A-15B and the like), but these may be other transaction types (for example, a gift certificate, a coupon, a complimentary ticket, various prepaid cards, or a debit transaction). Note that when a deposit is made for a portion of the price of the total purchase amount (for example, when a deposit is made to cover an insufficient face value of a gift certificate or the like) or when no deposit is made but change is generated (for example, when a gift certificate or the like is used that returns change for a purchase of a product less than its face value), the POS terminal 20 may determine to execute the settlement processing therein (terminal deposited with a portion of the price of the total purchase amount, terminal that has no deposit made therein but generates change).

Furthermore, in the above embodiments, when a POS terminal 20 transitions operation modes, this terminal notifies the other terminals of its post-transition operation mode. As such, the POS terminal 20-1 has a continual grasp of the latest operation modes of the other terminals. Therefore, when sending the registration information to another terminal, the POS terminal 20-1 can confirm the operation mode of the other terminal serving as the sending destination (destination) by referring to the operation mode of the other terminal that it already has a grasp on (that is, without querying via the LAN 11). Note that the POS terminal 20-1 may query anew the operation mode of the other terminal serving as the sending destination via the LAN 11 when sending the registration information to the other terminal.

Note that in an aspect of performing different processes according to the employee usage status of the POS terminal that is the sending destination (destination) (receiving-side POS terminal 20), each POS terminal 20 may notify the other terminals of a changed usage status when the employee usage status of this terminal changes. As such, when sending the registration information to the other terminal, the POS terminal 20-1 may confirm the employee usage state in the other terminal serving as the sending destination by referring to the employee usage status at the other terminal that it already has a grasp on. The POS terminal 20-1 may query the employee usage status at the other terminal serving as the sending destination when sending the registration information to the other terminal.

That is, the POS terminal 20-1 that sends the registration data may, based on an operation for sending the registration data being performed, determine the operation mode of the other terminal serving as the sending destination by confirming the operation mode of the other terminal that it already has a grasp on or querying the operation mode of the other terminal serving as the sending destination via the LAN 11. This is also the case for the employee usage status at the other terminal.

Furthermore, in the above embodiments, the POS terminal 20-1 displays the small screen SG02 superimposed on the registration screen when a subtotal key is operated (FIG. 13A). However, the POS terminal 20-1 may display a subtotal screen that displays, for example, the information displayed on the small screen SG02 instead of (by switching from) the registration screen when the subtotal key is operated.

Furthermore, in the above embodiments, the POS terminal 20 is provided with one printing unit 213 that can rotatably change orientations from the employee side to the customer side and from the customer side to the employee side (see FIG. 2A to FIG. 4). However, instead of one printing unit 213, two printing units (printing unit fixedly facing the employee side, printing unit fixedly facing the customer side) may be provided.

Note that in the above embodiments, when sending the registration information to another terminal, the employee designates (selects) the terminal that is the sending destination (destination) of the registration information. However, in sending the registration information to the other terminal, the employee may designate only sending, without designating the terminal that is the sending destination of the registration information. That is, it is possible to simply dispose only a send button. In an aspect of the employee designating only sending, without designating the terminal that is the sending destination of the registration information, the sending-side terminal selects one terminal to serve as the destination according to a predetermined priority and sends the registration information to the selected terminal. Note that in an aspect wherein the sending-destination terminal is selected according to a priority, the employee is notified of which terminal is selected (which terminal is the sending destination of the registration information) before sending the registration information to the terminal selected according to the priority, at the time of sending the registration information to the terminal selected according to the priority, or after sending the registration information to the terminal selected according to the priority.

The above predetermined priority may, for example, place the POS terminal 20-3 in the full-self mode higher than the POS terminal 20-2 in the normal mode (cause the registration information to be sent with priority to the POS terminal 20-3 in the full-self mode) when sending the registration information from the POS terminal 20-1 to another terminal (POS terminal 20-2, POS terminal 20-3). Note that when sending the registration information to the POS terminal 20-2 in the normal mode whose priority is low, processing similar to the processing of when the employee designates the POS terminal 20-2 (for example, the processing of step 802 and subsequent steps in FIG. 30) may be executed.

Furthermore, as above, the above predetermined priority may be according to the employee usage status of the receiving-side POS terminal 20 instead of in addition to the operation mode.

Furthermore, in an aspect wherein the employee designates no sending-destination terminal (that is, the aspect wherein the sending-destination terminal is selected according to a priority), display may be performed that is different from an aspect wherein the employee designates the sending-destination terminal. For example, when the employee designates the POS terminal 20-3, "Cash register 20-3 is in full-self mode" is displayed (see FIG. 17B), but when the POS terminal 20-3 is selected according to a priority, "The sending destination is cash register 20-3 (full-self mode)" may be displayed. In other words, the employee may be notified of which terminal is selected according to the priority.

The POS system 1 is further described. The POS system 1 may have functions such as those described below instead of or in addition to the functions already described.

(Mode Switching According to Employee Presence Status)

The POS system 1 can switch operation modes between the normal mode, the full-self mode, the double scan mode, and the semi-self mode. In running the POS system 1 of one or more embodiments, when, for example, the employee is positioned on the employee side and able to operate the POS terminal 20, this POS terminal 20 may operate in the normal mode so that checkout can be performed while the employee attends to the customer.

Meanwhile, in a situation wherein the employee is away from the POS terminal 20 to, for example, perform work other than checking out, the employee cannot perform product-registration operations. In such a situation, the POS terminal 20 may be set to the full-self mode so that a customer attempting to check out can start product registration on their own, without the employee being present on the employee side of the POS terminal 20.

In consideration of factors such as the above, it is favorable to perform a mode switching operation from the normal mode to the full-self mode when the employee moves away from the POS terminal 20 they are operating until this point. Conversely, at a POS terminal 20 that is hitherto in the full-self mode, when an employee moves to the employee side of the POS terminal 20 to start serving a customer, it is favorable for the employee to perform a mode switching operation from the full-self mode to the normal mode.

However, the employee may forget a mode switching operation such as above. Moreover, in a situation wherein the store is very busy and, for example, the employee frequently travels back and forth between the POS terminal 20 and another location, the employee may make an erroneous determination of the operation mode that should be set in operations such as the above. That is, because the mode switching operation is dependent on employee behavior, there is a possibility that the operation mode of the POS terminal 20 will not be able to be switched appropriately.

Therefore, as described below, the operation mode of the POS terminal 20 may be set (switched) according to an employee presence status.

Figure 33:
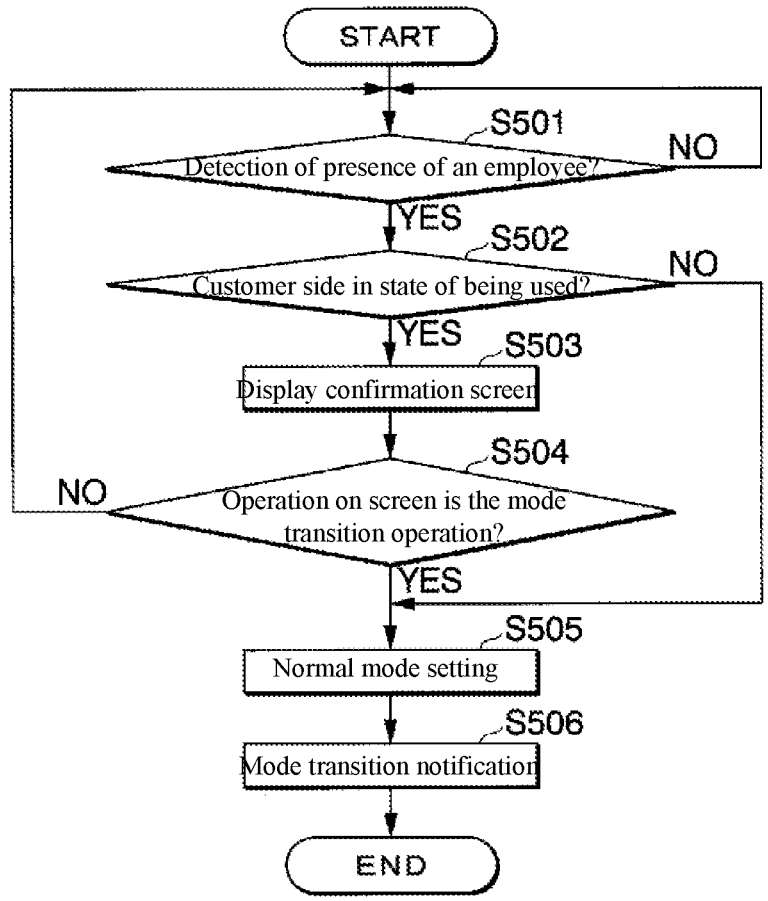
FIG. 33 shows a flowchart illustrating one example of the operations of the POS terminal according to one or more embodiments.

FIG. 33 is a flowchart relating to transitioning from the full-self mode to the normal mode. Step S501: The POS terminal 20 in the full-self mode detects a presence of an employee on the employee side of this POS terminal 20 (performs employee presence detection). If an employee presence is detected, the flow proceeds to step S502. If no employee presence is detected, the flow returns to step S501. That is, in a state wherein no employee is present on the employee side, the POS terminal 20 in the full-self mode continually monitors whether a state is entered into wherein an employee is present on the employee side until the state is entered into wherein an employee is present on the employee side (for operations relating to this transition to the normal mode, stands by until it is determined that an employee is present).

When starting product-registration operations, the employee first performs an operation whereby the POS terminal 20 that is the operation target recognizes their employee identifier (log-in operation). Upon registering the employee of the employee identifier recognized in the log-in operation as an operator (handler), the POS terminal 20 subsequently executes processing to handle checkout for a transaction. It is favorable for the log-in operation to be an operation of, for example, the employee-side scanner unit 212 reading a code indicating an employee identifier provided on an employee identification card by printing or the like (for example, a barcode, a two-dimensional code, or a color code (code representing information by a sequence of colors)). Therefore, as the employee presence detection at step S501, the POS terminal 20 may detect that an employee is present according to recognizing the employee identifier by the log-in operation.

Furthermore, employee presence detection may be performed by using both log-in information such as above and preregistered work-schedule information (or information indicating a current attendance status based on a time-card recording history or the like).

Specifically, for example, in a situation wherein a status is specified, based on the work-schedule information, wherein only "employee A" is working, the POS terminal 20 may, for a POS terminal 20 that is logged into, detect that an employee is present according to employee A logging into one POS terminal 20 and, for the other POS terminals 20, detect that no employee is present.

Step S502: The POS terminal 20 in the full-self mode determines whether the customer side of this POS terminal 20 is in a state of being used.

That is, when it is detected that an employee is present on the employee side ((YES) at step S501), the POS terminal 20 in the full-self mode determines whether a customer is executing processing (product-registration processing or settlement processing) on the customer side. If the customer side is in a state of being used, the flow proceeds to step S503. If the customer side is not in a state of being used, the flow proceeds to step S505.

Step S503: The POS terminal 20 in the full-self mode displays a confirmation screen on the employee-side display unit 210. Next, the flow proceeds to step S504.

The confirmation screen of step S503 is a screen that notifies that the current operation mode of the POS terminal 20 is the full-self mode and that a customer is in a state of executing processing (product-registration processing or settlement processing) on the customer side and displays a dialog for the employee to confirm whether it is permissible in this state to switch the operation mode from the full-self mode to the normal mode. The confirmation screen is disposed with, for example, a "Yes" button and a "No" button. The "Yes" button is a button whereby an operation instructing switching (transitioning) to the normal mode (mode transition operation) is performed when the employee determines that it is permissible to switch to the normal mode. The "No" button is a button whereby an operation instructing maintaining the full-self mode (mode maintaining operation) is performed when it is determined that it is favorable to remain in the full-self mode, without switching to the normal mode.

Step S504: The POS terminal 20 in the full-self mode determines whether the mode transition operation is performed as an operation on the confirmation screen. If the mode transition operation is performed, the flow proceeds to step S505. Meanwhile, if, instead of the mode transition operation, the mode maintaining operation is performed, the flow returns to step S501. Note that if neither the mode transition operation nor the mode maintaining operation is performed, the flow returns to step S504 (that is, stands by until the employee performs the mode transition operation or the mode maintaining operation).

Step S505: The POS terminal 20 in the full-self mode sets the operation mode thereof as the normal mode. This causes the operation mode of the POS terminal 20 to transition from the full-self mode to the normal mode. Next, the flow proceeds to step S506.

Step S506: The POS terminal 20 transitioned to the normal mode notifies the transition from the full-self mode to the normal mode (performs mode transition notification).

Note that in the example illustrated for step S505 and step S506, the POS terminal 20 performs mode transition notification to notify completion of transitioning to the normal mode after transitioning from the full-self mode to the normal mode. However, mode transition notification may be performed by notifying a notice of transitioning to the normal mode in a state of the full-self mode, before transitioning to the normal mode. Moreover, both a notice of transitioning to the normal mode and completion of transitioning to the normal mode may be notified (a notice of transitioning to the normal mode and completion of transitioning to the normal mode may be sequentially notified).

In a situation wherein a transition is made to the normal mode when the customer side is being used in the full-self mode, if the customer is performing product-registration operations during the transition, product-registration operations on the customer side become unable to be accepted, and subsequent product-registration processing is executed according to product-registration operations by the employee. Here, it is sufficient for the employee to receive products not yet registered from the customer who is formerly engaged in product-registration operations and to start product-registration operations for the received products.

When, for example, an employee is about to start product-registration operations on a POS terminal 20 in the normal mode, if made to perform the log-in operation and the operation instructing transitioning from the full-self mode to the normal mode, the employee must perform two operations.

The POS terminal 20 does not accept employee operations unless, for example, a log-in is performed. As such, for an employee about to operate the POS terminal 20, the log-in operation is necessary and habituated.

Therefore, as in FIG. 33, by transitioning from the full-self mode to the normal mode according to the necessary and habituated log-in operation, it is sufficient for the employee to perform the necessary and habituated log-in operation, and there is no need to further perform an operation of instructing transitioning operation modes in addition to the log-in operation. That is, by transitioning from the full-self mode to the normal mode according to the log-in operation, the transition from the full-self mode to the normal mode can be made smoothly.

Note that the processing in FIG. 33 illustrates an example of transitioning to the normal mode according to an employee presence being detected in the state of the full-self mode. However, when, for example, the customer side is being used, a transition may be made to the double scan mode instead of the normal mode. When a transition is made to the double scan mode, the employee becomes able to perform product-registration operations, and the customer can continue to perform product-registration operations. As such, product registration can be performed by splitting the work between the employee and the customer.

Figure 34:
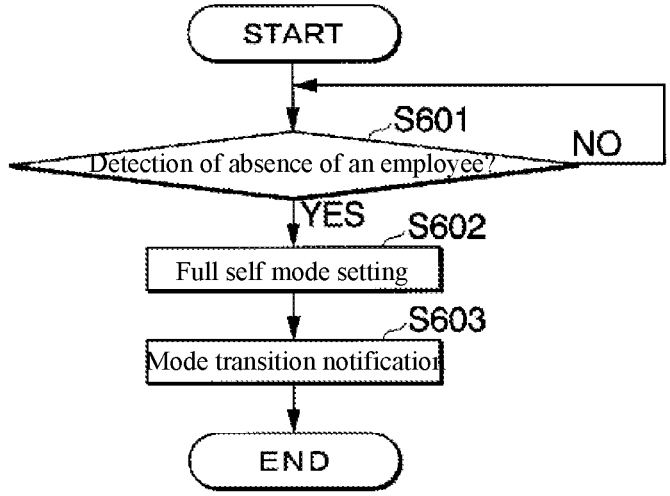
FIG. 34 shows a flowchart illustrating one example of the operations of the POS terminal according to one or more embodiments.

FIG. 34 is a flowchart relating to transitioning from the normal mode to the full-self mode. Step S601: A POS terminal 20 in the normal mode detects an absence of an employee on the employee side of this POS terminal 20 (performs employee absence detection). If an employee presence is detected, the flow proceeds to step S602. If no employee presence is detected, the flow returns to step S601. That is, in a state wherein an employee is present on the employee side, the POS terminal 20 in the normal mode continually monitors whether a state is entered into wherein no employee is present on the employee side until the state is entered into wherein no employee is present on the employee side (for operations relating to this transition to the full-self mode, stands by until it is determined that an employee is no longer present).

The employee must perform a log-out operation when stepping away from the POS terminal 20 they are operating up to this point. Therefore, as the employee absence detection at step S601, the employee becoming absent may be detected according to the employee performing the log-out operation on the POS terminal 20. The log-out operation may be an operation of, for example, a predetermined button displayed on the employee-side display unit 210 or a predetermined key disposed in the key operation unit 211. That is, as step S601, the POS terminal 20 may determine that the employee is entered into a state of absence according to the log-out operation being performed.

Step S602: The POS terminal 20 in the normal mode sets the operation mode thereof as the full-self mode. This causes the operation mode of the POS terminal 20 to transition from the normal mode to the full-self mode. Next, the flow proceeds to step S603.

Step S603: The POS terminal 20 transitioned to the full-self mode notifies the transition from the normal mode to the full-self mode (performs mode transition notification).

Note that in the example illustrated for step S602 and step S603, the POS terminal 20 performs mode transition notification to notify completion of transitioning to the full-self mode after transitioning from the normal mode to the full-self mode. However, mode transition notification may be performed by notifying a notice of transitioning to the full-self mode in a state of the normal mode, before transitioning to the full-self mode. Moreover, both a notice of transitioning to the full-self mode and completion of transitioning to the full-self mode may be notified (a notice of transitioning to the full-self mode and completion of transitioning to the full-self mode may be sequentially notified).

When, for example, stepping away from the POS terminal 20 they are operating up to this point, if an employee is made to perform the log-out operation and the operation instructing transitioning from the normal mode to the full-self mode, the employee must perform two operations.

Here, the log-out operation is necessary and habituated for the employee, but the operation instructing transitioning from the normal mode to the full-self mode is prone to being forgotten.

Therefore, as in FIG. 34, by transitioning from the normal mode to the full-self mode according to the necessary and habituated log-out operation, it is sufficient for the employee to perform the necessary and habituated log-out operation, and there is no need to perform an operation of instructing transitioning operation modes in addition to the log-out operation. That is, by transitioning from the normal mode to the full-self mode according to the log-out operation, the transition from the normal mode to the full-self mode can also be made smoothly.

Note that the employee presence detection corresponding to step S501 in FIG. 33 and the employee absence detection corresponding to step S601 in FIG. 34 may be performed as follows.

For example, the employee identification card may have an RFID tag that stores the employee identifier. The POS terminal 20 is provided with a tag-reader unit corresponding to the RFID tag. When the employee approaches a certain distance from the POS terminal 20 or closer, the employee identification card comes to be positioned within a range of a communication distance of the POS terminal 20 such that communication is enabled between the POS terminal 20 and the RFID tag of the employee identification card. The POS terminal 20 detects that the state is entered into wherein the employee is present when the employee identifier is acquired by communicating with the RFID tag of the employee identification card. Here, the POS terminal 20 may perform a setting of the employee of the acquired employee identifier being logged in.

Moreover, when the employee moves away from the POS terminal 20, the employee identification card comes to be positioned outside the range of the communication distance of the POS terminal 20, and the POS terminal 20 and the RFID tag of the employee identification card enter a state of being unable to communicate. The POS terminal 20 detects that the state is entered into wherein no employee is present according to communication with the RFID tag of the employee identification card corresponding to the employee identifier of the employee hitherto in a logged-in state becoming impossible. Here, the POS terminal 20 may perform processing as having transitioned to a logged-out state.

Furthermore, the employee identification card may be configured to store the employee identifier and be provided with a communication function compatible with near-field communication such as Bluetooth (registered trademark). Here, it is sufficient for the POS terminal 20 to be provided with a communication unit compatible with Bluetooth.

In this situation as well, when the employee approaches a certain distance from the POS terminal 20 or closer, communication is enabled between the POS terminal 20 and the employee identification card, and the POS terminal 20 acquires the employee identifier by communicating with the employee identification card. In this situation as well, the POS terminal 20 may perform a setting of the employee of the acquired employee identifier being logged in.

Moreover, when the employee moves away from the POS terminal 20, the employee identification card comes to be positioned outside the range of the communication distance of the POS terminal 20, and the POS terminal 20 and the RFID tag of the employee identification card enter a state of being unable to communicate. The POS terminal 20 detects that the state is entered into wherein no employee is present according to communication with the RFID tag of the employee identification card corresponding to the employee identifier of the employee hitherto in a logged-in state becoming impossible. Here, the POS terminal 20 may perform processing as logging out having been performed.

Furthermore, a human sensor may be provided that detects a presence of a human on the employee side of the POS terminal 20. The POS terminal 20 may determine that the state is entered into wherein the employee is present according to the human sensor detecting a presence of a human. Moreover, the POS terminal 20 may determine that the state is entered into wherein no employee is present according to the human sensor no longer detecting a presence of a human.

Furthermore, an imaging device may be provided so that the employee can be imaged when performing product-registration operations on the POS terminal 20. The POS terminal 20 may determine that the state is entered into wherein the employee is present according to an imaging image imaged by the imaging device changing from a state wherein no human is present to a state wherein a human is present. Moreover, the POS terminal 20 may determine that the state wherein no employee is present is entered into according to the imaging image imaged by the imaging device changing from the state wherein a human is present to the state wherein no human is present.

Furthermore, instead of directly performing detection relating to a human presence status by the human sensor or the imaging device as above, detection (input) relating to the human presence status may be performed by the human sensor or the imaging device as follows. That is, the POS terminal 20 determines an employee position based on a human detection signal, an imaged image, or the like obtained from no fewer than one human sensor or imaging device provided so as to detect, for example, customer flow in the store. Based on the determined employee position, the POS terminal 20 may determine that a state is entered into wherein the employee is present at this terminal or a state is entered into wherein no employee is present at this terminal. The human sensor and the imaging device above may be installed in at least one location among, for example, a store ceiling, a store wall, and a store pillar. Moreover, the human sensor and the imaging device above may be set on a shelf in the store (for example, near each frontage), on a cash-register counter (counter of the POS terminal 20), or the like instead of or in addition to the store ceiling or the like.

Moreover, a weight sensor may be used as the human sensor; when using a weight sensor, the weight sensor may be installed in, for example, a position in the cash register wherein the employee stands.

Furthermore, a device that determines that the state wherein the employee is present is entered into or that the state wherein no employee is present is entered into is not limited to a POS terminal 20 that switches operation modes according to a determination result.

That is, the human presence status at a certain POS terminal 20 may be determined by another POS terminal 20 or a host device of the POS terminal 20. The host device may be the store controller 10 provided in the store, a monitoring terminal, or a server or the like that is provided inside the store or outside the store.

A certain POS terminal 20 may be input with a determination result relating to the human presence status for this terminal from another POS terminal 20 or the host device and switch operation modes according to the input determination result.

Furthermore, the POS terminal 20 may determine that the state is entered into wherein no employee is present according to a certain amount of time elapsing from the last operation performed on the employee side.

The operation modes are further described.

The POS terminal 20 transitions to the full-self mode when a state of not being used continues, but transitioning to the full-self mode may be prohibited when the employee is using the terminal (other than performing an operation of setting the terminal to the full-self mode).

The POS terminal 20 may transition from the full-self mode to the double scan mode by reading an employee code. Moreover, the POS terminal 20 may transition from the full-self mode to the double scan mode by a display screen of the employee-side display unit 210 being touched instead of by reading the employee code. Note that when operating in the full-self mode, a screen disposed with buttons corresponding to each employee may be displayed on the employee-side display unit 210, and an employee may be specified according to a button that is touched on this screen. Moreover, the POS terminal 20 may transition from the full-self mode to the double scan mode by the key operation unit 211 being operated. Note that buttons corresponding to each employee may be disposed in the key operation unit 211, and an employee may be specified according to a button that is operated in the key operation unit 211.

Note that display may be performed as follows in the above POS terminal 20 in the double scan mode.

(1) The POS terminal 20 in the double scan mode may display only registered products registered by each person on the respective display units on the customer side and the employee side. That is, the POS terminal 20 in the double scan mode may display information relating to products registered by an employee operation (for example, scanning by the employee-side scanner unit 212) on the employee-side display unit 210 and display information relating to products registered by a customer operation (for example, scanning by the customer-side scanner unit 206) on the customer-side display unit 205.

(2) The POS terminal 20 in the double scan mode may display all registered products on the customer-side and employee-side display units, and may display those so that the registrant can be specified for each registered product by display position. For example, the POS terminal 20 in the double scan mode may divide a display region in the registration screen (in the detailed list) of the employee-side display unit 210 in two (for example, divide the display region up and down or left and right) to display information relating to the products registered by an employee operation on one side and display information relating to the products registered by a customer operation on the other side.

(3) The POS terminal 20 in the double scan mode may display all registered products on the customer-side and employee-side display units, and may display those so that the registrant can be specified for each registered product by display aspect. For example, the POS terminal 20 in the double scan mode may distinguish display by displaying information relating to the products registered by an employee operation in a first color (for example, red) and displaying information relating to products registered by a customer operation in a second color (for example, blue). Moreover, for example, the POS terminal 20 in the double scan mode may add an icon or the like indicating "Employee" or the like to the information relating to the products registered by an employee operation (display in line with product name, amount, and quantity) and add an icon or the like indicating "Customer" or the like to the information relating to the products registered by a customer operation. Note that the icons or the like may be added to any one among the information relating to the products registered by an employee operation and the information relating to the products registered by a customer operation and be displayed so that the registrant of each registered product can be specified by a presence or absence of the icon or the like. That is, although the products registered by an employee operation and the products registered by a customer operation are displayed mixed together, each is displayed so that the products registered by an employee operation and the products registered by a customer operation can be specified by respective display aspects or respectively added icons or the like.

Note that the employee may be made able to select which display among (1) to (3) above to perform.

Furthermore, the POS terminal 20 may send to another POS terminal 20 a transition instruction (transition instruction information) to transition the operation mode of this other POS terminal 20. The POS terminal 20 that receives the transition instruction information may transition operation modes according to this transition instruction information. For example, a POS terminal 20 in the normal mode may send the transition instruction information to another POS terminal 20 in the normal mode based on, for example, an employee operation, and the other POS terminal 20 that receives the transition instruction information may transition from the normal mode to the semi-self mode (dedicated checkout mode). Moreover, the POS terminal 20 that sends the transition instruction information may transition from the normal mode to the semi-self mode (dedicated registration mode).

Note that if a processing status after sending the transition instruction information is one wherein processing is taking place, the POS terminal 20 in the normal mode on the sending side of the transition instruction information may transition from the normal mode to the semi-self mode (dedicated registration mode) after this processing that is taking place ends. Alternatively, the POS terminal 20 in the normal mode on the sending side of the transition instruction information may forcibly (immediately) transition from the normal mode to the semi-self mode (dedicated registration mode) after sending the transition instruction information. For example, in a situation wherein the transition instruction information is sent when the customer is executing the settlement processing on the customer side, the transition may be immediately made from the normal mode to the semi-self mode (dedicated registration mode), but the settlement processing being executed may be made able to continue to be executed until completion.

Furthermore, as above, the POS terminal 20 can also transition operation modes according to the transition instruction information from another POS terminal 20, but if a processing status when the transition instruction information is received is one wherein processing taking place, the operation mode may be transitioned after this processing that is taking place ends. For example, if the processing status after the transition instruction information is sent is one wherein processing is taking place, the POS terminal 20 in the normal mode that receives the transition instruction information from another POS terminal 20 may transition from the normal mode to the semi-self mode (dedicated checkout mode) after this processing that is taking place ends. Alternatively, the POS terminal 20 in the normal mode on the receiving side of the transition instruction information may forcibly (immediately) transition from the normal mode to the semi-self mode (dedicated checkout mode) after receiving the transition instruction information. For example, in a situation wherein the transition instruction information is received when the employee is executing the registration processing on the employee side, the transition may be immediately made from the normal mode to the semi-self mode (dedicated checkout mode), but the registration processing being executed may be made able to continue to be executed until completion.

Note that the transition instruction (transition instruction information) to transition the operation mode of another POS terminal 20 may include information designating the operation mode to transition to (transition-destination operation mode). That is, the transition instruction information may include information identifying the transition-destination operation mode. Moreover, the POS terminal 20 may, for example, display a button or the like on the employee-side display unit 210 so that the employee can select the transition-destination operation mode of the other POS terminal 20. Alternatively, the transition instruction (transition instruction information) to transition the operation mode of the other POS terminal 20 does not have to include information designating the operation mode to transition to (transition-destination operation mode). In an aspect wherein the transition instruction information includes no information designating the transition-destination operation mode, a relationship (information indicating a correspondence) between a type of the current operation mode of the POS terminal 20 and the transition-destination operation mode when the transition instruction information is received (including a situation wherein transition is prohibited) may be shared on the POS system 1 (for example, with each POS terminal 20).

Note that in the above, as a specific example of sending the transition instruction information from one device to another device, an example is described of sending the transition instruction information from a certain POS terminal 20 in the normal mode to another POS terminal 2 in the normal mode. However, the device on the sending side of the transition instruction information and the operation mode of the POS terminal 20 on the receiving side of the transition instruction information are not limited to the above combination. For example, any device (such as a POS terminal 20 in any operation mode or a monitoring device) may send the transition instruction information, and the POS terminal 20 on the receiving side of the transition instruction information (POS terminal 20 in any operation mode) may transition operation modes according to the transition instruction information. As one example, a POS terminal 20 in the normal mode or the semi-self mode (dedicated registration mode) may send the transition instruction information to a POS terminal 20 in the normal mode, and the POS terminal 20 in the normal mode that receives the transition instruction information may transition from the normal mode to the full-self mode. Moreover, as another example, a POS terminal 20 in the normal mode or the semi-self mode (dedicated registration mode) may send the transition instruction information to a POS terminal 20 in the semi-self mode (dedicated registration mode or dedicated checkout mode), and the POS terminal 20 in the semi-self (dedicated registration mode or dedicated checkout mode) that receives the transition instruction information may transition from the semi-self mode (dedicated registration mode or dedicated checkout mode) to the full-self mode. Note that switching a POS terminal 20 in an operation mode other than the full-self mode to the full-self mode enables, for example, a customer to use a POS terminal 20 that is idle due to employee absence. This can raise a productivity efficiency (POS-terminal 20 operation rate) of the overall store.

Furthermore, a POS terminal 20 in the full-self mode may be made to function in the semi-self mode. For example, in processing in the semi-self mode, normally, a POS terminal 20 in the semi-self mode (dedicated registration mode) sends the registration information to a POS terminal 20 in the semi-self mode (dedicated checkout mode) and causes this POS terminal 20 in the semi-self mode (dedicated checkout mode) to execute the settlement processing. However, the POS terminal 20 in the semi-self mode (dedicated registration mode) may send the registration information to a POS terminal 20 in the full-self mode and cause this POS terminal 20 in the full-self mode to execute the settlement processing.

Note that the POS terminal 20 in the semi-self mode (dedicated registration mode) may be made to not send the registration information if, when there is an employee operation to send the registration information to the POS terminal 20 in the full-self mode, a customer is performing operations on this POS terminal 20 in the full-self mode. Specifically, the POS terminal 20 may invalidate (for example, return an error for) the employee operation per se or keep the employee operation per se valid but send the registration information after the customer operations at the POS terminal 20 in the full-self mode end instead of sending the registration information immediately after the employee operation. Alternatively, the POS terminal 20 in the semi-self mode (dedicated registration mode) may immediately send the registration information when there is an employee operation to send the registration information to the POS terminal 20 in the full-self mode. Here, the POS terminal 20 in the full-self mode on the receiving side of the registration information may, when a customer is performing operations on this OS terminal 20, process the received registration information after these customer operations end. Note that in the above, an example is described of the operation mode of the POS terminal 20 that is the sending source of the registration information being the semi-self mode (dedicated registration mode), but a similar description can also be given when the operation mode of the POS terminal 20 that is the sending source of the registration information is the normal mode.

Furthermore, in connection with sending the registration information, as above, the POS terminal 20 that is the sending source of the registration information displays on the employee-side display unit 210 send buttons corresponding to each POS terminal 20 that can serve as the sending destination of the registration information so that each POS terminal 20 can be identified. However, no fewer than one POS terminal 20 permitted to be the sending destination of the registration information from this POS terminal 20 may be predetermined (that is, a coupling between the registration side and a settlement side may be predetermined), and the send buttons may be displayed based thereon.

Furthermore, a button corresponding to a POS terminal 20 that can currently send the registration information and a button corresponding to a POS terminal 20 that cannot currently send the registration information may be displayed in different display aspects. For example, a button corresponding to a POS terminal 20 that can send the registration information may be displayed in a normal display aspect, and a button corresponding to a POS terminal 20 that cannot send the registration information may be displayed in a special display aspect (for example, by being grayed down). A button corresponding to a POS terminal 20 that cannot currently send the registration information may have operation disabled or prohibited (for example, made unresponsive to touch).

Furthermore, a status (for example, standing by, in use, near end, near full, or offline) of each POS terminal 20 to serve as the sending destination of the registration information may be notified. For example, the status of each POS terminal 20 may be shared (for example, by sending and receiving information indicating the status or central management by the store controller 10, one representative POS terminal 20, or the like) on the LAN 11, and information indicating the status of each POS terminal 20 (a badge-like image displaying, for example, "Standing By," "In Use," or "Near End") may be displayed on the above buttons (or in correspondence with the buttons). Note that a POS terminal 20 in the full-self mode is standing by when not being operated by a customer, changes from standing by to being in use when a customer starts registration, and again changes from being in use to standing by when settlement processing ends. Being in use may be divided into performing registration and performing settlement processing according to before and after the registration completion key (subtotal key) is operated.

Furthermore, transitioning to the normal mode may be limited when a customer is using a POS terminal 20 in the full-self mode. For example, transitioning to the normal mode may be permitted when a customer is performing the settlement processing in the full-self mode, and transitioning to the normal mode may be prohibited (at least from immediately transitioning thereto) when a customer is performing the registration processing in the full-self mode.

Furthermore, although the POS terminal 20 is described as transitioning operation modes according to an explicit mode transition operation by the employee, operations may be limited according to the operation mode before the transition (current operation mode), the transition-destination operation mode, an operation status, or the like despite an explicit mode transition operation.

The operation mode of a POS terminal 20 may be scheduled according to a working status of the employee (attendance status, work schedule, attendance schedule). However, there may be a situation wherein control is performed according to the schedule and a situation wherein control is not performed according to the schedule according to the operation mode before the transition (current operation mode), the transition-destination operation mode, the operation status, or the like.

In notifying the operation mode, an example is described of the POS terminal 20 displaying the operation mode on a display unit (employee-side display unit 210, customer-side display unit 205), but an aspect of notifying the operation mode is not limited thereto. For example, the POS terminal 20 may be provided with a Patlite (registered trademark), a display board, or the like (or a Patlite, a display board, or the like may be connected to the POS terminal 20), and the operation mode of this POS terminal 20 may be notified by the Patlite, the display board, or the like. Moreover, the POS system 1 may be provided with a Patlite, a display board, or the like (or a Patlite, a display board, or the like may be connected to the LAN 11), and the operation modes of each POS terminal 20 in the store may be notified by the Patlite, the display board, or the like. Using a Patlite, a display board, or the like enables the operation mode to be visually confirmed even from afar (position away from the employee-side display unit 210).

Supplementary notes A1 to A6 are disclosed below.

(Supplementary Note A1)

A sales-data processing device, provided with: a registration means of registering a product and generating registration data;

a settlement processing means that can perform settlement processing using the registration data;

a sending means of sending the registration data so that settlement processing can be performed on another device (sending the registration data with the other device as a destination; for example, sending directly to another terminal or sending to the other terminal via a store controller or the like);

a determination means of determining whether the other device is being operated by another employee; and a prohibition means of prohibiting sending of the registration data by the sending means (for example, temporarily prohibiting sending by displaying a small screen after a send button is pressed, prohibiting sending by not displaying the send button, prohibiting sending by making the send button nonreactive even if operated, or prohibiting sending by returning an error when the send button is operated); wherein the prohibition means prohibits sending of the registration data by the sending means to the other device, which is a sending destination of the registration data, when the determination means determines that this other device is being operated by another employee (when it is determined (inferred) that this other device is being used by an employee when it is determined that an operation mode of this other device is a normal mode).

According to supplementary note A1, sending of the registration information is prohibited when the device that is the sending destination of the registration information is being used by an employee. As such, processing (registration processing, settlement processing) can be performed efficiently. That is, generally, there is a fear of processing actually becoming delayed and inefficient when the registration information is sent to a device in an employee usage state. As such, prohibiting sending of the registration information to a device in an employee usage state can enable efficient processing overall, without inducing inefficiency.

(Supplementary Note A2)

The sales-data processing device of supplementary note A1, wherein the determination means determines whether the other device that is the sending destination of this registration data is being operated by another employee based on an operation for sending the registration data being performed (when the sending means sends the registration data).

According to supplementary note A2, a suitable determination can be made when necessary according to the latest information.

(Supplementary Note A3)

The sales-data processing device of supplementary note A1 or supplementary note A2, further provided with: a notification means of notifying that the prohibition means prohibited sending of the registration data (for example, notification by a small screen); and a canceling-operation means of canceling the prohibition of sending the registration data prohibited by the prohibition means; wherein a canceling operation (for example, an operation of a "Yes button BT23" or the like) that cancels the prohibition of sending the registration data to one other device is accepted after the notification means notifies that sending the registration data to this other device is prohibited.

According to supplementary note A3, sending of the registration information can be sent, depending on the situation, even when the device that is the sending destination of the registration information is being used by an employee. As such, the processing (registration processing, settlement processing) can be efficiently performed. That is, efficient processing is enabled because the registration information can be sent as appropriate when sending the registration information to a device in an employee usage state is not inefficient. Alternatively, efficient processing is enabled because the registration information can be sent as appropriate when not sending the registration information to a device in an employee usage state is actually inefficient.

(Supplementary Note A4)

The sales-data processing device of supplementary note A3, wherein the prohibition means prohibits sending of the registration data to the other device that is the sending destination according to a determination result of the determination means based on an operation for sending the registration data being performed (when the sending means sends the registration data) (that is, does not prohibit before the sending operation but prohibits as illustrated in FIGS. 18A-18B and the like after the sending operation).

According to supplementary note A4, prohibition can be suitably performed. That is, unlike an aspect of not displaying a send button or an aspect of making a send button nonreactive even if operated, instead of simply prohibiting, prohibition can also be canceled as determined by an employee as necessary.

(Supplementary Note A5)

The sales-data processing device of any one among supplementary note A1 to supplementary note A4, wherein the sending means sends the registration data together with instruction information to another employee.

According to supplementary note A5, another employee can perform processing based on the instruction information. This enables efficient processing.

(Supplementary Note A6)

A non-transitory computer-readable recording medium storing instructions that cause a computer to function as a sales-data processing device, wherein the computer is made to function as a registration means of registering a product and generating registration data, a settlement processing means that can perform settlement processing using the registration data, a sending means of sending the registration data so that settlement processing can be performed on another device, a determination means of determining whether the other device is being operated by another employee, and a prohibition means of prohibiting sending of the registration data by the sending means; and the prohibition means prohibits sending of the registration data by the sending means to the other device, which is a sending destination of the registration data, when the determination means determines that this other device is being operated by another employee.

Supplementary notes B1 to B8 are disclosed below.

(Supplementary Note B 1)

A sales-data processing device, provided with: a registration means of executing registration processing of registering a product;

a settlement processing means of executing settlement processing using registration data generated by the registration means;

a sending means of executing sending processing of sending the registration data so that settlement processing can be performed on another device (sending the registration data with the other device as a destination; for example, sending directly to another terminal or sending to the other terminal via a store controller or the like); and a prohibition means of prohibiting execution of the settlement processing; wherein the prohibition means, when the sending processing is to be executed (for example, when there is a declaration by a reserve sending button), prohibits execution of the settlement processing before execution of the sending processing (for example, prohibits execution of the settlement processing by not displaying a button used when performing settlement processing in this terminal, prohibits execution of the settlement processing by making the button used when performing settlement processing in this terminal nonreactive even if operated, or prohibits execution of the settlement processing by returning an error when the button used when performing settlement processing in this terminal is operated).

According to supplementary note B 1, processing unsuited to a situation being erroneously executed can be suitably prevented. Specifically, in a situation wherein the sending processing is to be executed, settlement processing is not performed in this device. As such, settlement processing unsuited to this situation is prohibited. Therefore, settlement processing unsuited to a situation wherein the sending processing is to be executed is not erroneously executed. That is, in this transaction, no deposit or the like is erroneously made in this terminal.

(Supplementary Note B2)

A sales-data processing device, provided with: a registration means of executing registration processing of registering a product;
  a settlement processing means of executing settlement processing using registration data generated by the registration means;
  a sending means of executing sending processing of sending the registration data so that settlement processing can be performed on another device; and a prohibition means of prohibiting execution of the sending processing;
  wherein the prohibition means, when the settlement processing is to be executed (for example, when cash is inserted or when there is a declaration by a reserve sending button or the like), prohibits execution of the sending processing before execution of the settlement processing (for example, prohibits execution by not displaying a button used when performing settlement processing on another terminal, making the button used when performing settlement processing on another terminal nonreactive even if operated, returning an error when the button used when performing settlement processing on another terminal is operated, or the like).

According to supplementary note B2, processing unsuited to a situation being erroneously executed can be suitably prevented. Specifically, in a situation wherein the settlement processing is to be executed, no registration data is sent to another device. As such, sending processing unsuited to this situation is prohibited. Therefore, sending processing unsuited to a situation wherein the settlement processing is to be executed is not erroneously executed. That is, in this transaction, no registration information is erroneously sent to another terminal.

(Supplementary Note B3)

A sales-data processing device, provided with: a registration means of executing registration processing of registering a product;
  a settlement processing means of executing settlement processing using registration data generated by the registration means;
  a sending means of executing sending processing of sending the registration data so that settlement processing can be performed on another device;
  a first determination means of determining whether the settlement processing is to be executed before execution of the settlement processing;
  a second determination means of determining whether the sending processing is to be executed before execution of the sending processing; and a prohibition means of prohibiting execution of any one processing among the settlement processing and the sending processing; wherein the prohibition means prohibits execution of the sending processing before execution of the settlement processing when the first determination means determines that the settlement processing is to be executed before execution of the settlement processing and prohibits execution of the settlement processing before execution of the sending processing when the second determination means determines that the sending processing is to be executed before execution of the sending processing.

According to supplementary note B3, processing unsuited to a situation being erroneously executed can be suitably prevented. For example, in a situation wherein the sending processing is to be executed, settlement processing is not performed in this device. As such, settlement processing unsuited to this situation is prohibited. Therefore, settlement processing unsuited to a situation wherein the sending processing is to be executed is not erroneously executed. Moreover, for example, in a situation wherein the settlement processing is to be executed, no registration data is sent to another device. As such, sending processing unsuited to this situation is prohibited. Therefore, sending processing unsuited to a situation wherein the settlement processing is to be executed is not erroneously executed.

(Supplementary Note B4)

The sales-data processing device of supplementary note B3, wherein the first determination means determines whether the settlement processing is to be executed based on a presence or absence of a deposit into a change machine or a presence or absence of a selection of a transaction type to be applied in the settlement processing.

According to supplementary note B4, a situation to execute the settlement processing in can be suitably determined.

(Supplementary Note B5)

The sales-data processing device of supplementary note B4, wherein the deposit into the change machine and the selection of the transaction type are possible even before the registration processing is completed.

According to supplementary note B5, it is unnecessary to wait until the registration processing is completed. As such, a time required for processing overall can be shortened.

(Supplementary Note B6)

The sales-data processing device of any one among supplementary note B3 to supplementary note B5, further provided with: a declaration means of declaring execution of the sending processing before execution of the sending processing; wherein the second determination means determines whether the sending processing is to be executed based on a presence or absence of the declaration by the declaration means.

According to supplementary note B6, a situation to execute the sending processing in can be suitably determined.

(Supplementary Note B7)

The sales-data processing device of any one among supplementary note B1 to supplementary note B6, wherein the settlement processing is a cash transaction processing using a total purchase amount and a total deposit amount executed based on a transaction operation after the registration processing is executed or a non-cash transaction processing using the total purchase amount and a medium other than cash for transaction executed based on a transaction operation after the registration processing is executed.

(Supplementary Note B8)

A non-transitory computer-readable recording medium storing instructions that cause a computer to function as a sales-data processing device, wherein the computer is made to function as a registration means of executing registration processing of registering a product, a settlement processing means of executing settlement processing using registration data generated by the registration means, a sending means of executing sending processing of sending the registration data so that settlement processing can be performed on another device, and a prohibition means of prohibiting execution of any one processing among the settlement processing and the sending processing, wherein the prohibition means prohibits execution of the sending processing before execution of the settlement processing when the settlement processing is to be executed and prohibits execution of the settlement processing before execution of the sending processing when the sending processing is to be executed.

Note that instructions for respectively realizing the POS terminal 20, the store controller 10, and the monitoring device described above or for realizing the POS system 1 may be recorded on a computer-readable recording medium, and the instructions may be executed by being read into a computer system. Note that the "computer system" referred to here includes an OS and hardware such as a peripheral. Moreover, "computer-readable recording medium" refers to a portable medium such as a flexible disk, a magneto-optical disk, a ROM, or a CD-ROM or a storage device such as a hard disk built into the computer system. Moreover, a "computer-readable recording medium" also includes a medium that holds the instructions for a certain amount of time, such as a volatile memory (RAM) inside a computer system serving as a server or a client when the instructions are sent via a network such as the internet or a communication line such as a phone line. Moreover, the above instructions may be transmitted from the computer system storing the instructions in the storage device or the like to another computer system via a transmission medium or by a transmission wave in the transmission medium. Here, the "transmission medium" that transmits the instructions refers to a medium having a function of transmitting information like a network (communication network) such as the internet or a communication line (communication line) such as a phone line. Moreover, the above instructions may be for realizing a portion of the above functions. Moreover, it may be instructions that can realize the above functions in combination with instructions already recorded in the computer system—a so-called difference file (difference instructions).

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

DESCRIPTION OF REFERENCE SIGNS

1 . . . POS system
10 . . . Store controller
20 . . . POS terminal (one example of sales-data processing device)
201 . . . CPU
202 . . . ROM
203 . . . RAM
204 . . . Hard disk
205 . . . Customer-side display unit
206 . . . Customer-side scanner unit
208 . . . Card transaction unit
209 . . . Change machine
210 . . . Employee-side display unit
211 . . . Key operation unit
211*a* . . . Switch Modes button 211*a*
212 . . . Employee-side scanner unit
213 . . . Printing unit
214 . . . Audio output unit
215 . . . Communication unit

What is claimed is:

1. A sales-data processing device connected to other sales-data processing devices over a network of a store, comprising:

a touch display;

a customer-side display; and a central processing unit (CPU) that:

registers a product and generates registration data, and either executes settlement processing using the registration data or sends the registration data to one of currently operable sales-data processing devices to execute the settlement processing using the registration data, the currently operable sales-data processing devices being available to execute the settlement processing among the other sales-data processing devices, wherein the touch display displays, to a store employee, the currently operable sales-data processing devices, for every settlement transaction, the touch display displays a reception screen configured to receive, from the store employee, an operation to execute the settlement processing at the sales-data processing device or an operation to send the registration data to one of the currently operable sales-data processing devices to execute the settlement processing, and in a case where the reception screen receives the operation to send the registration data:

the touch display prompts the store employee to select one of the currently operable sales-data processing devices to execute the settlement processing, and the CPU causes the customer-side display to display, to a customer, a message that prompts the customer to execute the settlement processing at the selected currently operable sales-data processing device.

2. A sales-data processing device connected to other sales-data processing devices over a network of a store, comprising:

a touch display;

a customer-side display; and a central processing unit (CPU) that:

registers a product and generates registration data, and either executes settlement processing using the registration data or sends the registration data to one of currently operable sales-data processing devices to execute the settlement processing using the registration data, the currently operable sales-data processing devices being available to execute the settlement processing among the other sales-data processing devices, wherein the touch display displays, to a store employee, the currently operable sales-data processing devices, for every settlement transaction, the touch display displays a reception screen configured to receive, from the store employee, an operation to execute the settlement processing at the sales-data processing device or an operation to send the registration data to one of the currently operable sales-data processing devices to execute the settlement processing, and in a case where the reception screen receives the operation to execute the settlement processing, the CPU causes the customer-side display to display, to a customer, a message that prompts the customer to execute the settlement processing at the sales-data processing device, not at any of the currently operable sales-data processing devices.

3. A non-transitory computer-readable recording medium storing instructions that cause a computer to function as a sales-data processing device that is connected to other sales-data processing devices over a network of a store and comprises:

a touch display;

a customer-side display; and a central processing unit (CPU) that:

registers a product and generates registration data, and either executes settlement processing using the registration data or sends the registration data to one of currently operable sales-data processing devices to execute the settlement processing using the registration data, the currently operable sales-data processing devices being available to execute the settlement processing among the other sales-data processing devices, wherein the touch display displays, to a store employee, the currently operable sales-data processing devices, for every settlement transaction, the CPU causes the touch display to display a reception screen configured to receive, from the store employee, an operation to execute the settlement processing at the sales-data processing device or an operation to send the registration data to one of the currently operable sales-data processing devices to execute the settlement processing, and in a case where the reception screen receives the operation to send the registration data:

the touch display prompts the store employee to select one of the currently operable sales-data processing devices to execute the settlement processing, and the CPU causes the customer-side display to display, to a customer, a message that prompts the customer to execute the settlement processing at the selected currently operable sales-data processing device.

4. A non-transitory computer-readable recording medium storing instructions that cause a computer to function as a sales-data processing device that is connected to other sales-data processing devices over a network of a store and comprises:

a touch display;

a customer-side display; and a central processing unit (CPU) that:

registers a product and generates registration data, and either executes settlement processing using the registration data or sends the registration data to one of currently operable sales-data processing devices to execute the settlement processing using the registration data, the currently operable sales-data processing devices being available to execute the settlement processing among the other sales-data processing devices, wherein the touch display displays, to a store employee, the currently operable sales-data processing devices, for every settlement transaction, the CPU causes the touch display to display a reception screen configured to receive, from the store employee, an operation to execute the settlement processing at the sales-data processing device or an operation to send the registration data to one of the currently operable sales-data processing devices to execute the settlement processing, and in a case where the reception screen receives the operation to execute the settlement processing, the CPU causes the customer-side display to display, to a customer, a message that prompts the customer to execute the settlement processing at the sales-data processing device, not at any of the currently operable sales-data processing devices.

* * * * *